United States Patent [19]

Freiman et al.

[11] Patent Number: 4,939,670

[45] Date of Patent: Jul. 3, 1990

[54] PC DRIVEN PRINT FILE UTILITIES FOR MAINFRAME COMPUTER PRINTING

[75] Inventors: Alex C. Freiman, New Britain; Barbara E. Osder, Erdenheim; Robert Perugini, Horsham; Joseph A. Reed, Cheltenham, all of Pa.

[73] Assignee: Unisys Corporation, Blue Bell, Pa.

[21] Appl. No.: 275,453

[22] Filed: Nov. 18, 1988

[51] Int. Cl.$^5$ .................... G06F 15/00; G06F 3/23
[52] U.S. Cl. .................... 364/519; 364/523; 364/900; 364/930; 364/943
[58] Field of Search ... 364/200 MS File, 900 MS File, 364/519, 523, 518, 521; 400/70, 76

[56] References Cited

U.S. PATENT DOCUMENTS

| | | | |
|---|---|---|---|
| 4,031,519 | 6/1977 | Findley | 364/900 |
| 4,470,129 | 9/1984 | Disbrow et al. | 364/900 |
| 4,649,513 | 3/1987 | Martin et al. | 364/900 |
| 4,661,000 | 4/1987 | Shinbori | 364/519 X |
| 4,809,220 | 2/1989 | Carlson et al. | 364/900 |

Primary Examiner—Gary V. Harkcom
Assistant Examiner—Michael A. Jaffe
Attorney, Agent, or Firm—Albert B. Cooper; Mark T. Starr; Robert S. Bramson

[57] ABSTRACT

A personal computer (PC) running on MS/DOS interactively and graphically creates or modifies definitions for print fonts, electronic forms, page compositions and sketches and includes a function for converting the definitions for transfer to a mainframe computer facility for use by the mainframe printer control function and printer. The PC further includes functions for creating or modifying character arrangements, EFORM arrangements, page composition arrangements and sketch arrangements where the arrangements include all of the components required to print the entity. The mainframe computer comprises an OS1100 system with PERCON for controlling a laser printer. The invention includes a function at the mainframe facility for converting the definitions transferred thereto from the PC into omnibus elements containing the data required by PERCON to print the entities. The omnibus elements are stored in a user library. The invention also includes a function for creating and modifying print control records for insertion in the print file to control PERCON to utilize the created and modified omnibus elements in printing the file.

55 Claims, 16 Drawing Sheets

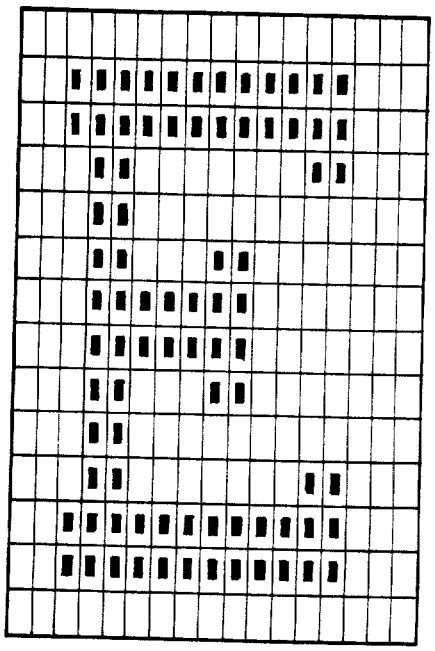
FIG.4.
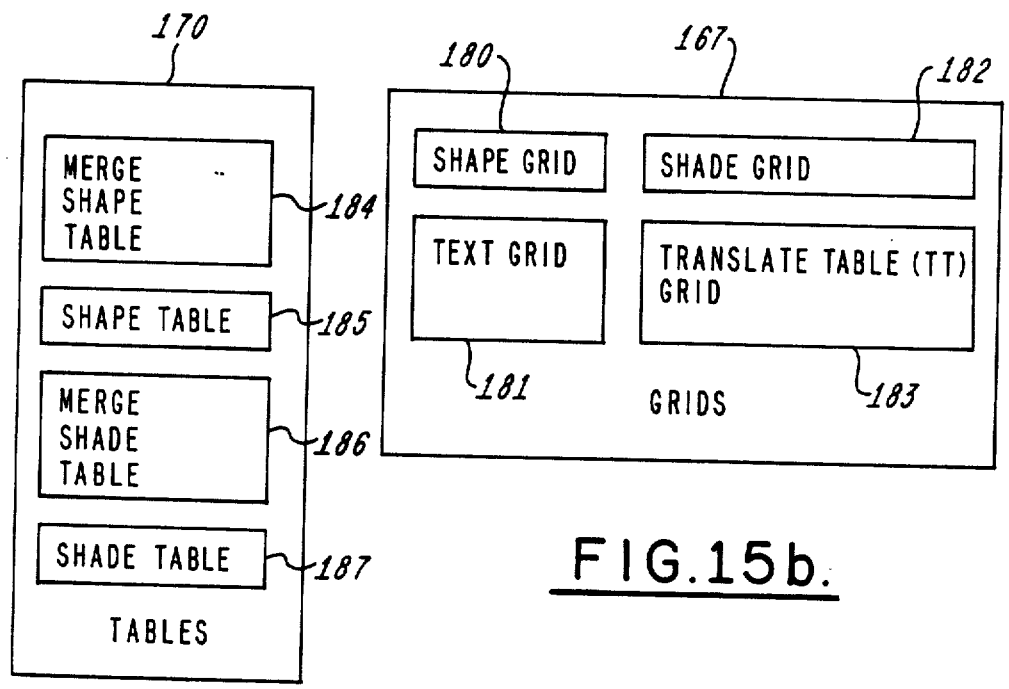
FIG.15b.
FIG.15a.

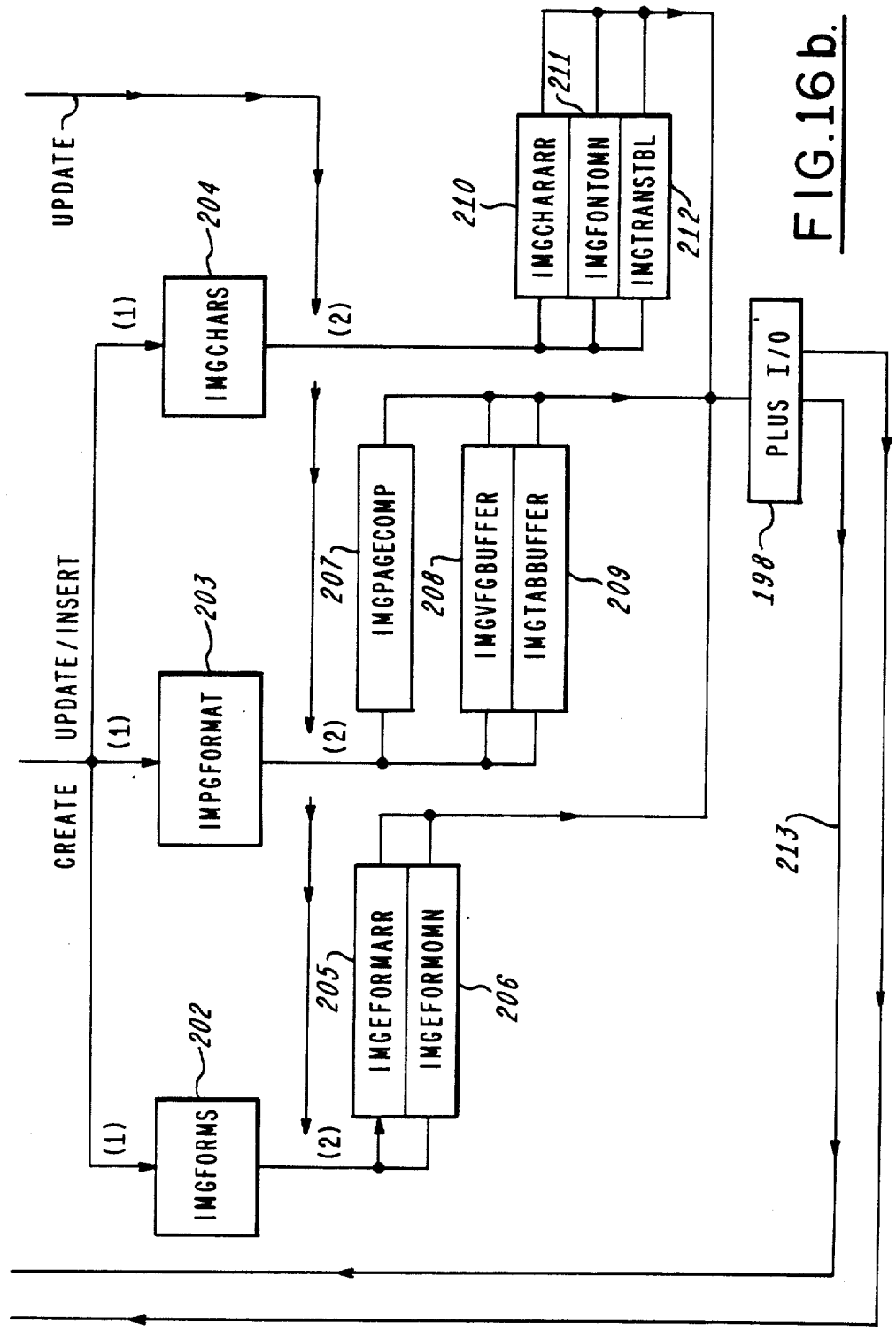

PC DRIVEN PRINT FILE UTILITIES FOR MAINFRAME COMPUTER PRINTING

BACKGROUND OF THE INVENTION

1. Field of the Invention

The invention relates to mainframe computer printing, particularly with respect to pixel addressable printers such as non-impact and matrix printers. The invention specifically concerns creation and modification of fonts, electronic forms, sketches and page compositions.

2. Description of the Prior Art

Printing at mainframe computer facilities had in the past been effected by impact printers. Impact printers utilized fixed character sets or fonts determined by the printer hardware such as the print bands, chains or wheels and only one font was selectable at a time. Changing the hardware in order to change the font was an arduous task. With impact printers, new character sets could only be added to the facility by new printer hardware. New characters could not be added to existing character sets, new characters could not be created nor could existing characters be modified in such systems. Additionally, in impact printer facilities, when it was desired to print on predetermined forms, traditionally suchg forms were preprinted and utilized for the applications as required. If it became necessary to modify a form, it was necessary to have new forms printed, discarding the supply of the obsolete forms. This is an undersirably wasteful procedure. It had been possible, however, to embed the form generation within the application programs and to modify the application to accommodate changes in the forms. This procedure required each page on which a form was to be utilized to be separately coded in the applcation and transferred to the printer at the time of print execution. This placed an undesirable overhead on the system and also required the use of skilled programmers to modify the applications to accommodate desired form changes.

With the advent of non-impact printers, such as laser printers, at mainframe computer facilities, many of the disadvantages of impact printers have been overcome but the enhanced capabilities and flexibility provided by pixel programmable printers are not easily accessible to and useable by non-technical persons. At present day mainframe computer facilities with laser printing, a wide variety of character arrangements and fonts are available to facility users. Additionally, at some facilities, electronic forms that may be invoked and overlayed on the pages during printing are available in the facility library to the applications run on the system.

It is desirable at such facilities to provide the capability of creating and modifying character arrangements, sets and fonts which would be available to existing applications. It is also desirable to create and modify the electronic forms, the form overlays, page compositions, and to provide graphics such as signatures and logos. In present day facilities, such functionality may only be accomplished by skilled system programmers who are required to prepare complex programs involving manually converting characters and forms into hexidecimal data bytes and adhering to a rigid structure and protocol. Because of the difficulty involved, users generally do not utilize this available functionality but instead revert to prior techniques such as preprinted forms and graphics. Additionally, the prior art utilities for such purposes tend to be poorly supported and documented.

In addition to the above, special publishing software packages are available that provide some of the functionality discussed above such as, electronic forms, logos, signatures, and page compositions, at mainframe computer facilities. Such publishing software, however, require the application programs that wish to utilize the software to be specially coded so to do. As far as it goes, this approach provides desirable functionality but would require users to write new applications or rewrite existing applications to access the capability. From a user's viewpoint, this is undersirable in that it involves an inordinately large investment in order to create and modify their application programs which may be extremely extensive and expensive.

SUMMARY OF THE INVENTION

The invention provides an interactive personal computer (PC) based system for use in conjunction with a mainframe computer facility having a pixel programmable printer for ease of use, creation and modification of print entities such as fonts, electronic forms, graphics and page compositions and for interfacing upward to the mainframe computer system print file and library creation and maneagement facility. The invention comprises personal computer means for interactively and graphically generating data ralated to the creations and modifications, means for converting the data into a first format for transfer to the mainframe computer, means at the mainframe computer for converting the transferred data into printer specific element formats suitable for use by the mainframe computer in printing the creations and modifications on the printer, and means at the mainframe computer for generating the control images or control records required by teh mainframe computer to print the creations and modifications. The invention contemplates pixel programmable printers such as laser printers.

BRIEF DESCRIPTION OF THE DRAWINGS

FIG. 4 illustrates a sample character image for the letter E showing the pixel-by-pixel representation useful in describing the Character Arrangement Subsystem Block of FIG. 3.

FIG. 15a is a schematic representation illustrating details of the Tables utilitzed in FIG. 15.

FIG. 15b is a schematic representation illustrating details of the Grids utilized in FIG. 15.

FIGS. 16a and 16b are a schematic block illustrating details of the Control Images Subsystem Block of FIG. 14.

DESCRIPTION OF THE PREFERRED EMBODIMENT

Figure 1:
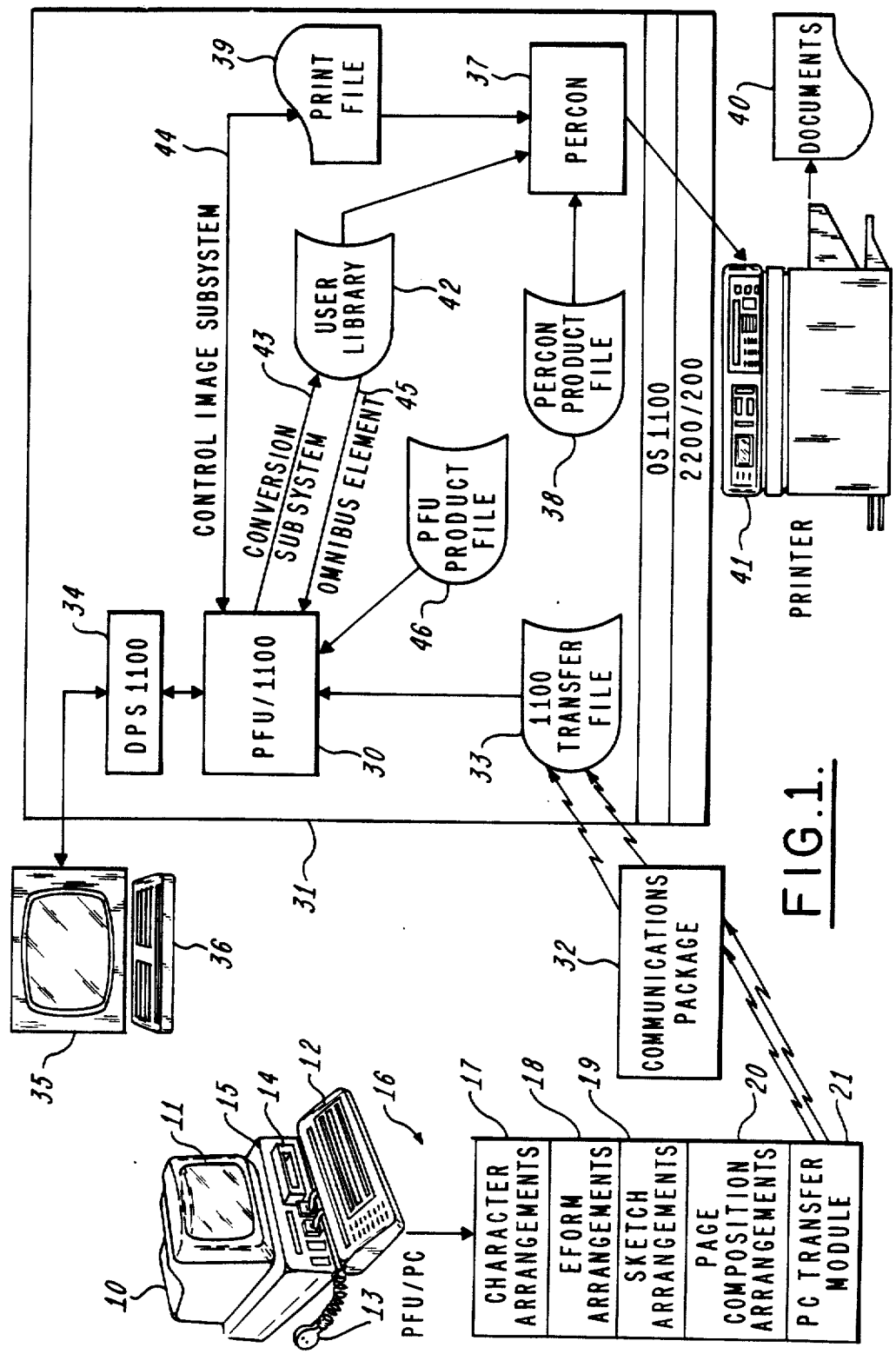
FIG. 1 is a schematic block and pictorial drawing illustrating an overview of the system of the present invention.

The invention as described herein provides ease-of-use access to functions available on pixel addressable printers utilized at mainframe computer factilities. A personal computer (PC) provides a user-friendly, menu driven, graphic interface to create or modify the individual or logically related sets of printer-specific elements that define special functions, i.e., fonts, electronic forms, sketches, page compositions, vertical format buffers, and tab buffers, to the supported printers. The invention also creates the individual print control images or sets of print control images required by the printer control software to access the individual or logically related sets of created printer specific elements and inserts these control images in a designated print file for accessing the special functions.

Although the invention is applicable to any mainframe computer facility with a pixel addressable printer, such as a non-impact printer, the invention will be explained in terms of Unisys OS1100 systems with laser printers such as the model 47 and Cronus non-impact system printers available from Unisys Corporation of Blue Bell, Pennsylvania. Specifically, the invention will be explained in terms of the Unisys 2200 series of computers supported by the OS1100 operating system. Specifically, the preferred embodiment of the invention is described in terms of a Unisys 2200/200 system with Unisys Peripheral Control Software (PERCON) installed.

The terminology utilitzed herein and formats for print files, omnibus elements, control images, vertical format buffers, tab buffers, translate tables, font definitions, and the like are well understood by users of Unisys 1100 systems and are well documented. For example, the Unisys publication UP-11215 entitled "OS1100 Peripheral Control Software (PERCON) Guide to Using PERCON for Model 47 Laser Printer", available from Unisys Corporation, describes these concepts and formats and is incorporated herein in its entirety.

Although any PC may be utiltized in practicing the invention, the preferred embodiment is explained in terms of a Unisys PC or acompatible computer running under MS-DOS 2.0 (or above). MS-DOS is a PC operating system available from the Microsoft Corporation (Microsoft and MS-DOS are registered trademarks of Microsoft Corporation). The present invention is denoted as Print File Utilities (PFU) which is comprised of two major parts: PFU/PC, which executes on a Unisys personal computer, and PFU/1100 which executes on a Unisys OS1100 system.

PFU provides users of Unisys OS1100 systems and personal computers with a relatively easy means of utilitzing the functionally available on the Model 47 and Cronus non-impact system printers when accessing the printers through PERCON. PFU provides such users with menu driven, user-friendly, graphic utilities to develop print control images in System Data Format (SCF) print files with associated omnibus elements. PFU provides the user with a menu-driven, user-friendly, graphic interface used to create and modify the printer-specific omnibus elements required by PERCON to define the special functions such as fonts, translate tabels, electronic forms, sketches, page compsoitions, vertical format buffers, and tab buffers to the supported printers. PFU also creates and modifies the individual or sets of print control images required by PERCON to access these sets of PFU-created printer specific elements and to insert them in the designated print file. Thus, the special functions of the supported printer are accessed when the print file is printed.

Referring to FIG. 1, an overview of the PFU system of the present invention is illustrated. A PC 10 includes a display screen 11, a keyboard 12, a mouse 13, a diskette system 14 and a disk system 15. The keyboard 12 is utilized to enter variable character data such as alphanumeric data or special characters generally as prompted by display screens to be discussed. The data is entered by typing in requested information and then pressing the RETURN key, for example. The keyboard is also utilized to make menu selections from menu screens. A menu screen is a display that contains a list of options from which one is selected by some indication. For example, a menu item may be selected from the keyboard by the direction or arrow keys located, for example, on the numeric keypad until the desired item is highlighted. Alternatively, a menu selection may be effected from the keyboard by entering an alphanumeric indicium associated with the option. The RETURN key may be utilized to tranmit the selected option to the PFU system. The keyboard 12 is also utilized to select functions via function keys denoted as F1–F10 (not shown). The supported functions of PFU/PC will be hereinafter described. The keyboard 12 is also utilized for moving the cursor, in a conventional manner, for positioning and drawing when the system is operating in the Character Arrangerment mode. The keyboard positions the cursor through the drawing matrix in this mode for positioning without drawing, for drawing wherein movement of the cursor within the drawing matrix turns pixel cells on and for erasing wherein movement of the cursor within the drawing matrix turns pixel cells off. Details of these operations will be hereinafter described.

The mouse 13 is also utilized to select menu screen options by moving the mouse in the appropriate direction until the desired menu screen item is highlighted. When the desired menu item is highlighted, pressing the left mouse button, for example, transmits the selection to PFU. The mouse 13 also selects functions by moving the mouse in the appropriate direction until the desired displayed function is highlighted. Pressing the left mouse button transmits the selection to PFU. The mouse 13 is also utilized in a manner to be detailed hereinafter in the EFORM arrangements mode and in the sketch arrangements mode. In the EFORM arrangements mode, a shape is drawn by positioning the cursor via the mouse to a position where the shape is to start and pressing the left mouse button. Further movement of the mouse draws the shape between the starting point and the current cursor position. To select the position where the drawing of the shape is to end, the mouse is moved until the cursor is displayed at the desired location and the left mouse button is again pressed. PFU draws the shape in the drawing matrix between the start and end positions selected. In the sketch mode, a free-hand drawing may be made by positioning the cursor via the mouse maintaining the left mouse button pressed while effecting the drawing.

The PC 10 contains the PFU/PC portion of the PFU system of the present invention as indicated by a reference numeral 16. The PFU/PC portion 16 of the PFU system of the present invention is comprised of a Character Arrangements Subsystem 17, an EFORM Arrangements Subsystem 18, a Sketch Arrangements Subsystem 19, a Page Composition Arrangements Subsystem 20 and a Prepare Arrangement for Transfer Subsystem that generates a PC Transfer Module 21, in a manner to be described.

The Character Arrangements Subsystem 17 provides for the creation, modification and display of a character arrangement, which includes the pixel data for one or more fonts and associated translate tables. The Character Arrangements Subsystem 17 provides all of the information required by PERCON to utilize the created characters when printing a file. A character arrangement is a named logical grouping of printer-related data structures that define the character images and character codes required to utilize the arrangement when printing.

The EFORM Arrangements Subsystem 18 provides for the creation, modification and display of an electronic form (EFORM) arrangement, which includes the electronic form or forms data for a page. An EFORM arrangement is a named logical grouping of data structures that define an EFORM and name any logically related character arrangements and/or sketch arrangements required to print the form. An EFORM is a created template that can be electronically overlayed onto the page when printing a file.

The Sketch Arrangements Subsystem 19 provides for the creation, modification and display of a sketch arrangement including the pixel data for graphics such as signatures and logos in addition to the associated translate table. The sketch arrangement includes all of the data required by PERSON in order to print the created graphics.

The Page Composition Arrangement Subsystem 20 provides for the creation, modification and display of a page composition arrangement including the logical page layout for a physical page along with any related character, sketch or EFORM arrangements and any related verical format or tab buffers. Also included but not shown are Vertical Format Buffer and Tab Buffer Subsystems providing for the creation, modification and display of a vertical format buffer for defining the vertical line spacing on a page and for defining horizontal positioning across a page, respectively.

The PFU system of the present invention further includes the PFU/1100 portion 30 resident on a suitable OS1100 mainframe system 31. As explained above, the OS1100 system 31 is exemplified by a Unisys 2200/200 mainframe computer system. The PC transfer module 21 is up-line loaded to the OS1100 system 31 by a suitable transfer mechanism 32. The transfer mechanism 32 may comprise a convertional modem with any appropriate commercail or public domain communications package for the PC 10. Unisys Corporation also provides a suitable transfer mechanism 32 available as the On-Line Transfer product that transfers an ASCII file between a Unisys PC and an OS1100 system. On-Line Transfer requires the Unisys STEP Board with its associated software. Once the PC transfer module 21 is received on the OS1100 system 31, it becomes known as an 1100 transfer file 33. Thus, after the creation of the PC transfer module 21 by PFU/PC 16, it is sent to the OS1100 system 31 in order to have the created or modified arrangements available for use by PERCON with a print file.

PFU/1100 denoted at 30, uses the OS1100 display processing ststem (DPS 1100) denoted by reference numeral 34 for all reads and writes from the mainframe console. The mainframe console is depicted by a terminal 35 and a keyboard 36. DPS1100 is utilized by PFU/1100 for the all of the PFU/1100 screen management. All menus and prompts displayed on the screen 35 are sent via DPS1100 and all responses entered via the keyboard 36 are intercepted by DPS1100 and placed in working storage where they can be accessed by PFU/1110. The DPS1100 routines and DPS files and file formats are well understood in the prior art with respect to OS1100 systems.

As discussed above, the OS1100 system 31 includes PERCON 37 that accesses a PERCON product file 38. The PERCON product file 38 includes the omnibus elements containing the character arrangements and fonts, EFORMS, sketch arrangements, page compsition arrangements including vertical format buffers and tab buffers available to the user at the OS1100 site. PFU is a companion product to PERSON and is compatible with PERCON in that the printer-specific definitions created by PFU/1100, in a manner to be explained, and the control images generated in the user's print file by PFU/1100, in a manner to be explained, must be compatible with PERCON's requirements for this information. PERCON 37 and the PERCON product file 38 are well understood with respect to OS1100 systems and will not be further described herein.

A typical print file used in the system is denoted by reference numeral 39. As is well understood, PERCON 37 utilizes the print file 39 to print documents 40 required by the application programs on the selected site printer. For example, a Model 47 or Cronus laser printer 41 may be controlled by PERSON 37 to print the documents 40. As is well understood, the application program inserts the data to be printed into the print file 39 proceded by the print control images containing the print control paramenters required by PERCON 37 in order to effect the printing required by the application. For example, the print control images may include data as to the font to be utilized and the EFORMS to be utilized in effecting the printing. In this manner, the print file 39 is comprised of print control images followed by data to be printed in accordance therewith followed by further print control images followed by further data to be printed, etc.

A user or alternate library 42 is depicted that stores the omnibus elements of a named user. These omnibus elements may contain font, character, EFORM, page composition and sketch information different form or modified with respect to that stored in the PERCON product file 38. PERCON 37 accesses both the user library 42 and the PERSON product file 38 in effecting printing on the printer 41 in accordance with the control images and data in the print file 39.

The PFU/1100 portion 30 of PFU receives the 1100 transfer file 33 to generate and provide omnibus elements and control images. In a manner to be described in greater detail, the PFU/1100 portion 30 is comprised of a Conversion Subsystem and a Control Image Subsystem. The Conversion Subsystem converts the appropriate information in the 1100 tranfer file 33, which is in PC output format, into omnibus elements containing printer-specific information in the OS1100 omnibus element format required by PERCON for the destination priner 41. The Conversion Subsystem of PFU/1100 transfers these omnibus elements to the user library 42 (naming the library) via a path 43 for use by PERCON 37. The Control Image Subsystem of PFU/1100 creates print control images and/or sets of control images for the arrangements which are assembled by PFU/PC 16 when a character, electronic form, page composition, or sketch arrangement is defined thereby and includes these print control images in the print file 39 via a path 44. Additionally, the Control Image Subsystem of PFU/1100 also creates or modifies the individual print control images required by PERCON 37 to access special functions of the printer 41 and to insert these control images in the print file 39 via the path 44.

The Conversion Subsystem of PFU/1100 converts the PFU/PC-created character, EFORM, page composition and sketch arrangements, as contained in the 1100 transfer file 33 into the set of printer-specific omnibus elements for the printer 41 required to define the arrangemenets to PERCON 37. The Conversion Subsystem also creates the set of print control images that access these elements and saves these control images in another omnibus element for use by the Control Image Subsystem. The Control Image Subsystem accesses these saved control images from the user library 42 via a path 45. Thus, the Control Image Subsystem inserts the set of print control images that define the PFU/PC-created arrangements into the OS1100 print file 39 via the path 44. The Control Image subsystem also creates and modifies the print control images that access special functions of the printer 41 and inserts these images into the print file 39. A PFU Product File 46 is also included for reasons to be described.

Both PFU/PC 16 and the PFU/1100 portion 30 consist of a basic system and several subsystems. The basic system provides a menu for accessing the subsystems. Thus, PFU is menu-driven on both the PC and on the OS1100 system, with prompting screens utilized depending on the function. Utilizing the PC 10, the user can create, modify and/or display a character, page composition, electronic form, or sketch arrangement and/or vertical format or tab buffer. The user can draw the graphics for a subsystem directly on the screen 11 via the keyboard 12 or the mouse 13, in a manner to be described. When these graphics are displayed on the screen, the user is shown an approximate representation of how they will appear when printed.

Any user data taken from the PC screen 11 that is relevant to the creation or modification of the OS1100 omnibus elements is saved in the diskette system 14. When selected by the user, the module set thus created by the PC subsystem is prepared for transfer via an option selected from the PC basic system main menu, up-line loaded to the OS1100 system 31, and converted into their printer-specific formats. The Control Image Subsystem of the PFU/1100 portion 30 is then utilized to insert the appropriate print control images that reference these printer-specific definitions into the print file 39, thus causing PERCON 37 to utilize the referenced PFU/PC-created data when printing the file.

Figure 2:
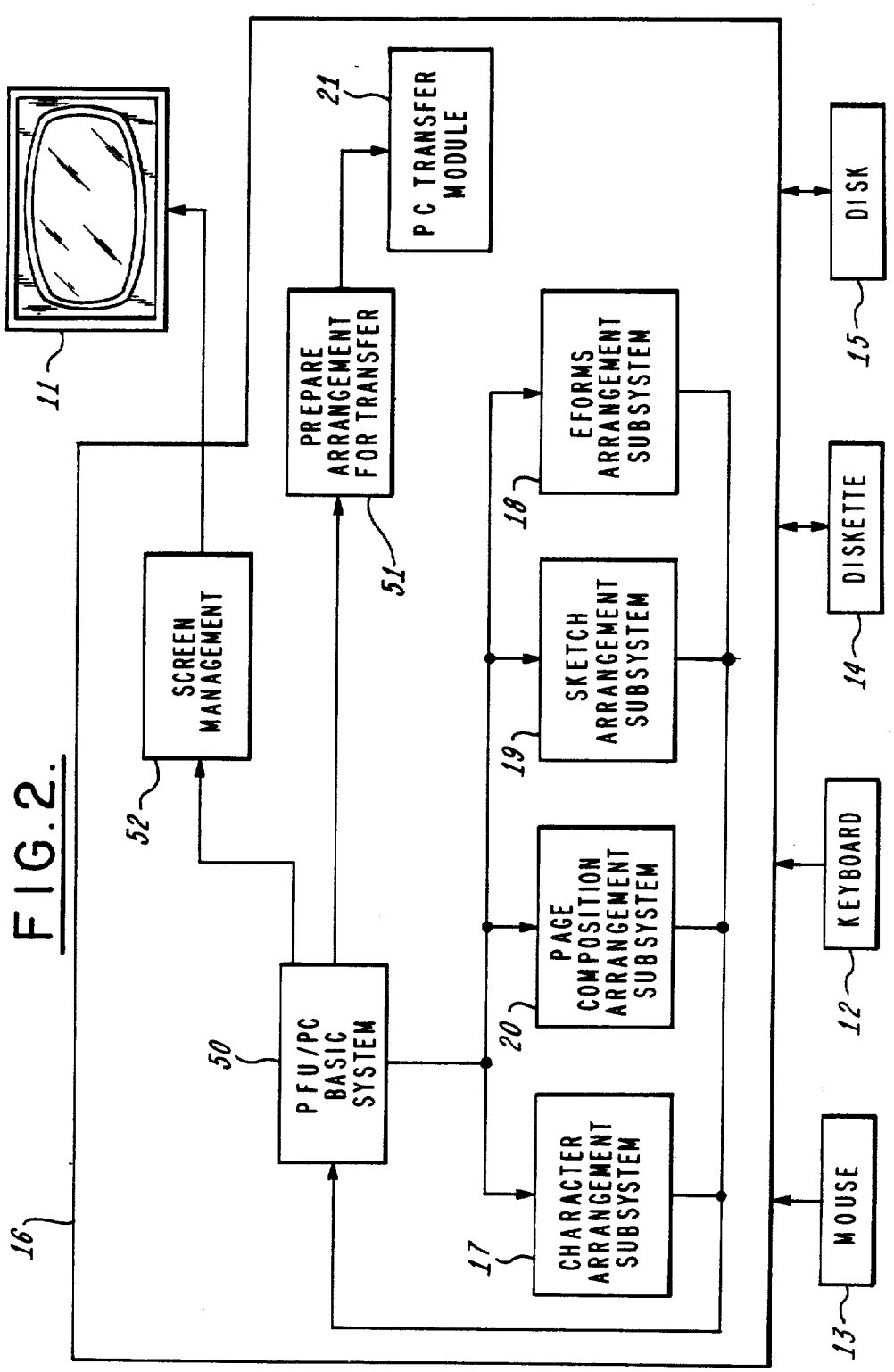
FIG. 2 is a schematic block diagram of the PC PFU/PC portion of the system of the present invention illustrated in FIG. 1.

Referring to FIG. 2, in which like reference numerals indicate like components with respect to FIG. 1, further details of the PFU/PC portion of PFU are illustrated. PFU/PC 16 is comprised of a Basic System 50 and the Character Arrangement Subsystem 17, the EFORMS Arrangements Subsystem 18, the Sketch Arrangement Subsystem 19 and the Page Composition Arrangement Subsystem 20. PFU/PC also includes the Prepare Arrangement for Transfer function 51 that generates the PC Transfer Module 21, in a manner to be described. The Subsystems 17–20 and the function 51 are all accessible from the Basic System 50. The Subsystems 17–20 create output modules for transfer to the OS1100 System 31 and prepared for that transfer by the Prepare Arrangement for Transfer function 51. PFU/PC 16 is menu-driven with several levels of pop-up windows and propting screens generated depending on the function being performed. Preferably, PFU/PC is implemented in Turbo Pascal utilizing functions witin the language for all of the screen management. The screen management function is depicted by a Screen Management Block 52 for putting the screens up on the display 11, in a manner to be detailed. The PFU/PC Basic System 50 provides the PFU/PC Main Menu Screen as follows for accessing each of the Subsystems 17–20 and 51.

| UNISYS Print File Utilities |
|---|
| Character Arrangement Subsystem |
| Electronic Forms Arrangement Subsystem |
| Sketch Arrangement Subsystem |
| Page Composition Arrangement Subsystem |
| Vertical Format Buffer Subsystem |
| Tab Buffer Subsystem |
| Prepare for Transfer |
| Function Keys:                F10 = EXIT |

PFU/PC MAIN MENU SCREEN

As indicated on the Main Menu Screen, the available subsystems include Character, Electronic Forms, Sketch, Page Composition, Vertical Format Buffer, and Tab Buffer Arrangements. PFU/PC 16 also includes the Prepare Arrangement for Transfer function 51 to prepare any of the arrangements for transfer to the OS1100 System 31. The function 51 is selected by the "Prepare for Transfer" menu item. The menu items are selected as described above via the keyboard 12. When a particular menu item is selected, control is transferred to the appropriate Block 17–20 or 51 for performing the associated functions to be described.

Briefly, the following describes the menu item selections:

Character Arrangement: This selection creates a new Character Arrangement or modifies an existing one as well as the associated translate tables and fonts.

Electronic Forms Arrangement: This selection creates a new Electronic Form Overlay or modifies an existing one.

Sketch Arrangement: This selection creates a new sketch or modifies an existing one and provides the means to draw sketches or simple graphics, such as signatures and logos, for eventual printing on the supported printer 41.

Page Composition Arrangement: This selection creates or modifies the layout of a phyical page and each of its logical pages.

Vertical Format Buffer: This selection creates a vertical format buffer.

Tab Buffer: This selection creates a Tab Buffer.

Perpare for Transfer: This selection prepares the module set produced by any of the PFU/PC Subsystems 17-20 for transfer to the OS1100 System 31.

Several subsystems of PFU/PC 16 creates "Arrangements". An Arrangement generally is a named logical grouping of printer-related data structures. An Arrangement ties together all of the printer-related data structures that would normally be utilized together but, prior to the present invention, had to be accessed individually. With PFU/PC, the user names each Arrangement created thereby so that the user can refer to it by that name whenever access to all of the parts thereof is desired.

For example, when the user desires to print with an italics character set on a non-impact system printer, it might be necessary for the user to create and load into the printer several translate tables, for example, one ASCII and one Field Data, and several fonts, for example, one with upper case characters, one with lower case and one with special symbols. Utilizing the Character Arrangement Subsystem 17, the user can create a Character Arrangement containing each translate table and font and can name the Arrangement ITALICS. The ITALICS Character Arrangement can then be prepared for transfer, sent to the OS1100 System 31, and converted to multiple omnibus elements, in a manner to be described. The multiple omnibus elements would specifically comprise one character arrangement element, two translate table omnibus elements, and three font omnibus elements. Thereafter, any reference to the ITALICS Character Arrangement, via the Control Image Subsystem of PFU/1100 would access both translate tables and all three fonts.

When the Character Arrangement Subsystem selection is made from the Main Menu Screen, the basic system 50 transfers control to the Character Arrangement Subsystem 17. The Character Arrangement Subsystem 17 permits the PC 10 to be utilized to design and create special fonts and associated translate tables for use with the printer 41. The Character Arrangement Subsystem 17 can be utilized for special printing requirements, such as printing symbols and adding foreign language characters or accent marks, or to change or improve the appearance of the printed output. The Character Arrangement Subsystem 17 creates characters of any desired shape or style. A character image is created by drawing a pixel-by-pixel representation of the desired character in a drawing grid on the PC display 11, in a manner to be explained. A pixel is the smallest addressable display point on a device and is therefore the smallest addressable area of a character recognized by the printer 41.

Referring to FIG. 4, a sample character image for the letter E is illustrated. Each square in FIG. 4 represents a single pixel. The shaded squares represent pixels that are on. These are the areas actually printed to create the character image. The bland squares are pixels that are off and represent the white space that is part of every character image.

Figure 5:
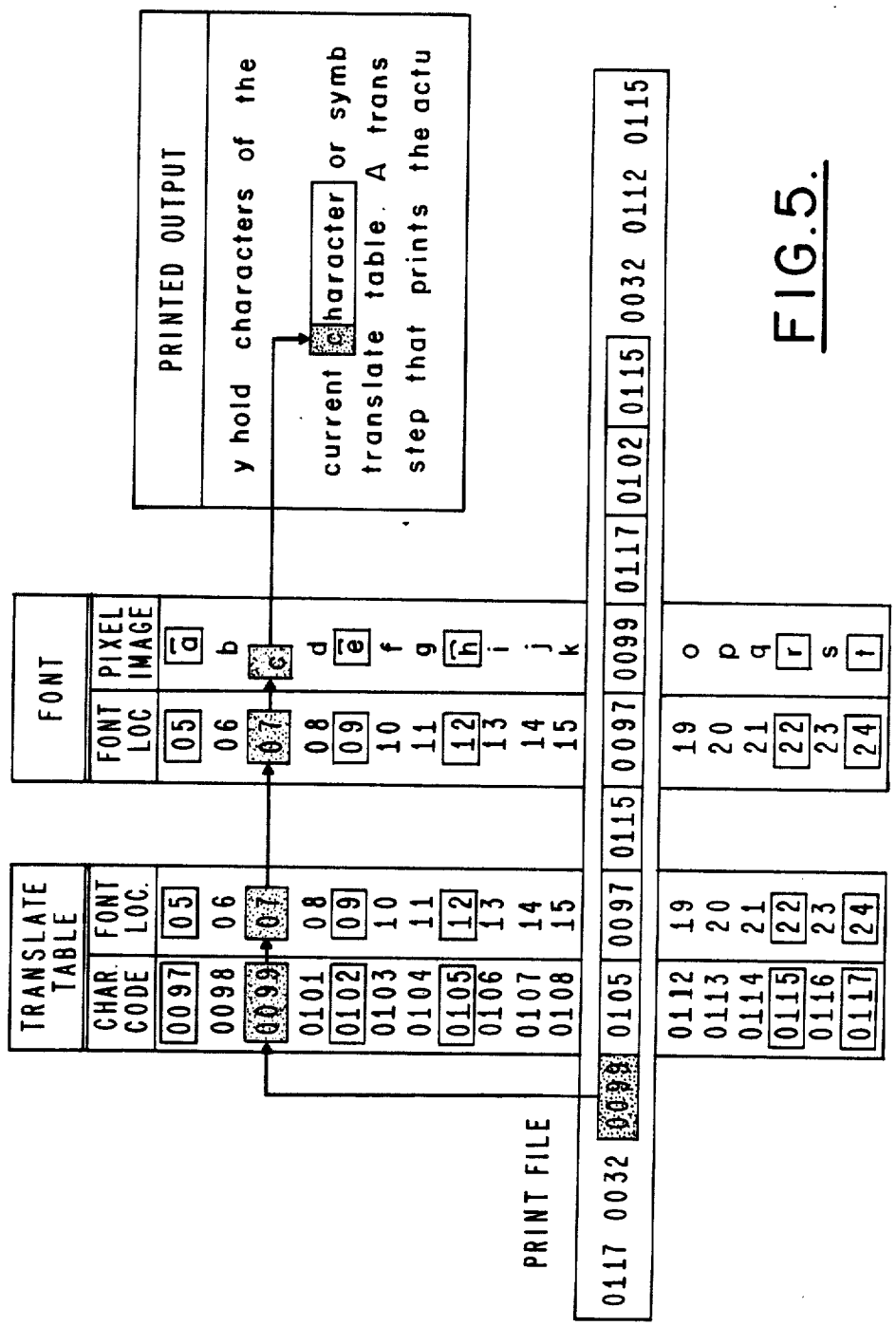
FIG. 5 is a graphical representation useful in describing character arrangements illustrating the relationship between the data in a print file, a translate table, a font, and a the final printed output.

The character images created by the Character Arrangement Subsystem 17 are stored, in manner to be described, in structures called fonts. A font can contain a single character or an entire set of characters. To utilize the character images in a font when printing, a translate table is also requred. A translate table ralates the character codes in the print file to the desired character images in the font. Each character code in the print file points to a translate table entry that in turn provides the font name and a pointer to the pixel data within the font for that character code. OS1100 print files support ASCII, EBCDIC and Fieldata data types requiring associated translate tables. Referring to FIG. 5, the relationship between the character code data in a print file and a ASCII translate table, a font, and the final printed output is illustrated. The shaded print illustrates the path utilized to print the letter "c" and the boxes show the remainder of the letters required to print the word "Character".

Collectively, one or more fonts and one or more translate tables form a character arrangement—a named logical grouping of the printer-related data structures normally used together to print characters in a given print style. In a manner to be described, the Character Arrangement Subsystem 17 names each character arrangement created thereby so that the character arrangement can be referred to by that name whenever access to any or all of its parts is desired. Prior to the present invention, each of the parts had to be accessed individually. In a manner to be illustrated, a character arrangement consists of a character arrangement module, one or more translate tables (each in its own module), and one or more fonts (each in its own module). The Character Arrangement Subsystem 17 is utilized to create and/or modify character arrangements and their associated translate tables and fonts. The modules are organized and stored in the disk system 15 in a data structure hierarchy as follows:

CHARACTER ARRANGEMENT MODULE

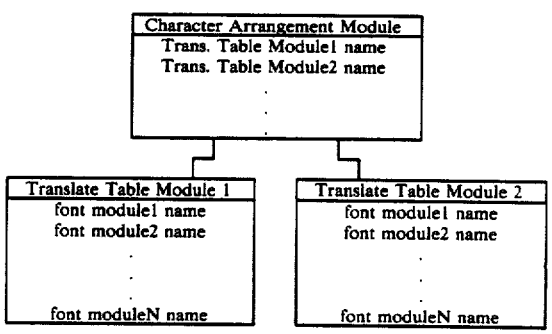

-continued

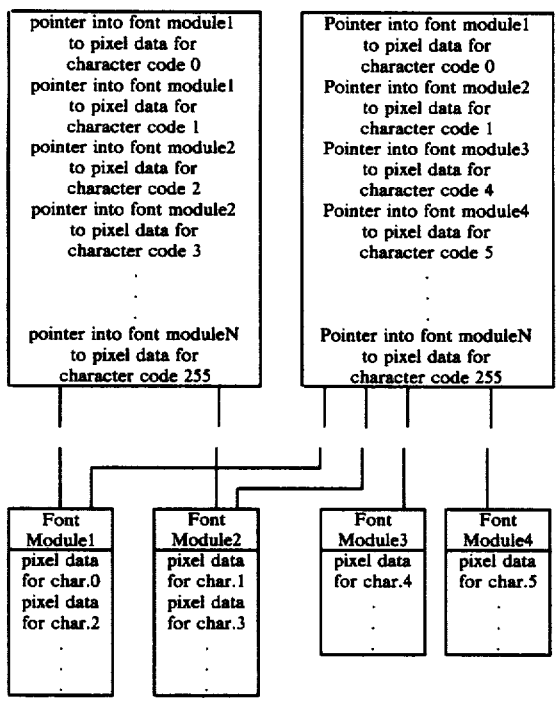

The character arrangement module is at the highest level and functions as the directory for the character arrangement. The character arrangement module names all the translate table modules that are part of the arrangement. The translate table modules, in turn, name all font modules referenced from them which are part of the arrangement. Each translate table module provides the association or mapping between the character codes in the print file data and the character image that is to be printed for each character code. Each character code in the print file data is used as an index into the translate table, where each entry provides the font module name and a pointer into that font module to the record number that has the pixel data for that character code. Each font module contains and provides the actual pixel data for each character image it defines. The translate tables that are part of a character arrangement normally provide for one or more of the standard translations available on OS1100 systems (ASCII, EBCDIC, or Fieldata) for the character images that are in the font. For example, both ASCII and Fieldata translate tables that reference the same characters in the same font modules for the assiciated pixel may be provided. The character codes used are different for an ASCII "A" and a Fieldata "A", but the character images can be the same.

Figure 3:
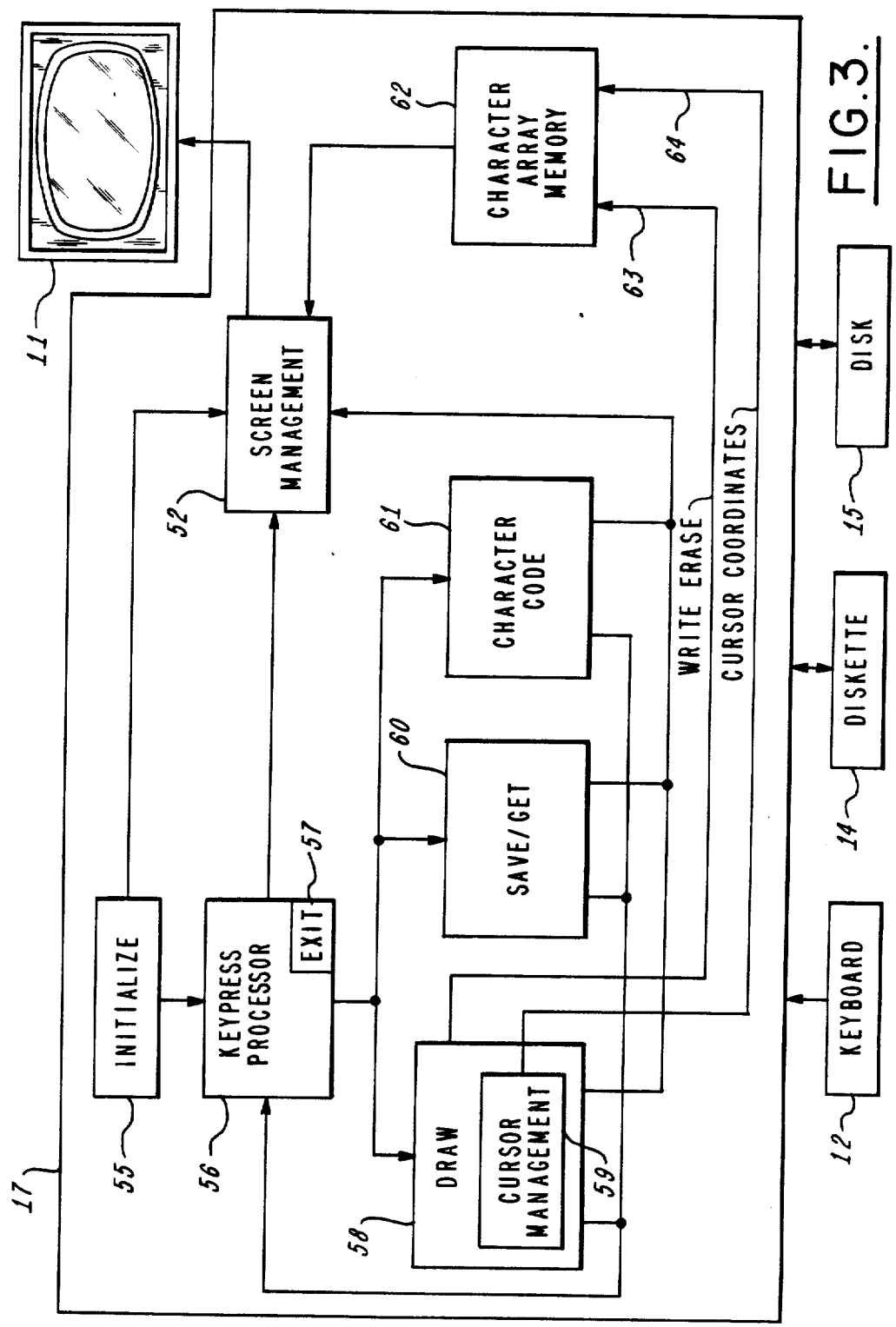
FIG. 3 is a schematic block diagram of the Character Arrangement Subsystem Block of FIG. 2.

Referring to FIG. 3, in which like reference numerals indicate like components with respect to FIG. 2, a schematic block diagram of the Character Arrangement Subsystem 17 of FIG. 2 is illustrated. An Initiallize block 55, via the screen management block 52, generates and puts up on the display screen 11 appropriate prompts for the user to enter required data via the keyboard 12. The user, for example, is prompted to provide the name of of character arrangement, font module and translate table as well as a character code to be utilized in creating or modifying a character. If it is desired to modify an existing character arrangement, translate table or font, lists of the corresponding names are accessed by the initialize block 55 from the disk system 15 and placed on the screen 11 so that the user may select therefrom. Generally, the Initialize block 55 with the screen management block 52 formats the information screen with a NEW NAME prompt and a list of the existing names. If NEW NAME is selected, the new name is entered by the keyboard 12 and is associated with the corresponding arrangement, transfer table or font. If a new translate table is to be created, the user is prompted to enter the translate table type as well as the name. The type determines how the character codes entered are to be translated in accordance with known conventions.

Specifically, if a character arrangement that already exists on the disk system 15 is selected, the selected character arrangement module contains the names of all of the associated translate table modules it uses. The hierarchical storage of this information was discussed above with respect to the character arrangement module data structure on the disk 15. If a new translate table name is entered, the character arrangement module data structure is modified to enter the name in the character arrangement module and a new translate table module is created therefor. The selected translate table module has associated with it one or more font modules and the names thereof are displayed in a menu for selection. If a new font module is named, provision is made therefor in the Character Arrangement Module stored on the disk 15. The user is also prompted to enter the character code of the character to work with from the current font module.

Figure 6:
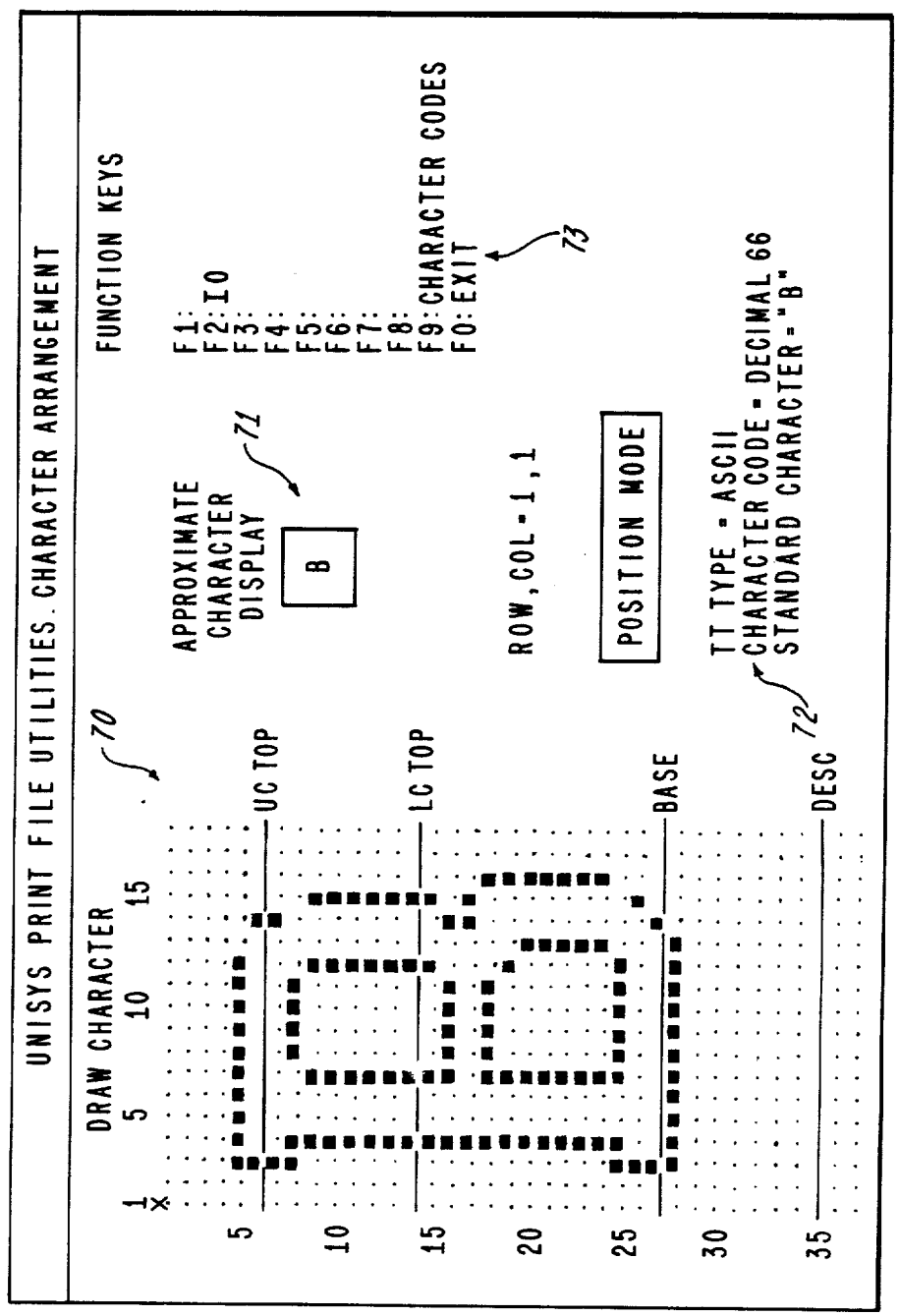
FIG. 6 is an illustration of the Create Character Screen generated in the operation of the Character Arrangement Subsystem Block detailed in FIG. 3.

After the Initialize block 55 completes the selection and definition process, the Initialize block 55 displays the Create Character Screen as illustrated in FIG. 6. Control is then transferred to a Key Processor block 56 that contains an Exit block 57. The Key Press Processor 56 detects entry of key presses from the keyboard 12 and passes control to the appropriate function. Eventually control is returned to the Key Press Processor 56 to detect further user key entries. If the Exit function is entered, control exits the Character Arrangement Subsystem 17 via the Exit block 57 and returns to the PFU/PC basic system 50 of FIG. 2.

The Character Arrangement Subsystem 17 of FIG. 3 includes a Draw function 58 which includes a Cursor Management function 59. Also included is a Save/Get function 60 and a Character Code function 61. The Draw function 58, the Save/Get function 60 and the Character Code function 61 provide inputs to the Screen Management function 52 and return to the Key Press Processor 56 when the respective functions have been performed. The Character Arrangement Subsystem 17 also includes a charater array memory 62 that stores the created character, in a manner to be described. The character array memory 62 provides an input to the Screen Management function 52 for the purpose of displaying the current character on the Create Character Screen of FIG. 6 which is put up on the display 11. The Draw function 58 controls the character array memory 62 with respect to writing and erasing via a write/erase signal on a line 63. The locations of the character array memory 62 are addressed by the Cursor Management function 59 which provides the cursor coordinates for that purpose on a line 64.

With continued reference to FIG. 6, the Create Character Screen is divided into four areas: a draw character drawing matrix 70, an approximate character display 71, a current status display 72 and a function key definitions display 73. The Create Character Screen of FIG. 6 is displayed after the Initialize block 55 completes the selection and definition process described above. The drawing matrix 70 is provided for creating the desired character image, pixel-by-pixel. The Create Character Screen exemplified in FIG. 6 shows the letter "B" drawn in the draw character matrix 70. The upper case "B" is also illustrated in the approximate character display box 71. The current status display illustrates that the POSITION MODE is in effect, that the translate table type is ASCII and that the character code is decimal 66. The current cursor position is exemplified at row 1, cloumn 1 and the available functions are displayed as IO, Character Codes and Exit.

The drawing matrix 70 is the area of the Create Character Screen where a character is drawn by turning cells on and off. The Create Character Screen is initially displayed with the drawing matrix 70 containing the pixel data (character image) associated with the specified character code. If the specified character code has a character image associated with it in the current character arrangement module, then that character image is displayed in the draw character matrix 70. If a character image is not associated with the specified code, the matrix 70 will contain a blank grid and drawing begins from this point. Four guidelines are generated in the draw character matrix 70 to use as reference points when drawing characters. UC Top denotes the top of upper case characters. LC Top denotes the top of lower case characters. Base is the guideline for non-descender characters and Desc is the guideline for the bottom of the descender characters. The approximate character display 71 displays the character as it is being drawn in the draw character matrix 70 in a size approximating the appearance of the character when printed. Thus, the approximate character display 71 provides a smaller representation of whatever is currently in the draw character area 70.

The current status display 72 is utilized for displaying the current cursor position (row, column), the current drawing mode (POSITION, DRAW, or ERASE), the current character code and the translate table type. The function key definitions area 73 defines the available function keys. If F2 is pressed, the key press processor 56 transfer control to the Save/Get function 60 to be further described with respect to FIG. 3. If function key F9 is pressed, the key press processor 56 transfers control to the Character Code function 61 to be further described with respect to FIG. 3. If the function key FO is pressed, the Character Arrangement Subsystem 17 is exited via the Exit block 57 of FIG. 3.

Referring again to FIG. 3 with continued reference to FIG. 6, the Draw function 58 operates in three modes: the POSITION MODE, the DRAW MODE, and the ERASE MODE. These modes are enabled by respective predetermined key presses. When the Key Press Processor 56 detects one of these predetermined keyboard entries, control is transferred to the Draw function 58. The POSITION MODE, DRAW MODE, and ERASE MODE refer to the movement of the cursor through the drawing matrix 70. Cursor movement is effected by the appropriate cursor control keys on the keyboard 12 and is managed by the Cursor Management function 59. The Cursor Management function 59 provides the current cursor coordinates on line 64. Each mode is turned on by pressing the key associated therewith. When the POSITION MODE is in effect, the cursor is moved within the matrix 70 without changing the pixels through which the cursor moves. The POSITION MODE permits cursor positioning without drawing or erasing. The POSITION MODE is utilized to locate the cursor at the desired starting point for drawing or modifying a character image. In the POSITION MODE, no addressing or control signals are applied to the character array memory 62 via the lines 63 and 64. In the DRAW MODE, movement of the cursor through a pixel turns the cell on. Since the DRAW MODE permits turing on the pixels in the drawing matrix 70, the character image drawn pixel-by-pixel as the cursor is moved. In the DRAW MODE, the cursor management function 59 addresses, via the cursor coordinates line 64, the location in the character array memory 62 corresponding to the current drawing matrix position and the draw function 58 sets the signal on the line 63 to WRITE. In the ERASE MODE, movement of the cursor within the matrix 70 turns the cells off. The ERASE mode thus permits erasing the character image in the matrix 70 pixel-by-pixel as the cursor is moved. In the ERASE MODE, the cursor management function 59 addresses, via the cursor coordinates line 64, the location in the character array memory 62 corresponding to the current drawing matrix position. In the ERASE MODE, the draw function 58 sets the line 63 to ERASE.

Thus, it is appreciated, that the character that is drawn is represented in two different places, in two different ways. The character is displayed in the draw character matrix 70 and is stored in the character array memory 62. Every pixel position is represented in the memory 62 as a bit in the character array that is either on (BINARY ONE) or off (BINARY ZERO). These bit settings in the memory 62 are utilized by the Screen Management function 52 to draw the actual character on the screen in the matrix 70 as well as in the approximate character display 71. In a manner to be described, when the character is saved, the stored character array in the memory 62 is transferred off to the disk system 15 to be stored in the named font module in the named Character Arrangement Module, as discussed above with respect to the hierarchical character arrangement storage on disk.

When the Key Press Processor 56 detects that function key 2 has been pressed, control is transferred to the Save/Get function 60 which operates to save and get characters to and from the disk system 15 to store, modify and/or create. The Save/Get function 60 puts up a prompting screen (not shown) via the Screen Management function 52 to determine if a character is to be saved to disk or gotton from disk. When the Get prompt is selected, the user is prompted for the character code of the desired character. The font module contains the desired character is accessed and the pixel array is transferred from the disk system 15 to the character array memory 62. The character is thus displayed on the Create Character Screen in the drawing matrix 70. If the Save prompt is selected, the character currently displayed in the draw character matrix 70 is saved to the disk system 15 in the current font module. This is effected by transferring the stored pixel data in the character array memory 62 to the appropriate font module on the disk system 15. The current translate table module is also updated by inserting the character pointer therein to be utilized as an index to the saved character.

When the Key Press Processor 56 detects depression of function key 9, control is transferred to the Character Code function 61. The Character Code function 61 permits manipulation of the character codes in various ways, including copying existing characters to other character codes without recreating the characters.

The Character code function 61 puts up a prompting screen (not shown) via the Screen Management function 52 which provides two prompts: "Copy Current Character to Different Code" and "Attach Character to Another Code". The Copy Current Character option permits the user to make a copy of the current character image and associate it with another character code. This option permits the user to design new characters from existing characters. A prompt is displayed for entry of the new character code that is to be associated with the copied character image. The current character array from the character array memory 62 is copied to the record in the Character Arrangement Module on the disk system 15 that represents the selected character code.

If the Attach Character to Another Code option is chosen additional character codes may reference the same character image. The same pixel data may be referenced then by several character codes. The user is prompted to enter the new character code that will also reference the current character image and this information is entered into the Character Arrangement Module out on the disk system 15.

If the Key Press Processor 56 detects depression of function key FO, the Character Arrangement Subsystem 17 is terminated via the Exit block 57.

Referring again to FIG. 2, when the electronic forms arrangement subsystem option is selected from the PFU/PC main menu screen discussed above, the basic system 50 transfers control to the EFORMS arrangement subsystem 18. The EFORMS arrangement subsystem 18 creates and modifies EFORMS for use with print files that are printed on the supported printer 41 (FIG. 1). The created and modified EFORMS are displayed on the graphics screen 11, in a manner to be described. The EFORMS arrangement subsystem 18 creates an EFORM arrangement, which is a named logical grouping of the printer related data structures required to print the EFORM. The complete definition of the EFORM created or modified includes the data for each character, shape, special symbol, or sketch to be printed on the form. Additionally, any character and/or sketch arrangements required for the translation of the data into print images are included. Thus, an EFORM arrangement consists of the EFORM arrangement module and the character and sketch arrangements to be utilized when printing the EFORM arrangement. The EFORM arrangement module is structured as follows:

| EFORM ARRANGEMENT MODULE |
|---|
| EFORM data for each shape, character, special symbol and sketch on the EFORM |
| character arr. name for boxes/lines/shading |
| character arr. name 1 |
| character arr. name 2 |
| . |
| . |
| sketch arr. name 1 |
| sketch arr. name 2 |
| . |

| -continued |
|---|
| EFORM ARRANGEMENT MODULE |

The EFORM arrangement module serves as the directory for the EFORM arrangement by naming all character and sketch arrangements referenced from the EFORM.

When an EFORM is created, lines and boxes can be drawn on the form, areas can be shaded, text can be placed on the EFORM and PFU-created sketches can be inserted on the EFORM. The conversion subsystem in the PFU/1100 portion 30 (FIG. 1) to be later discussed generates an EFORM module from the shapes drawn on the EFORM by the user. This module contains the character code data required to produce each line of the EFORM on the printed page. All of this user supplied data is ultimately contained in the EFORM module in character code form, along with a reference to the name of each character and sketch arrangement required to print this data. The character and sketch arrangements required to produce the boxes, lines, shading and sketches must be generated by PFU in the manner described herein and available on the OS1100 system 31 (FIG. 1) whenever the EFORM is accessed by PFU/1100 and whenever a file using the EFORM is printed. Each character arrangement and sketch arrangement explicitly named by the user during the EFORM creation is considered part of the arrangement by reference or association only. These referenced arrangements are not physically part of the EFORM arrangement in that they are not prepared for transfer to the OS1100 system 31 when the EFORM arrangement is prepared nor are they converted when the EFORM conversion is performed by PFU/1100. The preparation and conversion of the reference arrangements are separately accomplished as explained herein with respect to these arrangements. However, in a manner to be described, the arrangement included by reference are utilized when generating the control images for the EFROM arrangement. Thus, an EFORM is created on the PC 10 and transferred form the PC to the OS1100 system 31 where it is converted by the PFU/1100 portion 30 into a printer specific omnibus element.

In creating an EFORM, the user can draw horizontal or vertical lines in solid, dotted or dashed style; draw boxes in solid, dotted or dashed style; insert constant horizontal or vertical text; and insert sketches such as signatures, logos, graphics, and the like.

Figure 7:
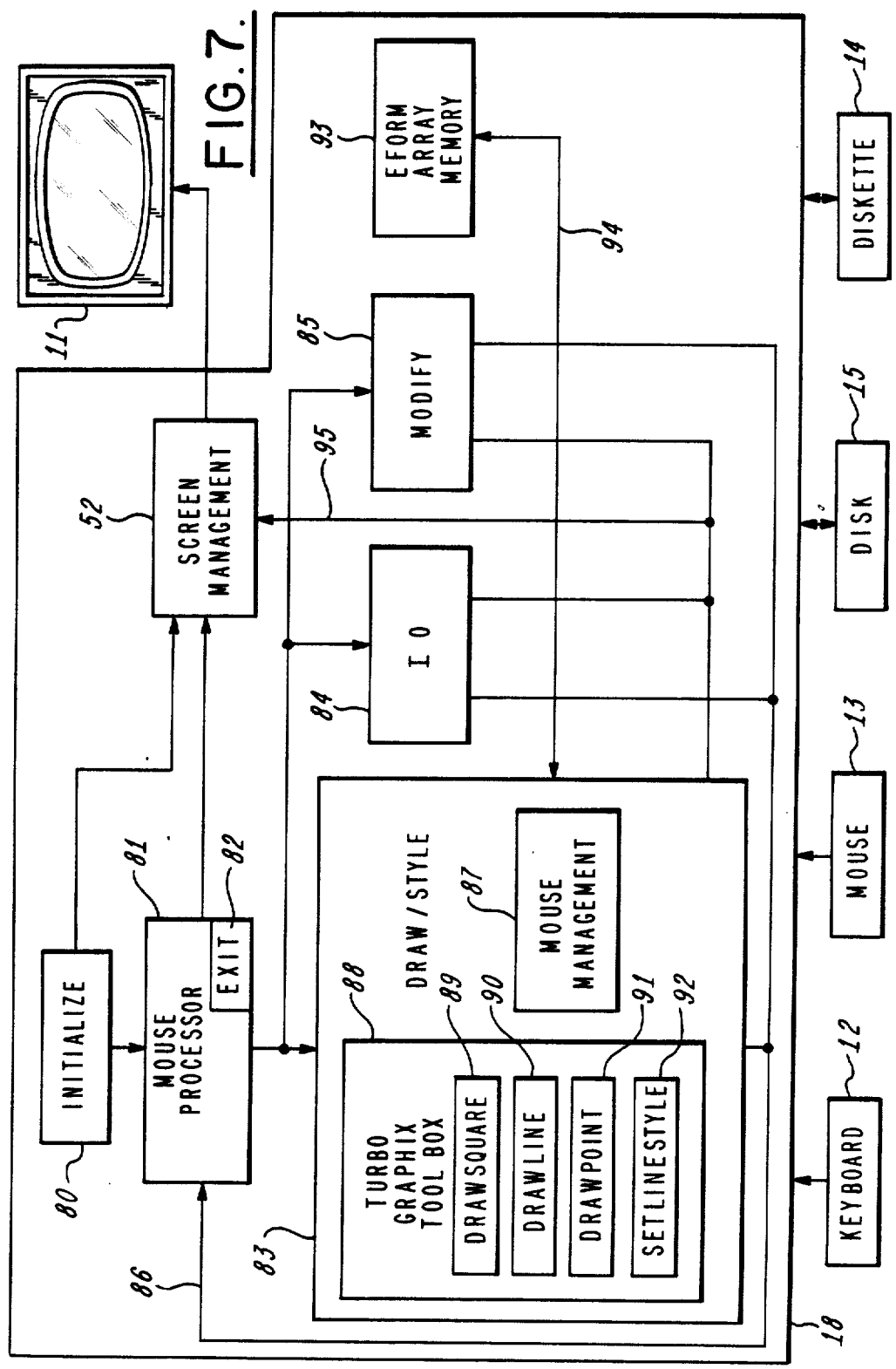
FIG. 7 is a schematic block diagram illustrating details of the EFORMS Arrangement Subsystem Block of FIG. 2.
Figure 8:
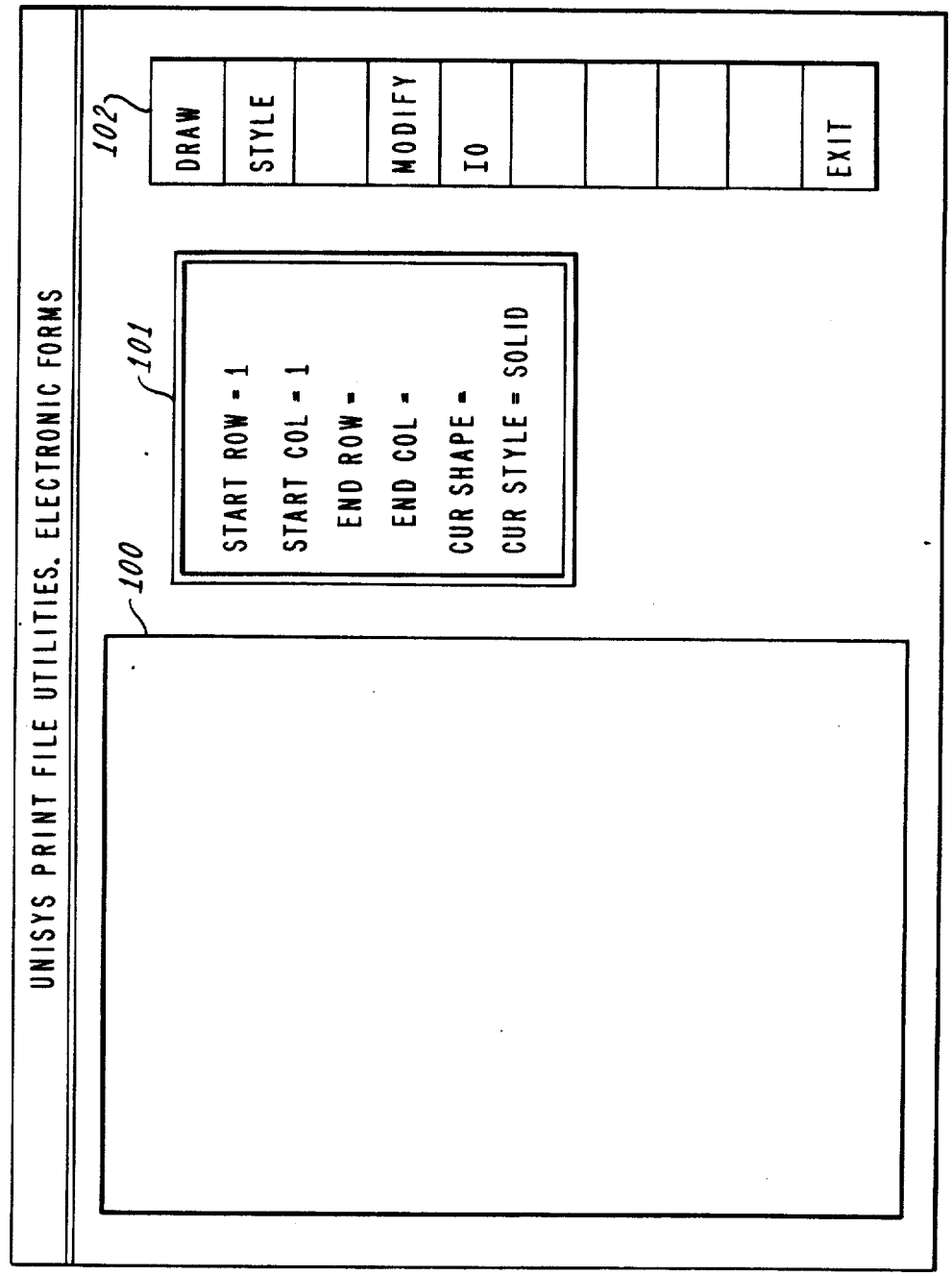
FIG. 8 is an illustration of a screen utilized in the operation of the EFORMS Arrangement Subsystem Block of FIG. 2 in creating or updating an electronic form.

Referring to FIG. 7, in which like reference numerals designate like components with respect to FIG. 2, a schematic block diagram of the EFORMS arrangement subsystem 18 is illustrated. FIG. 8 depicts the create EFORM screen put up by the EFORMS arrangement subsystem 18 for creating the EFORM. The electronic forms are manipulated by utilizing the two button mouse 13. To create an electronic form, the user names it and specifies the form size. A proportionately smaller outline of the form is displayed at the drawing area on the create screen of FIG. 8. The user then can create an EFORM within this drawing area by selecting one or more of the functions shown on the right side of the create screen and supplying requested information and positioning parameters. All commands can be chosen by moving the mouse cursor to highlight the desired command on the right side of the screen and pressing the left mouse button. For example, if the user desires to place a line across the electronic form, the user first selects the Draw function and the Line Horizontal option from the pop-up menu that is displayed. The user then marks the starting and ending points of the desired line by positioning the mouse cursor to these points within the drawing area and pressing the left mouse button. The line is displayed on the screen as the user creates it. The user draws the entire EFORM on the screen in this manner creating associated data for the output modules.

Referring to FIG. 7, the EFORMS arrangement subsystem 18 includes an initialize function 80 that prompts the user for the name and size of the EFORM to be created or modified via the screen management function 52 and the display screen 11. To create a new EFORM, the size of the form must be specified. If the user desires to modify an existing EFORM, the size was previously specified and is stored in the system. The initialize function 80 provides a series of screens that prompts the user for the necessary selection and definition information. A menu screen (not shown) provides a new EFORM option as well as list of existing EFORM names. If the user chooses to create a new arrangement, the user is prompted to enter the name thereof and further prompted for the number of rows and columns to be utilized for the new form. If the user desires to modify an existing form, the name thereof is selected from the menu. After the initialize function 80 completes the selection and definition process for the EFORM, the initialize function 80 puts up on the display 11 via the screen management function 52 the create EFORM screen illustrated in FIG. 8.

Control is then passed to a mouse processor function 81 that includes an exit function 82. The mouse 13 is utilized to select a function on the righthand side of the create EFORM screen of FIG. 8. The mouse processor 81 via the screen management function 52 causes each item in the function menu to be highlighted as the mouse 13 is moved vertically. When the desired function is highlighted, the left mouse button is pressed to select the function. The mouse processor 81 transfers control to the selected function. The mouse processor 81 can transfer control to a draw/style function 83, an I/O function 84, and a modify function 85. After the selected function is performed, control returns to the mouse processor 81 via a path 86. The mouse processor 81 then determines if the exit function has been selected. If the user requested to exit, the EFORMS arrangement subsystem 18 is terminated via the exit block 82 and control returns to the PFU/PC basic system 50 of FIG. 2.

The mouse 13 is utilized to position a cursor within the drawing area of the create EFORM screen of FIG. 8 when drawing an EFORM. Moving the mouse 13 in any direction causes the cursor to move in that direction. The draw/style function 83 includes a mouse management function 87 that keeps track of the movement of the mouse 13 and moves the cursor accordingly. The mouse management function 87 provides the current cursor coordinates. The draw/style function 83 also utilizes a Turbo Graphix Toolbox 88 available from Borland International. The Toolbox 88 is utilized to draw all of the shapes on the create EFORM screen of FIG. 8. The Toolbox 88 includes DRAWSQUARE 89 for drawing boxes; DRAWLINE 90 for drawing lines; DRAWPOINT 91 for providing dots representative of text and SETLINESTYLE 92 for controlling the style of the lines and shapes to be drawn.

The EFORMS arrangement subsystem 18 includes an EFORM array memory 93 which provides PC working storage for the EFORMS arrangement subsystem 18. The Toolbox 88 is utilized in conjunction with the mouse management function 87 to create the appropriate EFORM data to be transferred to the memory 93 via a path 94. The draw/style function 83, the I/O function 84, and the modify function 85 communicate with the screen management function 52 via a path 95 in putting up the various screens provided by these functions. The EFORM array memory 93 contains the data required by the Toolbox 88 for displaying the EFORM in the drawing area 100 of the create EFORM screen of FIG. 8 via the screen management function 52.

It is appreciated that the relative proportions of the sample form on the create EFORMS screen compared to that of the finished form on the printed page may not be the same because the character dimensions and the lines per inch are provided by PFU/1100. The column numbers and line numbers are transformed into positions on the printed page via a character-by-character placement of the EFORM data on the page in accordance with the character arrangement (for making the boxes, lines, spaces, etc.) specified by the user during the conversion process, to be described, and in accordance with the vertical format buffer that is loaded when the EFORM is printed.

Referring to FIG. 8, the create EFORM screen is divided into three areas; a drawing area 100, a current status display 101 and a functions display 102. The drawing area 100 is where the user creates or modifies the desired EFORM. A sample EFORM is outlined in the drawing area 100 in a proportional representation of the specified number of rows and columns. If an existing EFORM was selected, the current image of that form is shown in the drawing area 100. The named EFORM arrangement module is retrieved from the disk system 15 (FIG. 7) and placed in the EFORM array memory 93 for display in the drawing area 100 by the screen management function 52.

The current status display area 101 displays current information about the shape being created in the drawing area 100 such as the start row, start column, end row, end column, current shape and current line style. The functions display area 102 lists each function available in the EFORMS arrangements subsystem 18. The user highlights one of these functions utilizing the mouse 13 and then presses the left mouse button to cause that function to be performed. The mouse processor 81 discerns the button press transferring control to the associated function 83–85.

The format of the saved EFORM module, as described above, serves two purposes. The module, as stored on the disk system 15, contains sufficient information to draw the EFORM in the drawing area 100 of the create EFORM screen of FIG. 8, and the information must be sufficient to print the EFORM on the supported printer. Thus, the EFORM module stored on the disk system 15 contains the coordinate and style parameters required to define the shapes on the EFORM. This data is transferred to the EFORM array memory 93 where it becomes available to the Toolbox 88 for drawing the form on the screen via the screen management function 52. It is appreciated that the Turbo Graphix Toolbox 88 is formatted as a compiler which provides turbo pascal source code for providing the required graphics display functions. The schematic representation of the Toolbox of FIG. 7 depicts this arrangement.

Referring again to FIG. 7, with continued reference to FIG. 8, the EFORMS arrangements subsystem 18 processing is transparent to the type of printer on which the EFORM will be printed. No printer specific information is required when creating the EFORM. As a result, any EFORM created by PFU/PC can be printed on any of the supported printers. Any required printer specific information is entered on the OS1100 side after the EFORM module has been transferred thereto.

The EFORM module contains a header record identifying the module followed by the EFORM shape records. Each shape drawn on the EFORM is described in its own record. Thus, an EFORM with five shapes would have six records, one for the header, and one for each shape. EFORM modules are saved to the disk system 15 with a user supplied name.

Internally, in the memory 93, the EFORM record information is maintained in the same format as the records to be output to the disk system 15. Each record contains the following five fields:

| EFORM RECORD |
| --- |
| 1. Shape: Integer; (Type of Shape to be drawn) where: |
| Shape = 1 = Box |
| Shape = 2 = Horizontal Line |
| Shape = 3 = Vertical Line |
| Shape = 4 = Horizontal Text |
| Shape = 5 = Vertical Text |
| Shape = 6 = Shade Box |
| 2. Style: Integer; (Line Style of the Shape) where: |
| Style = 0 = Solid |
| Style = 1 = Dotted |
| Style = 2 = Dash |
| Style = 4 = Shaded |
| 3. Shaded: Boolean; |
| 4. Coord: ARRAY (1..4) OF Integer; (coordinates for shape) |
| Coord (1) = X start coordinate |
| Coord (2) = Y start coordinate |
| Coord (3) = X end coordinate |
| Coord (4) = Y end coordinate |
| 5. Text: STRING (160); (If Shape is Text: TEXT) |
| 6. CAMNum: Integer; |

CAMNum is a pointer. The header recorder of the EFORM module contains a list of names of all character arrangement modules used by the EFORM. If the current record shape is text, the CAMNum field will point to the character arrangement name, within the header list of names, to be utilized when printing the text for this record.

When the user selects the draw or style function from the function display area 102 of the create EFORM screen of FIG. 8, the mouse processor 81 transfers control to the draw/style function 83. Additionally, if draw is selected, the following menu is displayed from which the type of shape to be drawn on the current EFORM is chosen.

| SELECT A SHAPE TO DRAW |
| --- |
| Box |
| Box Shaded |
| Line Horizontal |
| Line Vertical |
| Text Horizontal |
| Text Vertical |

When style is selected, the following menu is displayed from which the user selects the line style (solid, dotted, dashed) to be used when drawing the selected shape.

| SELECT A LINE STYLE TO USE |
| --- |
| Solid Line |
| Dotted Line |
| Dashed Line |

When the draw function 83 is selected, and the shape selection screen displays the above menu containing the available EFORM shapes, the user highlights one of the shapes and presses the left mouse button. The cursor is placed into the EFORM drawing area 100 and the user positions the cursor with the mouse 13 to the point where the user wants the shape to begin and presses the left mouse button.

When the box option is selected, a box is drawn on the screen in the selected line style by enabling DRAWSQUARE 89. DRAWSQUARE 89 requires the XY coordinate of the upper left corner of the box and the XY coordinate of the bottom right corner of the box. The upper left corner coordinate is provided by pressing the left mouse button when the cursor is positioned in the drawing area 100 where the user desires to start this corner of the box. The mouse 13 is then moved in the appropriate direction and the mouse management function 87 provides the current XY coordinate which becomes the lower right corner of the box. DRAWSQUARE 89 draws the box between the two corners in accordance with the mouse movement. The starting point acts like a pivot and provides one corner of the box. The opposite corner of the box is moved to wherever the mouse is moved. The entire box is drawn and erased with the mouse movement. When the desired box is displayed in the drawing area 100, the left mouse button is pressed and the indicated box is then part of the EFORM in the current line style.

As the mouse 13 is moved, the current mouse position is constantly polled by the mouse management function 87, and DRAWSQUARE 89 draws a box at the new position. If the mouse 13 has been moved since the last poll, then the old box is erased before drawing the new one. This provides an on-screen impression of a dynamically drawn box increasing and decreasing in size (like a stretched rubber band) coordinated with the movement of the mouse 13.

When the Box Shaded option is selected, the same process as for Box is utilized except that a shaded box is drawn instead of a hollow box.

If either a horizontal line or a vertical line option is selected from the Shape Selection Screen Menu, DRAWLINE 90 is activated. The mouse 13 provides the XY coordinate for the line starting point and the XY coordinate for the line end point, which coordinates are provided to DRAWLINE 90. After the horizontal or vertical line option is chosen, the mouse cursor appears in the drawing area 100 and is positioned by the mouse 13 to the start point of the line to be drawn. The left mouse button is pressed to mark this point and the mouse 13 is then moved in the appropriate direction to provide the XY coordinate of the line end point to DRAWLINE 90. When the desired end point is attained, the left mouse button is again pressed to mark this point. The indicated line, in the current line style, is then permanently drawn between the chosen start and end points. DRAWLINE 90 draws the line in the same manner as DRAWSQUARE 89, creates a box. As the mouse 13 is moved, the mouse position is constantly polled, and the new coordinates are utilized to draw a new line, after erasing any old line that may have been drawn. Thus, movement of the mouse 13 in the appropriate direction causes an appropriate horizontal or vertical line to be dynamically drawn in the drawing area 100. The left mouse button is pressed to mark the start point of the line. The mouse 13 is moved to draw the line and when the line is the desired length, the left mouse button is again pressed to mark the line end point.

Selection of the style option in the function area 102 of the create EFORM screen of FIG. 8 is detected by the mouse processor 81 to cause the screen management function 52 to provide the style selection screen depicted above. The draw/style function 83 enables SETLINESTYLE 92 which controls the type of line to be utilized when drawing boxes and lines. The user selects from: solid line, dotted line, and dashed line. The appropriate selection is entered into SETLINESTYLE 92 as the control parameter. If the solid line option is chosen, all shapes are drawn in a solid, unbroken line until a different style option is selected. If the dotted line option is chosen, the shapes are drawn with a dotted line. The dashed line option controls drawing of the lines of the shapes with a dashed line.

The text options (horizontal and vertical) on the shape selection screen provides the user with the ability to place a horizontal or vertical line of text on the EFORM being created in the drawing area 100. Upon selecting the horizontal or vertical text option, the user is queried for the name of a character arrangement (that must contain an ASCII Translate Table) to be used when printing the text. The mouse cursor then appears in the drawing area 100 and is positioned by the mouse 13 to the starting point for the text. The user presses the left mouse button to mark this point. A prompting window is generated, either horizontally or vertically, depending on the option chosen into which the line of text is entered. The user then keys the line of text therein. Horizontal text is written from the left to right. Vertical text is written from up to down. When the line of text is entered satisfactory, the user presses the RETURN key on the keyboard 12. This text is then stored in the EFORM array memory 93 in ASCII code characters along with the starting point coordinate information obtained from the mouse. When the return key is pressed, the prompting window is removed and the line of text is represented on the screen as a sequence of dots, one dot for each character. The dots are drawn on the screen by activating DRAWPOINT 91 where the coordinate for each dot is provided thereto. The coordinates are generated by the draw/style function 83 in accordance with the nominal spacing between textual characters.

When the user selects the various shape and style options and enters coordinates as discussed above, the information for each shape is provided by the draw/style function 83 to the EFORM array memory 93 to be stored in the named EFORM arrangement module in the record format described above. This information is saved to the disk system 15 by selecting the IO option in the functions display area 102 of the create EFORM screen of FIG. 8. The information in the record provides the parameters to the Toolbox 88 for displaying a form in the drawing area 100. The information is also appropriate for creating the printer specific omnibus elements on the OS1100 side, in a manner to be described. If the shape is text, the text is stored in the record as a string of ASCII characters.

When the user selects the IO function in the function display area 102 of the create EFORM screen of FIG. 8, the mouse processor 81 transfers control to the IO function 84. The IO function controls the transfer of EFORM modules between the EFORM array memory 93 and the disk system 15. The IO function 84 permits EFORM modules to be saved to or retrieved from the disk system 15.

When the IO function 84 is selected, a menu screen (not shown) is displayed by the screen management function 52 listing the options that can be performed. The user can select from: Save EFORM and Get EFORM. The selection is made by the mouse 13 and entered by pressing the left mouse button. If Save EFORM is selected, the EFORM array in the memory 93 is written to the disk system 15. Each entry in the array is written as one record in the EFORM module. The structure of the EFORM module on the disk system 15, as well as in the memory 93, is hereinabove described. The EFORM module is saved with the current name previously provided therefor.

Selection of the Get EFORM option functions to retrieve an existing EFORM module from the disk system 15 or to create a new EFORM. A menu screen (not shown) is put up displaying the names of the available EFORMS and a "New EFORM" item. When an existing EFORM is selected from the menu, that EFORM module is transferred from the disk system 15. The records comprising the EFORM module are written from the disk system 15 to the EFORM array memory 93. The EFORM data within the module is provided by the path 94 to the draw/style function 83 wherein the Toolbox 88 draws the EFORM in the drawing area 100 in response thereto as described above. If the New EFORM item is selected, the name and size thereof is entered via the keyboard 12. The size data comprises the number of rows and the number of columns to be utilized for the EFORM, and will determine how large to make the EFORM on the screen. After the sizes are entered, a blank EFORM of the specified size is then drawn in the drawing area 100.

Figure 9:
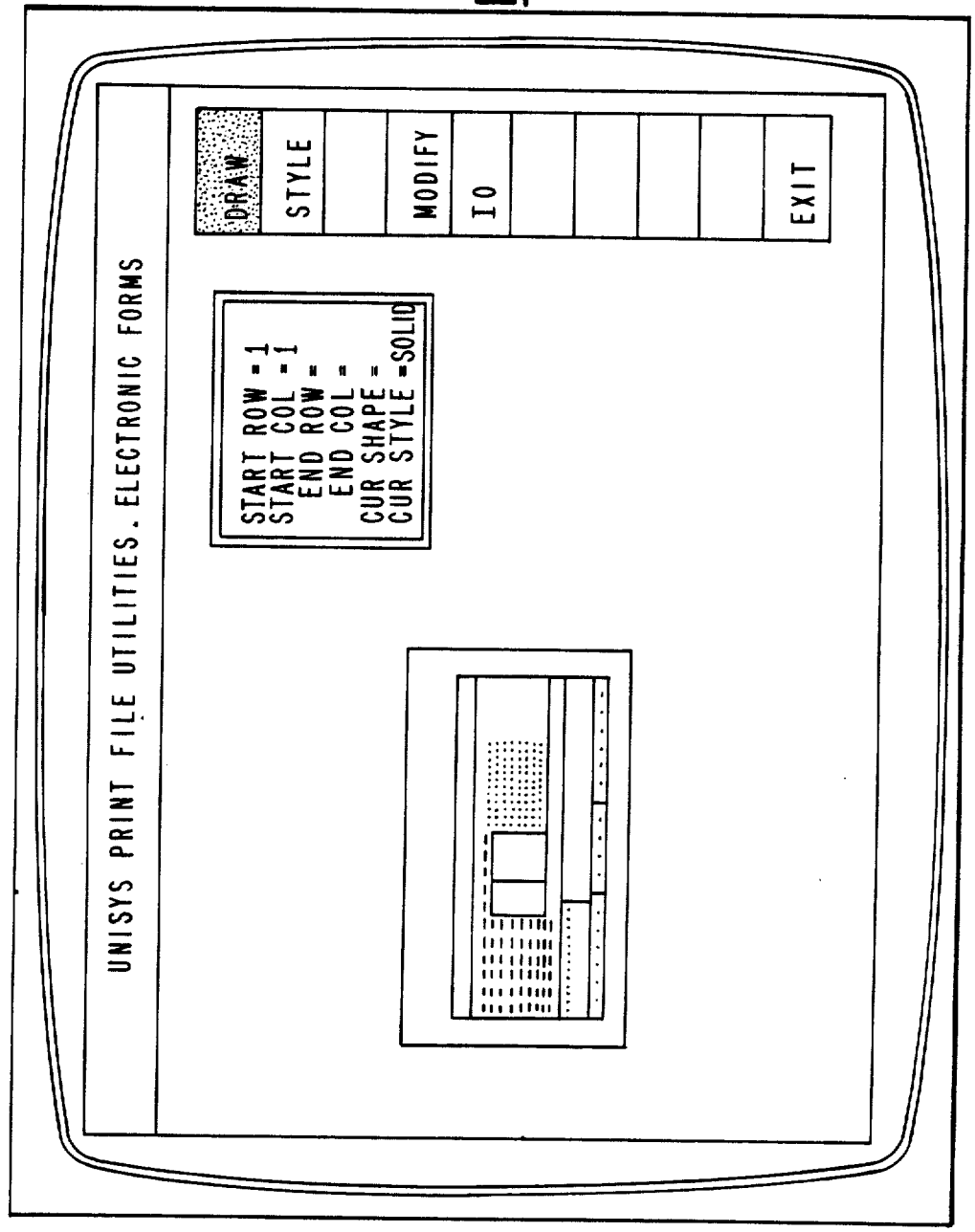
FIG. 9 is an illustration of the screen of FIG. 8 with an electronic form (EFORM) partially created by the operation of the EFORMS Arrangement Subsystem Block of FIG. 2.

Referring to FIG. 9, the create EFORM screen of FIG. 8 with a partially created EFORM is illustrated. It is seen that the system is in the draw mode, as controlled by the draw/style function 83 of FIG. 7, since the draw item is highlighted in the function display area of the screen.

Referring again to FIGS. 7 and 8, if the modify function is selected in the function display area 102, the mouse processor 81 transfers control to the modify function 85. The modify function 85 provides the user with the ability to perform various operations on the EFORM currently displayed in the drawing area 100 or on individual shapes that appear on the form. Such operations include Move Shape, Delete Shape and Zoom EFORM. When the modify function is selected, a menu (not shown) is displayed by the screen management function 52 listing the available operations. The selection is made utilizing the mouse 13 and entered by pressing the left mouse button.

The Move Shape option is selected to move a shape displayed on the EFORM in the drawing area 100 to another location. Utilizing the mouse 13, the mouse cursor is moved to point to the desired shape and the left mouse button is pressed. The selected shape is moved by moving the mouse 13 to the new location and the left mouse button is again pressed. The new coordinates for the shape replace the old coordinates in the EFORM array memory 93 so that the Toolbox 88 will draw the selected shape at its new location.

The Delete Shape option provides the user with the ability to delete any shape currently on the EFORM in the drawing area 100. The mouse 13 is utilized to identify the shape, as described above with respect to the Move Shape option, and pressing the left mouse button causes the shape to be deleted. The coordinate data for the shape is erased from the EFORM array memory 93.

Figure 10:
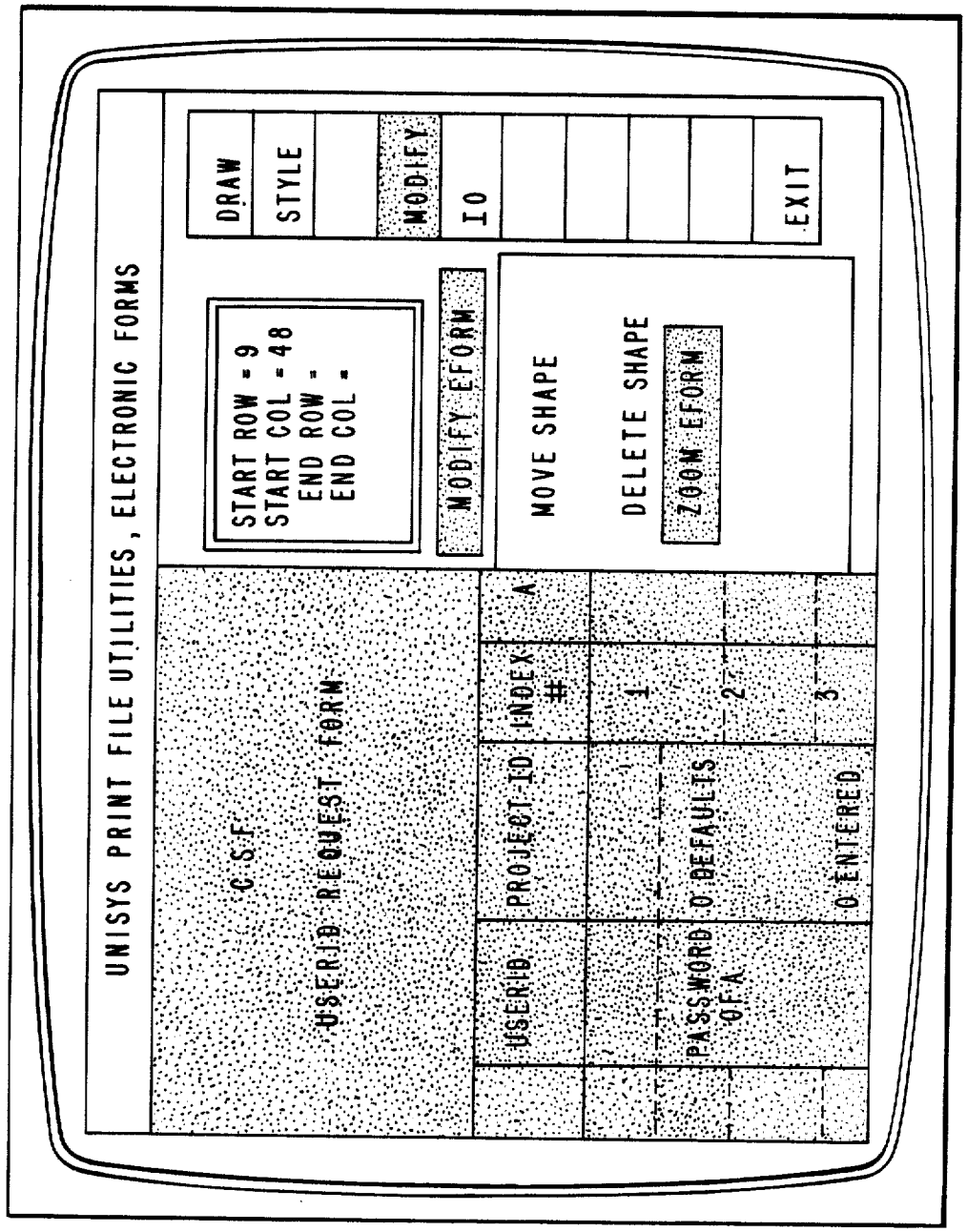
FIG. 10 is an illustration of the screen of FIG. 9 exemplifying the EFORM zoom feature of the EFORMS Arrangement Subsystem Block of FIG. 2.

The Zoom EFORM option provides the user with the ability to examine an enlarged version of any section of the EFORM that is currently displayed in the drawing area 100. When Zoom is selected, a box representing 47 columns and 24 rows is displayed on the EFORM. The box is positioned over the EFORM by moving the mouse 13. When the box surrounds the data to be enlarged, the left mouse button is pressed and a new display is generated showing the actual text and shapes approximately as they will appear when printed. The selected area is displayed on the screen in enlarged form that approximates the pixel level of the printer. FIG. 10 illustrates the display screen with the Zoom function applied to an EFORM.

When the user has completed creating or modifying an EFORMS arrangement, the exit function is selected in the function display area 102 and the mouse processor 81 will exit from the EFORMS arrangement subsystem 18 via the exit block 82.

Referring again to FIG. 2, if the user selects the sketch arrangement subsystem option from the PFU/PC main menu screen, the PFU/PC basic system 50 transfers control to the sketch arrangement subsystem 19. The sketch arrangement subsystem 19 provides the user with the means to draw sketches or simple graphics (such as signatures, logos and multi-cell characters) for eventual printing on the supported printer 41 (FIG. 1). A sketch is defined as a user-drawn picture that cannot fit within the confines of one character cell in the destination printer. The sketch arrangement subsystem 19 may be configured in a manner similar to that described for the character arrangement subsystem 17 of FIG. 3 or alternatively as that described for the EFORMS arrangement subsystem 18 of FIG. 7. As a further alternative, both types of configurations may be utilized.

In one configuration, the sketch arrangement subsystem 19 organizes the sketches of the user into sketch arrangements which comprise the sketch arrangement module, one translate table module, and the pixel data for one or more sketches contained in one or more sketch modules. These modules are organized in a hierarchy as follows:

SKETCH ARRANGEMENT MODULE

| SKETCH ARRANGEMENT MODULE |
| --- |
| Translate Table Module |
| Sketch 1 |
| character codes for sketch 1 |
| Sketch 2 |
| character codes for sketch 2 |
| Sketch 3 |
| character codes for sketch 3 |

-continued

| TRANSLATE TABLE MODULE |
| --- |
| Pointers into sketch module 1 to the pixel data for each character code belonging to sketch 1 |
| Pointers into sketch module 1 to the pixel data for each character code belonging to sketch 2 |
| Pointers into sketch module 2 to the pixel data for each character code belonging to sketch 3 |

| Sketch Module 1 | Sketch Module 2 |
| --- | --- |
| pixel data for sketch 1 | pixel data for sketch 3 |
| pixel data for sketch 2 | |

In a manner similar to the character arrangement subsystem 17 and the EFORMS arrangement subsystem 18, the sketch arrangement subsystem 19 includes an internal array memory in which the sketch arrangement module is stored. The sketch arrangement module serves as a directory for the sketch arrangement. It names the translate table module for the sketch arrangement and each sketch that is part of the arrangement. It also provides an ordered set of character codes that belong to each sketch.

The translate table module provides the association or mapping between the character codes that comprise each sketch and the pixel data that creates the sketch image when printed. Each character code belonging to a sketch is used as an index into the translate table, where each entry provides the sketch module name and a pointer into that sketch module to the pixel data associated with that character code.

Each sketch module provides the actual pixel data for one or more sketches. A sketch module is similar to the font modules described above with respect to the character arrangement subsystem 17.

When the user wants to create a sketch within a sketch arrangement, the user specifies the arrangement name, the sketch name, and the sketch dimensions.

In the sketch arrangement subsystem 19, the user first enters a selection and definition mode. Various menu screens (not shown) are put up in order to enter the user's choices. The user may create a new sketch arrangement module or may select a sketch arrangement module to modify from a list of the existing sketch arrangement module names. If a new sketch arrangement module is desired, a screen is generated to solicit the translate table to utilize. Either a new translate table may be named and created or an existing translate table may be selected by name from a list. In a similar manner, the user specifies the sketch module to utilize. The existing sketch arrangement modules that are available are stored out on the disk system 15 and are transferred into internal memory, in the manner described above with respect to the character arrangement subsystem 17 and the EFORMS arrangement subsystem 18. If the user chooses to create a new sketch module, the user is prompted not only to enter the name of the new module but also to enter the length and height of the sketch.

These dimensions determine the size of the sketch as it will actually be printed on the destination printer and are also utilized to determine the dimensions of the drawing matrix that is provided on the create sketch screen to be described.

Figure 11:
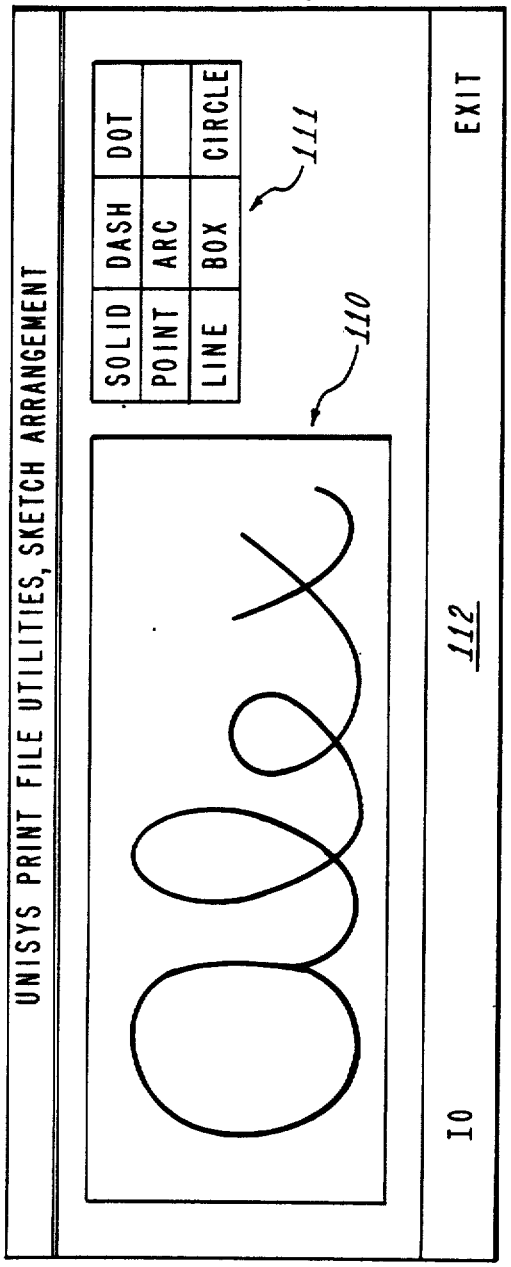
FIG. 11 is an illustration of the Create Sketch Screen generated in the operation of the Sketch Arrangement Subsystem Block of FIG. 2.

After the selection and definition of the sketch is complete, the screen management function 52 puts up the Create Sketch screen where the desired character can be drawn. FIG. 11 illustrates the Create Sketch screen. The Create Sketch screen is divided into three areas; a draw area 110, a commands area 111 and a functions area 112. The draw area 110 is the area in which the sketch is drawn. The commands area 111 is the area where various commands can be selected for creating shapes and changing line styles. The functions area 112 contains the functions available within the sketch arrangement subsystem 19.

The draw area 110 of the Create Sketch screen of FIG. 11 may be utilized in the same manner as the draw character area 70 of the Create Character screen of FIG. 6. The sketch is drawn into the area 110 utilizing the mouse 13 to turn the pixels therein on and off thereby forming the sketch. When the user completes the sketch and saves it, the sketch arrangement subsystem 19 dissects the sketch into multiple character cells and saves the results. Each character cell is similar to the characters discussed above with respect to the character arrangement subsystem 17 and has a unique character code associated therewith within the translate table. Thus, the sketch as named, in this configuration, is defined and stored in internal memory by the sequence of character codes and the pixel data associated with each character code. The sketch is saved out to the disk system 15 in this manner. Thus, a sketch may be created or modified in identically the same manner as described above with respect to the character arrangement subsystem 17 except that in the character arrangement subsystem 17, the keyboard 12 was utilized as the primary input device for activating the character pixels whereas in the sketch arrangement subsystem 19, the mouse 13 is utilized as the primary input device for performing the function.

The character cells may be stored in three ways: as a sketch arrangement, inserted as individual cells in an existing character arrangement, and/or both as a sketch arrangement and inserted into an existing character arrangement. For example, after a signature has been created via the sketch arrangement subsystem 19, it can be saved by its name as part of a Sketch Arrangement. It can then be referenced by that name for insertion into an EFORM, as described above with respect to the EFORMS arrangement subsystem 18. The user can also save the same signature by its individual character codes as part of a user character arrangement (as new characters). It can then be referenced by those character codes (just like data) for insertion into documents.

The sketch can also be generated by utilizing the Turbo Graphix Toolbox 88 described above with respect to the EFORMS arrangements subsystem 18 (FIG. 7). The type of line utilized to draw a shape can be selected in the Commands Area 111 as solid, dashed, or dotted. The Turbo Toolbox SETLINESTYLE 92 may be utilized to this effect. Shapes can also be drawn utilizing the sketch subsystem 19, in a manner similar to that described above with respect to the EFORMS Arrangement subsystem 18. Sketches are drawn using the mouse. The mouse cursor is moved by physically moving the mouse 13 in the direction the cursor is to be moved. The starting and ending points of all shapes are marked when the left mouse button is pressed. After the starting point of a shape is selected, cursor movement causes the shape to be drawn and redrawn in the drawing area 110 until the desired end point is chosen. The shapes selected are: point, arc, line, box and circle and are selected in the Commands Area 111. The appropriate routine of the Toolbox 88 is utilized. The routines for the line, box and point were described above with respect to the EFORMS arrangement subsystem 18. The Toolbox 88 also includes a routine for drawing a circle. The cursor is positioned to the point desired for the center of the circle. The left mouse button is pressed. Thereafter, when the cursor is moved, a circle is drawn on the screen with the current cursor position providing the radius of the circle. When the circle is correct, the left mouse button is again pressed and the circle is completed to the screen. If the arc shape is selected, three points must be utilized to define the drawn arc. After selecting arc, the cursor is positioned to the starting point of the arc and the left mouse button is pressed. The cursor is then moved to a middle point on the desired arc and the left mouse button is again pressed. Positioning the cursor to the end point of the arc and pressing the left mouse button completes the procedure.

It is appreciated that either the pixel oriented approach or the shape oriented approach or a combination of the two may be utilized in implementing the sketch arrangement subsystem 19.

The functions area 112 at the bottom of the Create Sketch screen of FIG. 11 contains the functions available within the sketch arrangement subsystem 19. The IO function provides the user with the ability to save and retrieve a sketch in the same manner described in detail with respect to the character arrangement subsystem 17 or the EFORMS arrangement subsystem 18. When creation or modification of the sketch is complete, the exit function terminates the utilization of the sketch arrangement subsystem 19 and control return to the basic system 50 of FIG. 2.

Referring again to FIG. 2, when the user selects the page composition arrangement subsystem option from the PFU/PC main menu screen illustrated above, the PFU/PC basic system 50 transfers control to the page composition arrangement subsystem 20. The page composition arrangement subsystem 20 provides the user with the means to define the manner in which a physical page is printed on the supported printer. The user defines the physical page and logical areas on either side of the physical page and then specifies information about each logical area. Each logical area can have its own character arrangements, EFORMS, vertical format buffer (VFB), tab buffer (tab), and paper side associated therewith.

The page composition arrangement subsystem 20 organizes all logical areas belonging to the same physical page into a page composition arrangement. By definition, a page composition arrangement is comprised of the page composition arrangement module itself (which defines the physical page and one or more logical areas) any VFB modules and tab buffer modules required by the logical areas, and any character arrangements and electronic form arrangements to be used by the logical areas. The page composition arrangement module is stored in the following data hierarchy.

| Page Composition Arr. Module |
|---|
| Logical Page 1 |
| VFB module 1 |
| Tab buffer module 1 |
| Char. Arr. module 1 |
| Char. Arr. module 2 |
| . |
| . |
| . |
| EFROM Arr. module 1 |
| EFROM Arr. module 2 |
| . |
| . |
| . |
| Logical Page 2 |
| VFB module 2 |
| Tab buffer module 2 |
| Char. Arr. module 3 |
| Char. Arr. module 4 |
| . |
| . |
| . |
| EFORM Arr. module 3 |
| EFORM Arr. module 4 |
| . |
| . |
| . |

The page composition arrangement module defines the physical page and each of its logical areas. It also serves as the directory for the page composition arrangement by naming all other required and associated modules. Each logical area defines the placement of the logical area on the physical page, names a VFB and tab buffer module to be used for the logical area, and names any associated character arrangements or EFORM arrangements to be used when printing the page.

The VFB and tab buffer modules contain the actual vertical format buffer and tab buffer data needed for the logical area. All VFB and tab buffers, and all character and EFORM arrangements that were explicitly named during the definition of the logical area, are considered part of the arrangement by reference or association only. They are not physically part of the page composition arrangement in that their module sets are not prepared for transfer when the page composition arrangement is prepared nor are they converted into their printer-related omnibus elements when the page composition arrangement conversion is performed. The preparation and conversion of the referenced module sets are performed separately. Upon activating the page composition arrangement subsystem 20, the user selects a new page composition arrangement to create or an existing arrangement to modify. If a new page composition arrangement is requested, the user defines the size and characteristics of the physical and logical areas. For each logical area defined by the user, a VFB and a tab buffer can be referenced and the user can specify the character and/or EFORM arrangements that are to be used in the logical area.

In the manner described above, the screen management function 52 puts up a selection screen (not shown) providing for selection of a new page composition arrangement as well as a list of the names of the existing arrangements. A selection is made utilizing the mouse 13, or alternatively, the keyboard 12, as described above. The existing page composition arrangements are stored on the disk system 15 and are called into internal memory when the name thereof is selected. If it is desired to create a new page composition arrangement, a prompt is provided for entry of the desired name thereof and a menu is displayed for entry of the size of the physical page therefor. The physical page size menu determines the size of the paper to be utilized with the page composition arrangement.

Figure 12:
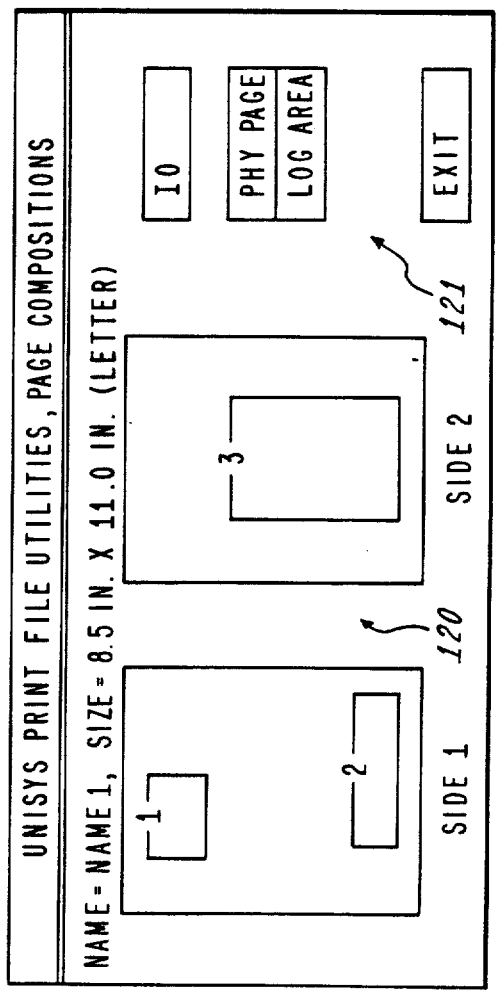
FIG. 12 is an illustration of the Create The Page Composition Arrangement Screen generated in the operation of the Page Composition Arrangement Subsystem Block of FIG. 2.

After the user has selected a new or existing page composition arrangement, the page composition arrangement create screen as illustrated in FIG. 12, is displayed. The create screen is utilized to perform all of the functions available in the page composition arrangement subsystem 20.

The create screen of FIG. 12 is divided into two areas: a physical page display area 120 and a functions display area 121. The page display area 120 contains a display of the current page. It identifies the page composition arrangement currently being created or modified, its current page size, along with a representation of each logical area currently defined for each side of the page.

The functions display area 121 lists the available functions which are selected by the mouse 13 or the keyboard 12, in the manner described above.

The physical page function is utilized to define physical page characteristics. The physical page characteristics are those that apply to the physical page or to every logical area defined for the physical page. By a menu screen (not shown) physical page descriptions may be made with respect to the page size, tab buffer default, VFB default and character arrangement default. The page size option specifies the paper size to be used when printing a file that uses the page composition arrangement. The tab buffer default option associates a default tab buffer with the page composition arrangement. The default tab buffer is named that will be used with any logical area defined in the page composition arrangement that does not specify its own tab buffer. The VFB default associates a default vertical format buffer with the page composition arrangement. The default VFB is named that will be utilized by any logical area defined in the page composition arrangement that does not specify its own VFB. The character arrangement default associates a default character arrangement with the page composition arrangement. The named default character arrangement is utilized by any logical area defined in the page composition arrangement that does not name other character arrangement modules. The paper size and named default modules are stored in the header of the page composition arrangement module described above.

The logical area function is selected to create, modify or insert logical areas in the current page composition arrangement. A series of menus and prompts (not shown) are displayed to identify the logical area and then to create, insert and/or modify it as desired. A first prompt requests the logical area number which is entered by the keyboard 12. A further screen contains a menu to solicit information on: paper side, coordinates, VFB name, tab name, character arrangement module names, and EFORM names. The paper side option defines the side of the paper on which to place the logical area being created or modified. The coordinates option permits entry of the size and location of the logical area within the physical page. A prompt screen is displayed (not shown) for entry of the coordinates of the four corners of the logical area. The VFB, tab, character arrangement module and EFORM name options are utilized to specify the VFB, tab buffer, character arrangement modules and EFORMS to be used by the logical area being created or modified. If no VFB, tab, character arrangement module or EFORM name is specified, the default module is utilized. The VFB module, tab buffer module, character arrangement modules and EFORM arrangement modules are stored in the page composition module in the data hierarchy, described above.

After defining a logical area, the perimeter of that area is drawn in the display area 120 of the create screen of FIG. 12 as exemplified by logical areas 1 and 2 on side 1 of the page and logical area 3 on side 2 of the page.

Selection of the IO function permits saving a page composition arrangement to the disk system 15, retrieving an existing page composition arrangement from the disk system 15 or creating a new page composition arrangement. A menu screen (not shown) is generated with a "Save Page Comp" option and a "Get Page Comp" option. Selection of the Save Page Comp option transfers the current page composition arrangement module stored in internal memory to the disk system 15. A name is entered to use when saving this module. Selection of the Get Page Comp option generates a menu screen (not shown) listing the names of the existing page composition arrangement modules on the disk system 15 as well as a "NewPComp" option for creating a new module. The New Page Comp option is selected for naming and creating a new module. If it is desired to modify an existing module, the module name is selected from the menu and it is retrieved from the disk system 15 to internal memory.

When all of the work has been completed on the page composition arrangements, the exit function is selected from the function display area 121 of the create screen of FIG. 12 and the page composition arrangement subsystem 20 is terminated with control returning to the basic system 50 of FIG. 2.

Referring again to FIG. 2, when the vertical format buffer subsystem option is selected from the PFU/PC main menu screen illustrated hereinabove, the basic system 50 transfers control to a vertical format buffer subsystem. This subsystem is included, although not shown, in FIG. 2, and is activated from the basic system block 50 and returns thereto in the same manner as the subsystems 17-20.

The vertical format buffer subsystem provides the user with a means to vary the vertical line spacing on the printed output. A new vertical format buffer (VFB) can be created or an existing VFB can be modified. A menu screen, not shown, lists the names of the existing VFBs and provides a new VFB option. If the new VFB option is selected, a name therefor is entered via the keyboard 12. If an existing VFB is selected for modification, the selected VFB module is transferred from the disk system 15 to internal memory so that it can be edited.

After choosing a new or existing VFB, the following create VFB screen is displayed by the screen management function 52 so that the user can create or modify the VFB.

| UNISYS PRINT FILE UTILITIES. VERTICAL FORMAT BUFFER (VFB) | |
|---|---|
| SUMMARY VFB INFORMATION FOR VFBNAME | |
| VFB name ... VFBNAME | 10 |
| Page length in lines ... 66 | Page |
| Top Margin ... 0 | Lines |
| Bottom Margin ... 0 | Exit |
| Logical Pages ... ## | |
| Lines defined ... ## | |

This create screen is utilized to perform all of the functions available in the VFB subsystem.

The center of the screen displays current summary information. It identifies the VFB currently being created or modified, along with information concerning its current status. The available functions to be performed are listed on the right side of the screen. A function to be performed on the VFB is selected by the mouse 13 or the keyboard 12, in the manner described hereinabove.

The VFB page function permits the user to define vertical format information for the physical or logical page described by the VFB. This information includes: the number of lines on the page, the number of lines in the top and bottom margins, and the number of logical pages to be placed on the physical page. A page information menu screen (not shown) is displayed to solicit this information. A page length option permits the user to specify the number of lines to be utilized on the physical or logical page for which this VFB is utilized. Top and bottom margin selections permit the number of lines to be used for the top and bottom margin of the physical or logical page to be specified. A logical page option permits the user to specify the number of logical pages to be printed on the physical page described by the VFB. When the information is entered by the user pursuant to the selection of the page function, the appropriate summary VFB information is updated.

Selecting the VFB lines function from the function display area of the create VFB screen, permits the user to define vertical line spacing information for each line or set of lines to be printed on the page described by this VFB. This information includes the height of each line of print and the location of the base line within each line of print. The height of the line is specified as the number of lines of text that are to be placed in each inch down the printed page (lines per inch or LPI). The location of the base line is specified as a percentage of the height of each line, measured from the top of the line. The selection of the lines function permits the user to create or edit the vertical line spacing for the line or set of lines. Thus each line can have both LPI and base line information associated with it. The user enters the line number for which the vertical line spacing information is to be defined. Additionally, the user enters the LPI and base line percentage.

Selection of the IO function permits the user to save the current VFB to disk, retrieve an existing VFB from disk, or create a new VFB. The VFB is transferred between the disk system 15 and internal memory. When a VFB is saved, the user enters the name to utilize therewith via the keyboard 12. When the Get option is selected, a menu screen (not shown) is displayed listing the existing VFBs and providing an option for selecting a new VFB. If an existing VFB is selected, it will be transferred from the disk system 15 to internal memory for editing.

When the work on the VFBs is completed, the exit function is selected which will transfer control from the vertical format buffer subsystem back to the PFU/PC basic system 50 of FIG. 2.

With continued reference to FIG. 2, when the user selects the tab buffer subsystem option on the PFU/PC main menu screen illustrated above, the PFU/PC basic system 50 transfers control to a tab buffer subsystem included but not shown in FIG. 2. The tab buffer subsystem is included in FIG. 2 in the same manner as the vertical format buffer subsystem, as described above. Tab buffers permit horizontal positioning control within a print file. The user specifies tab stops within a tab buffer. When a tab character is found in a print file, the "Printers Cursor" is moved to the next tab stop specified in the active tab buffer.

On entering the tab buffer subsystem, a selection menu screen (not shown) is displayed with a new tab option and a list of existing tab buffers stored out on the disk system 15. If it is desired to create a new tab buffer, the new tab option is selected by the mouse 13 or the keyboard 12, as described above, and the name for the buffer is entered. If it is desired to modify an existing tab buffer, the mouse 13 or the keyboard 12 selects the name and the chosen tab buffer module is read into internal memory from the disk system 15 so it can be edited.

After choosing a new or existing tab buffer, the following create tab buffer screen is displayed.

| UNISYS PRINT FILE UTILITIES TAB BUFFER | |
|---|---|
| SUMMARY TAB INFORMATION FOR TABNAME | IO |
| TAB name ... TABNAME | Tabs |
| Tab Stops defined ... ## | Exit |

The create tab buffer screen is utilized to perform all of the functions available in the tab buffer subsystem.

In the center of the screen is the current summary information. It identifies the tab buffer that is currently being created or modified, along with the number of tab stops defined.

The available functions are listed on the right side of the screen. A function can be selected to perform on the tab buffer by positioning the cursor to it utilizing the mouse 13 or the keyboard 12, in the manner described above.

Selection of the tabs function in the function display area of the create tab buffer screen, permits tab stops to be defined for a page. Each tab stop defines a position within a print line to which Percon 37 (FIG. 1) skips whenever it finds a tab character in the print data. A Define Tab Stops screen (not shown) is displayed listing the current tab stops defined in the tab buffer and provides for entry of new tab stop values. The total number of tab stops currently defined in the tab buffer is displayed in the summary tab information area of the create tab buffer screen.

Selection of the IO function from the function display area of the create tab buffer screen permits saving the current tab buffer from internal memory to the disk system 15, retrieving an existing tab buffer from the disk system 15 to internal memory, or creating a new tab buffer. In a manner similar to that described above, an IO menu screen (not shown) is displayed with the "Save" and "Get" options. If the Save option is selected, the name to utilize when saving the current tab buffer is entered via the keyboard 12 (if it has not previously been defined) and the current tab buffer is saved out to the disk system 15 under the name associated therewith. If the Get option is selected, a menu screen (not shown) is displayed with the list of the current tab buffers and a new tab option. If an existing name is selected, the named tab buffer is read into internal memory from the disk system 15. The new tab option is selected to create a new tab buffer.

When work is completed on the tab buffers, the exit function is selected from the function display area of the create tab buffer screen and the tab buffer subsystem is exited. Control returns to the PFU/PC basic system 50 of FIG. 2.

Referring again to FIG. 1, once a module set (arrangement) has been created by PFU/PC 16, all of the modules thereof must be transferred to the OS1100 system 31. The PC transfer module 21 is utilized for this purpose. Once the PC transfer module 21 is received on the OS1100 system 31, it becomes known as the 1100 transfer file 33. The conversion subsystem of the PFU/1100 portion 30 is then utilized to convert all of the modules in the set into elements containing printer-specific information in the format required by PERCON 37 and by the PFU/1100 portion 30. Then, whenever a PFU/PC-created arrangement or module is referenced by the PFU/1100 control image subsystem of PFU/1100, appropriate control images can be generated that will cause PERCON 37 to use the corresponding printer-specific elements on the printed page.

Referring again to FIG. 2, when the user selects the prepare for transfer option from the PFU/PC main menu screen described above, the PFU/PC basic system 50 transfers control to the prepare arrangement for transfer block 51. After an arrangement or module set has been created by PFU/PC, the prepare arrangement for transfer block 51 is utilized to prepare it for transfer to the OS1100 system. The prepare arrangement for transfer block 51 prepares a module set for transfer to the OS1100 system by merging all of the data modules that are part of the module set into one ASCII text file which is called the PC transfer module 21. Every module set must be prepared before it can be transferred.

Figure 13:
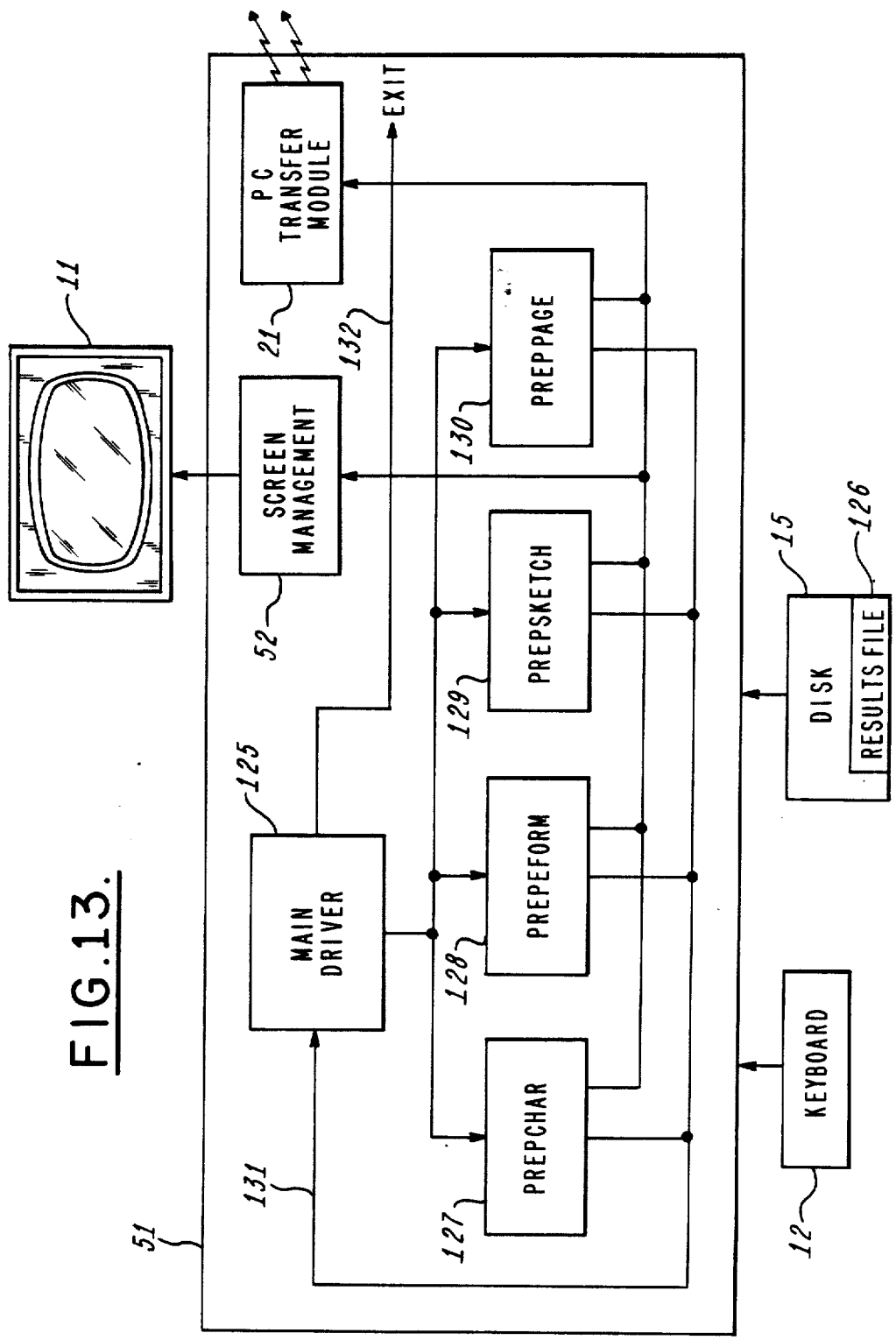
FIG. 13 is a schematic block diagram illustrating details of the Prepare Arrangement For Transfer Block of FIG. 2.

Referring to FIG. 13, in which like reference numerals indicate like components with respect to FIG. 2, details of the prepare arrangement for transfer block 51 are illustrated. The prepare arrangement for transfer block 51 includes a main driver 125 that, in conjunction with the screen management function 52, puts up screens on the display 11 to query the user for the following information: Arrangement or Module Set Type, Arrangement or Module Set Name, PC Transfer Module Name, and a name for the results file 126. The results file 126 is a file on the disk system 15 into which the results of the prepare for transfer operations are written. The results are written to the file 126 and to the PC screen 11. The main driver 125 then transfers control to a subsystem in accordance with the specified arrangement type. To prepare a character arrangement, a PREPCHAR function 127 is utilized. To prepare an EFORM arrangement, a PREPEFORM function 128 is utilized. To prepare a sketch arrangement, a PREPSKETCH function 129 is utilized. To prepare a page composition arrangement, a PREPAGE function 130 is utilized. When the activities performed by the activated function block 127-130 are completed, control returns to the main driver 125 via a path 131 for the preparation of a further arrangement or for exiting via a path 132. Each of the functions 127-130 provide an input to the PC transfer module block 21 for preparation of the PC transfer module. The functions 127-130 also access the screen management function 52 for displaying the results of the preparation on the screen 11.

The first screen to be put up by the main driver 125 is the prepare for transfer main menu screen as follows:

| UNISYS PRINT FILE UTILITIES, PREPARE FOR TRANSFER | |
|---|---|
| Character Arrangement | |
| Electronic Form Arrangement | |
| Sketch Arrangement | |
| Page Composition Arrangement | |
| Vertical Format Buffer (VFB) | |
| Tab Buffer (Tab) | |
| Function Keys | F10: Exit |

The prepare for transfer main menu screen is utiized to enter the arrangement type by highlighting the appropriate menu item via the keyboard 12 as described above. After selecting the type of module set, the main driver 125 puts up a screen (not shown) utilized to select the name of the module set to prepare for transfer. The name of the module set is the name of the arrangement, VFB or tab buffer that produced that module set. The screen lists the names of all module sets of the specified type and selection is made therefrom utilizing the keyboard 12, in the manner described above. Once an arrangement name is selected, the user is asked via a screen (not shown) for the PC directory search path to be utilized to find all of the modules that are part of the arrangement. The main driver 125 then puts up a screen (not shown) for entry of the name of the output PC transfer module where the prepared arrangement is to be written. This is the PC transfer module 21 to be created as a result of preparing the module set for transfer. After specifying the name of the output PC transfer module 21, the user is queried via a screen (not shown) for the name of the file to which the results of the prepare processing are to be written. The results are written to both the results file 126 and to the screen 11 via the screen management function 52.

The prepare arrangement for transfer block 51 prepares any arrangement created by PFU/PC 16 for transfer to the OS1100 system 31. The preparation of an arrangement involves merging and converting all PC modules that are part of the arrangement into one ASCII text file, called the PC transfer module 21. The modules of the arrangement are merged into one file in order to assure that when the arrangement is eventually transferred to the OS1100 system 31, it is transferred in its entirety. The merge also guarantees that the transfer of an arrangement involves the transfer of only one file. The modules of the arrangement are converted to ASCII text since only pure ASCII text files can be transferred via typical communication packages such as the transfer mechanism 32 of FIG. 1. The preparation involves converting each integer variable to an ASCII string of predetermined length in accordance with the conventions of the system utilized. For example, an ASCII string length of five is utilized since the maximum integer value in Turbo Pascal has five digits. All character fields (ASCII strings) are padded with blanks to fill the declared length of the string. Due to the characteristics of Turbo Pascal, the length of each character field would otherwise vary according to the length of the string placed in it. For example, if a character field is declared as having a length of 20 and the string "ABC" is placed in that field, the conversion pads the field with blanks to the actual length of 20; otherwise the length of that field would be three. Any arrangement that is referenced by an arrangement being prepared must be separately prepared for transfer, and separately transferred.

After a PC transfer module 21 is transferred to the OS1100 system 31, it is known as an 1100 transfer file 33. The conversion subsystem (to be described) of PFU/1100 is then utilized to convert the 1100 transfer file into the defined format for specific printer use. The conversion subsystem of PFU/1100 converts the arrangement from one ASCII text file into its equivalent OS1100 omnibus elements containing printer-specific information in the format required by PFU and PERCON 37.

Depending on the type of arrangement selected from the prepare for transfer main menu screen illustrated above, the driver 125 transfers control to one of the functions 127-130. Upon return to the main driver 125, the user is again asked to select an arrangement type to be prepared. When the main driver 125 detects that the function key F10 was pressed, the prepare arrangement for transfer block 51 is exited via the path 132 and control is returned to the PFU/PC basic system 50 of FIG. 2.

The PREPCHAR function 127 prepares a character arrangement for transfer to the OS1100 system 31. Each of the modules that is part of the character arrangement is prepared and written to the PC transfer module 21 as follows:

First the character arrangement module, which includes header information and translate table information, is prepared and written to the PC transfer module 21.

Thereafter, each translate table module that is part of the character arrangement is prepared and written to the PC transfer module 21. Each translate table module contains a list with the name of every font that it requires and that is therefore part of the arrangement. As each translate table module is being prepared for transfer, each unique font module name is linked together in a list and saved.

After all of the translate table modules have been prepared, the font information for the character arrangement is prepared and written into the PC transfer module 21. Then each font module named in the saved list is prepared and written into the PC transfer module 21.

After all of the font modules in the list have been prepared, the character arrangement header information is re-written to the PC transfer module 21, along with a list of the names of every font module and every translate table module that is part of the character arrangement.

The format of the PC transfer module 21 for a character arrangement is as follows:

| Character Arrangement Module header and translate table information |
|---|
| Translate Table Module #1 with font names #1 - x |
| Translate Table Module #2 with font names #1 - y |
| . |
| Translate Table Module #n with font names #1 - z |
| Character Arrangement Module font information |
| Font Module #1 including pixel data |

| Character Arrangement Module header and translate table information |
|---|
| Font Module #2 including pixel data |
| . . . |
| Font Module #(x + y + z − the # of duplicate font name entries) including pixel data |
| Character Arrangement Module header information with font names #1 - (x + y + z − the # of duplicate font name (entries)) with translate table names #1 − n |

The data structure of the individual modules comprising a character arrangement was hereinabove described with respect to the character arrangement subsystem 17 of FIG. 2.

After the character arrangement is prepared for transfer, the PREPCHAR function 127 transfers control back to the main driver 125.

The PREPEFORM function 128 prepares an electronic form arrangement for transfer to the OS1100 system 31. Each module that is part of the EFORM arrangement is prepared and written to the PC transfer module 21, in the manner described above. The EFORM arrangement is comprised solely of the EFORM arrangement module.

As an EFORM arrangement is being prepared for transfer, the PREPEFORM function 128 puts up a screen (not shown) via the screen management function 52 informing the user of each character arrangement and sketch arrangement that is referenced by the EFORM arrangement. Each referenced character and sketch arrangement must be separately prepared and transferred. After the EFORM arrangement is prepared for transfer, the PREPEFORM function 128 returns control to the main driver 125. The format of the PC transfer module 21 for an EFORM arrangement is as follows:

| EFORM Arrangement Module header information and with Character Arrangement Module Names #1 - x Sketch Arrangement Module Names #1 - y Shape Record #1 Shape Record #2 |
|---|
| . . . |
| Shape Record #n |

A description of the data structure of the EFORM arrangement module was described hereinabove with respect to the EFORMS arrangement subsystem 18 of FIG. 2.

The PREPSKETCH function 129 and the PREP-PAGE function 130 prepare sketch arrangements and page composition arrangements, respectively, for transfer to the OS1100 system 31 in the manner described above with respect to the functions 127 and 128. The prepare arrangement for transfer block 51 further includes functions (not shown) for transferring VFBs and tab buffers to the OS1100 system 31 in a similar manner.

The PC transfer module 21 is transmitted to the OS1100 system 31 utilizing the transfer mechanism 32 as described above with respect to FIG. 1. As discussed above with respect to FIG. 1, a PFU Product File 46 is accessed from the PFU/1100 portion 30. The PFU Product File 46 includes the same data that is in the PERCON Product File 38. PFU, however, can only access the PFU Product File 46. It cannot access the PERCON Product File 38. Specifically, the PFU Product File 46 includes shape omnibus elements containing character codes for EFORM boxes, lines and shading for use by the conversion subsystem of PFU/1100 to be described. These character codes correspond to character codes and corresponding font pixel data in the PERCON Product File 38 to be utilized by PERCON 37 when printing the EFORMS.

Figure 14:
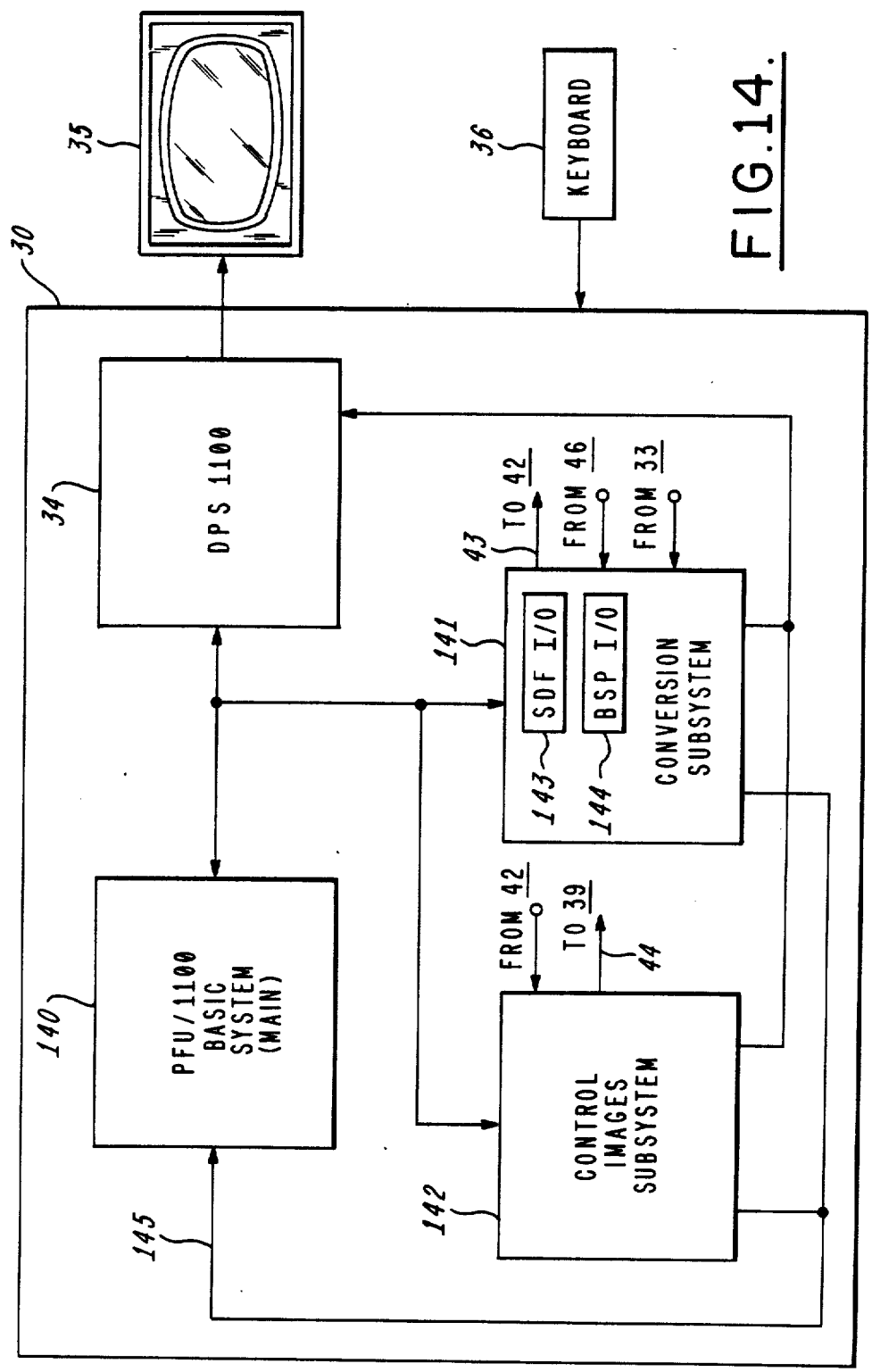
FIG. 14 is a schematic block diagram of the mainframe PFU/1100 portion of the system of the present invention illustrated in FIG. 1.

Referring to FIG. 14, in which like reference numerals indicate like components with respect to FIG. 1, details of the PFU/1100 portion 30 are illustrated. The PFU/1100 portion 30 is comprised of a PFU/1100 basic system block (main) 140, a conversion subsystem 141 and a control image subsystem 142. The subsystems 141 and 142 are accessible from the basic system 140. The basic system 140 and each of the subsystems 141 and 142 are menu driven, with several levels of prompting screens depending on the function being performed. The basic system 140 utilizes the DPS 1100 function 34, the OS1100 display processing system (discussed above) for all of the screen management thereof. The screens are put up on the terminal 35 by DPS 1100. The terminal keyboard 36 provides the input to the PFU/1100 portion 30 and is utilized to enter all of the data and make all menu selections. Items are selected from menus in the manner described hereinabove by entering an indicium associated with the item via the keyboard 36. The conversion subsystem 141 includes an SDF I/O block 143 and a BSP I/O block 144 for reading data and files into the conversion subsystem 141 and for outputting data and files therefrom. The PFU/1100 portion 30 of PFU is implemented in PLUS.

When the PFU/1100 portion 30 is invoked, the basic system 140 displays a PFU/1100 main menu screen on the display terminal 35 via the DPS 1100 function 34 as follows:

| PFU/1100 MAIN MENU |||||
|---|---|---|---|---|
| 1. Generate Control Images  2. Conversion (PC to 1100)  Enter Selection: |||||
| F1: | F3: | F5: | F7: | F9: |
| F2: | F4: | F6: | F8: | F10: EXIT |

The PFU/1100 main menu screen permits the user to select either the conversion subsystem 141 or the control image subsystem 142. The basic system 140 transfers control to the selected subsystem and when the processing performed thereby is completed, control is returned to the basic system 140 via a path 145. The subsystems 141 and 142 also access the DPS 1100 function 34 for generating screens on the terminal display 35.

The conversion subsystem 141 converts any PFU/PC created arrangement into the printer-specific omnibus elements in the format required by PERCON 37 and the PFU/1100 portion 30. The omnibus elements are required to define the arrangement to PERCON 37 and are specific to the supported printer 41. Thus, an 1100 transfer file 33 must be converted into printer-specific omnibus elements before the arrangement can be utilized by PERCON. The conversion subsystem 141 separates the pieces of the arrangement merged during the processing of the PFU/PC prepare arrangement for transfer subsystem 51 and converts the information from ASCII text to the equivalent omnibus element format for the selected printer. The conversion subsystem 141 also creates the set of print control images that access these omnibus elements and saves them in another omnibus element in the user library 42 for use by the control image subsystem 142. The conversion subsystem 141 is responsive to the 1100 transfer file 33 for generating the omnibus elements therefor and stores these omnibus elements in the user library 42 via the path 43. The conversion subsystem 141 is also responsive to the PFU Product File 46 for the various character arrangements PFU makes available to the EFORM arrangement being processed for printing any boxes, lines, or shading on the printed page.

The control image subsystem 142 creates, modifies and/or inserts, at the front of the print file 39, the set of print control images that define and are required to utilize the PFU/PC-created arrangements in the user library 42. The control image subsystem 142 also is utilized to create, modify and/or insert at the beginning of the print file 39 the print control images that access various other functions of the printer 41 via PERCON 37, in a manner to be described.

Figure 15:
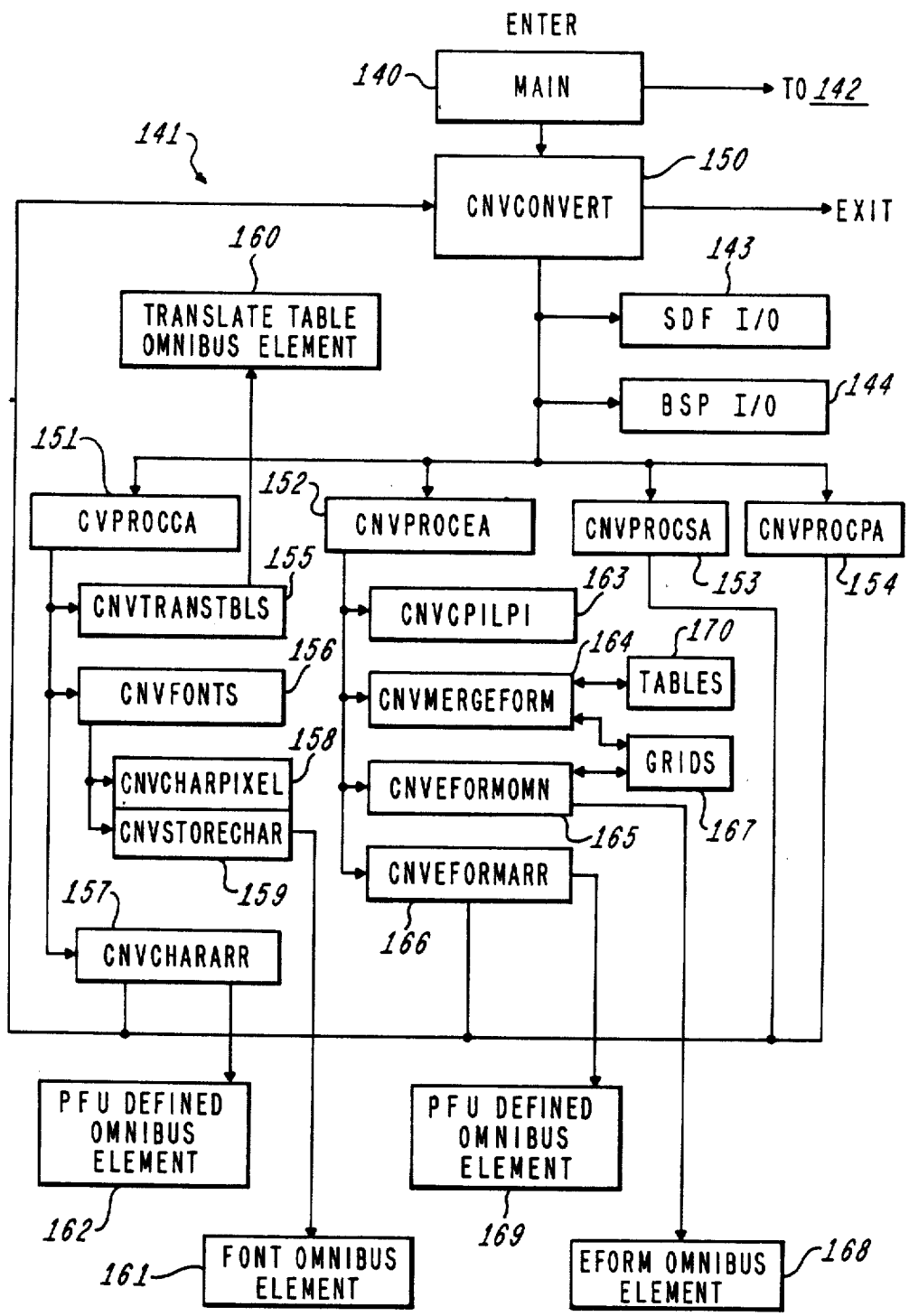
FIG. 15 is a schematic block diagram illustrating details of the Conversion Subsystem Block of FIG. 14.

Referring to FIG. 15, where like reference numerals indicate like components with respect to FIG. 14, details of the conversion subsystem 141 are illustrated. The conversion subsystem 141 converts arrangements and module sets created by PFU/PC 16 (FIG. 1) residing in the named 1100 transfer file 33 into the printer-specific omnibus elements in the predefined formats expected by and required by PERCON 37 (FIG. 1). The required omnibus element formats are described in the previously referenced PERCON publication UP-11215.

When the main PFU/1100 system 140 transfer control to the conversion subsystem 141, in response to selecting the conversion option on the PFU/1100 main menu screen illustrated above, control transfers to a CNVCONVERT function 150. The CNVCONVERT function 150 controls the processing throughout the conversion subsystem 141. The CNVCONVERT function 150 firstly puts up on the terminal display 35 via the DPS 1100 function 34 a convert PC 1100 screen as follows:

|  CONVERT PC TO 1100 | | | | | |
| --- | --- | --- | --- | --- | --- |
| Input 1100 Transfer File Name: | | | | | |
| Output Library File Name: | | | | | |
| Supported Printer Conversions | | | | | |
| 1. 447 (Y/N): | | | | | |
| 2. Cronus (Y/N): | | | | | |
| F1: | F3: | F5: | F7: | F9: | |
| F2: | F4: | F6: | F8: | F10: | EXIT |

The Convert PC to 1100 screen prompts the user for the name of the 1100 transfer file 33 to be converted (which was the name given to the transfer file containing the module set when it was transferred from PFU/PC 16), the name of the OS1100 library file to which the omnibus elements produced from the conversion should be written, and the printer for which the conversion should be performed. The CNVCONVERT function 150 then reads the header record of the 1100 transfer file 33 and determines the type of arrangement contained in the specified 1100 transfer file 33 and transfers control to the appropriate conversion function therefor. Control is transferred to a CNVPROCCA function 151, a CNVPROCEA function 152, a CNVPROCSA function 153 or a CNVPROCPA function 154 for processing a character arrangement, EFORM arrangement, sketch arrangement or page composition arrangement, respectively. After the 1100 transfer file 33 has been converted and all of the omnibus elements for the arrangement have been created, control is returned to the CNVCONVERT function 150. This process is repeated until the user exits the conversion subsystem 141 via a function key on the keyboard 36. Upon exiting from the conversion subsystem 141, control is returned to the PFU/1100 basic system 140. As discussed above, the conversion subsystem 141 includes the SDF I/O 143 and the BSP I/O 144 for reading and writing the various files and elements that the subsystem accesses. SDF I/O 143 is utilized for reading and writing data files. BSP I/O 144 is utilized for reading and writing elements in a file.

The CNVPROCCA function 151 directs the flow of processing for converting an 1100 transfer file 33 containing a character arrangement. As the character arrangement is being converted, the CNVPROCCA function 151 transfer control to a CNVTRANSTBLS function 155, a CNVFONTS function 156 and a CNVCHARARR function 157 to create the appropriate omnibus elements. The CNVFONTS function 156 additionally transfers control to functions CNVCHARPIXEL 158 and CNVSTORECHAR 159 in creating the 1100 font omnibus elements.

CNVPROCCA 151 first transfers control to CNVTRANSTBLS 155 for converting each translate table module section in the 1100 transfer file 33 into 1100 translate table omnibus elements 160. The translate table omnibus elements 160 are stored in the user library 42. Each translate table omnibus element utilizes the name specified during the creation of the translate table on the PC 10. After all of the translate table module sections are converted, control is returned to the CNVPROCCA function 151.

The CNVPROCCA function 151 then transfers control to the CNVFONTS function 156 for converting all of the font module sections in the 1100 transfer file 33 into 1100 font omnibus elements 161. The name used for each font omnibus element is derived from the name specified for the font during the creation thereof on the PC 10. CNVFONTS 156 transfers control to the CNVCHARPIXEL 158 function to create the 1100 font omnibus elements 161 by converting the pixel data for each of the characters in the font into the format required by the 1100 font omnibus elements. As the pixel data for each character is being converted, control is transferred to the CNVSTORECHAR function 159 to store the pixel data for the character being converted into the font omnibus element 161. The pixel data is stored in the format required for the printer being converted. After all of the pixel data for all of the characters in the current font have been converted, control is returned to the CNVFONTS function 156. After all of the fonts are converted, control is returned to the CNVPROCCA function 151.

After all of the translate table and font module sections have been converted, control is transferred to CNVCHARARR 157 to convert the character arrangement module section of the 1100 transfer file 33 into a PFU-defined character arrangement omnibus element 162. The CNVCHARARR function 157 converts the character arrangement module section in the 1100 transfer file 33 into the PFU-defined omnibus element 162 in the following format:

| WORD | |
| --- | --- |
| 0 | Element Type "CAM" |
| 1 | Printer Type "447" or "CRNS" |
| 2 | Number of Words in Element |
| 3 | Reserved |
| 4 | PFU-defined |
| . | Character Arrangement Control Image |
| . | |
| . | |
| 11 | Load Font and Load Translate Table |
| 12 | Control Images |
| . | |
| . | |
| 12 + (n * 5) | |

The name utilized for the character arrangement omnibus element is derived from the name specified for the character arrangement when it was created on the PC 10. After the character arrangement module section in the 1100 transfer file 33 is converted, control is returned to the CNVPROCCA function 151. After the 1100 transfer file 33 containing the character arrangement is completely converted, control is returned to the CNVCONVERT function 150.

The CNVPROCEA function 152 directs the flow of processing for converting an 1100 transfer file 33 containing an EFORM arrangement. As the arrangement is being converted, control is transferred to the following functions to create all of the 1100 omnibus elements: CNVCPILPI 163, CNVMERGEFORM 164, CNVEFORMOMN 165, and CNVEFORMARR 166. The CNVCPILPI function 163 prompts the user to choose the LPI which is to be utilized when printing any files that reference the EFORM arrangement. CNVCPILPI 163 puts up a select vertical line density screen (not shown) to choose the vertical line density or lines per inch (LPI). The line density selected determines which character arrangement PFU references for printing boxes, lines, and shading in this EFORM arrangement. The character arrangement used has character dimensions that are compatible with this line density and are accessed from the PFU product file 46.

The CNVMERGEFORM function 164 merges all of the EFORM arrangement shape records as discussed above onto four processing grids 167 in memory. When the merge is complete, the grids 167 contain the characters or overprinted characters to be placed on the EFORM in the following subsets:
 The merged box/line characters,
 The merged shading characters,
 The merged text characters, and
 The translate tables for the merged text.
Details of the grids 167 will be later discussed.

The CNVEFORMOMN function 165 is responsive to the grids 167 for creating an EFORM omnibus element 168 by creating data records from the four grids 167 assembled by the CNVMERGEFORM function 164. The CNVEFORMARR function 166 creates a PFU-defined EFORM arrangement omnibus element 169 for the EFORM arrangement module in the 1100 transfer file 33.

In greater detail, the CNVPROCEA function 152 converts the 1100 transfer file 33 containing an EFORM arrangement. First, the CNVPROCEA function 152 transfers control to the CNVCPILPI function 163 to prompt the user for the vertical line density (6 LPI, 8 LPI, or 12 LPI) to be utilized when the EFORM arrangement is printed. The LPI selected determines which character arrangement PFU makes available in this EFORM arrangement for printing any boxes, lines, or shading on the printed page. The character arrangement used has character dimensions that are compatible with the selected LPI. Such character arrangements are stored in the PFU Product File 46 (FIG. 1) and contain the font pixel data for the various box, line and shading elements such as corners, intersections, and the like, in the three vertical line density dimensions. After the LPI for the EFORM arrangement is chosen, control is returned to the CNVPROCEA function 152.

The CNVPROCEA function 152 then reads each character arrangement omnibus element that is referenced by the EFORM arrangement and retrieves the name of each ASCII translate table and each font required for the text on the EFORM. Control is then transferred to the CNVMERGEFORM function 164 to merge all of the EFORM arrangement shape records onto the four grids 167 in memory. Four processing tables 170 are utilized in performing the merge.

Referring for the moment to FIGS. 15A and 15B, the grids 167 are comprised of a Shape Grid 180, a Text Grid 181, a Shade Grid 182 and a Translate Table Grid 183. The tables 170 are comprised of a Merge Shape Table 184, a Shape Table 185, a Merge Shade Table 186 and a Shade Table 187. The grids 167 and the tables 170 are stored in memory.

Referring again to FIG. 15, with continued reference to FIGS. 15A and 15B, the CNVMERGEFORM function 164 assembles the grids 180–182 in memory, each of which contains a character code representation of a subset of the EFORM; the Shape Grid 180 for any boxes and lines, the Text Grid 181 for any text, and the Shade Grid 182 for any shading. These three separate representations are used so that true overprinting of shapes, text, and shading can be accomplished. The CNVMERGEFORM function 164 also assembles a grid representation of the translate tables to be used for the text (Translate Table Grid 183).

The character codes placed in the grids by CNVMERGEFORM 164 for the box/line characters and for the shading characters match those utilized in the EFORM character arrangements stored in the PFU Product File 46 (6 LPI, 8 LPI, and 12 LPI). The character codes placed in the Text Grid 181 are the standard ASCII codes.

CONVMERGEFORM 164 assembles the grids 167 by interpreting each EFORM shape record as follows, further detailed descriptions of the Processing Grids 167 and the Processing Tables 170 being hereinafter provided:
 Each line, box, and shaded box is decomposed into the set of primary line images and primary shade images that are required to draw it. A vertical line style and a horizontal line style is assigned.
 The Merge Shape Table 184 and the Shape Table 185 and anything already placed in the desired position in the Shape Grid 180 are utilized to determine each individual character code to be placed in the Shape Grid 180 for each EFORM column and row position used by a box or line.
 The Merge Shade Table 186 and the Shade Table 187 and anything already placed in the desired position in the Shade Grid 182 are used to determine each individual character code to be placed in the Shade Grid 182 for each EFORM column and row position used by a shaded box.

For each EFORM column and row position used by text, the ASCII character code for the letter/number/symbol is placed in the Text Grid 181 and the associated translate table number is placed in the Text TT Grid 183.

After all of the EFORM arrangement shape records have been merged, control is returned to the CNVPROCEA function 152.

CONVPROCEA 152 then transfers control to the CNVEFORMOMN function 165 to create the EFORM omnibus element 168 from the Grids 167. CNVEFORMOMN 165 utilizes the Grids 167 created during the merge of the EFORM shape records and creates the single EFORM Omnibus Element 168. The name utilized for the EFORM Omnibus Element 168 is the name specified for the EFORM arrangement when it was created on the PC 10 (FIG. 1).

After the EFORM Omnibus Element 168 has been created, the CNVPROCEA function 152 transfers control to the CNVEFORMARR function 166 to create the PFU-defined EFORM arrangement Omnibus Element 169. The CNVEFORMARR function 166 creates the PFU-defined EFORM arrangement Omnibus Element 169 in the following format:

| WORD | |
|---|---|
| 0 | Element Type "EFM" |
| 1 | Printer Type "447" or "CRNS" |
| 2 | Number of Words in Element |
| 3 | Reserved |
| 4 | PFU-defined |
| . | Eform Arrangement Control Image |
| . | |
| . | |
| 11 | Load Font and Load Translate Table |
| 12 | Control Images |
| . | Load Eform Control Image |
| . | |
| . | |
| 12 + (n * 5) | |
| 12 + (n * 5) + 1 | |
| 12 + (n * 5) + 6 | |

The name utilized for the EFORM arrangement Omnibus Element 169 is derived from the name specified during its creation on the PC 10.

Details of the manner in which CNVMERGEFORM 164 utilizes the Processing Grids 167 and the Processing Tables 170 to assemble the Grids 167 for the CNVEFORMOMN function 165 will now be described. Each of the Processing Grids 167 used by the CNVMERGEFORM process 164 is a two-dimensional array that contains one position for each character position on the EFORM being converted. Thus, the maximum size of each grid is 160×160 characters; the grid size used during a conversion is the number of columns used for the EFORM times the number of rows.

With continued reference to FIGS. 15A and 15B, these processing grids are used to hold information about the images or text that has already been placed at each position on the EFORM by the conversion process. The specific grids used are:

Shape Grid 180—contains the merged EFORM box/line characters.

Shade Grid 182—contains the merged EFORM shade characters.

Text Grid 181—contains the text characters placed on the EFORM.

Text TT grid 183—contains the translate table to be used for the text characters.

With respect to the Processing Tables 170, the Merge Shape Table 184 is a two-dimensional array (15×6) used to determine what image to place at any one character position on an electronic form. One dimension of the array represents each of the six primary images required to draw any solid line or solid box, as follows:
1. Top of vertical line
2. Bottom of vertical line
3. Vertical line
4. Left edge of horizontal line
5. Right edge of horizontal line
6. Horizontal line The top, bottom, left and right parts of the line are represented by images that fill half of their character cell. Therefore, all lines begin and end in the middle of a character position on the printed page and thus all lines that meet, match up properly. Any box can therefore be drawn with two vertical and two horizontal lines.

The second dimension of the Merge Shape Table Array 184 represents each of the fifteen possible images required to draw any combination of intersecting boxes and/or lines, as follows:
1. Top of vertical line
2. Bottom of vertical line
3. Vertical line
4. Left edge of horizontal line
5. Right edge of horizontal line
6. Horizontal line
7. Top left corner
8. Top right corner
9. Bottom left corner
10. Bottom right corner
11. Top connector
12. Bottom connector
13. Left connector
14. Right connector
15. Connector Each position in the array contains the value that represents one of the fifteen possible shape images that would result if the images represented by its X and Y coordinates were to overprint each other on an EFORM. For example, the top connector character cell contains the pixel data for a horizontal line through the center of the cell and a vertical line from the center of the cell to the lower edge of the cell. The bottom, left and right connectors are similarly constructed. The connector image comprises a vertical line from the top to the bottom of the cell through the center thereof and a horizontal line from the left to the right edges of the cell through the center thereof.

The CNVMERGEFORM process 164 decomposes each new shape to be placed on the EFORM into its primary images. For example, a horizontal line drawn from column 5 through column 10 would consist of:

Column 5 = left edge of horizontal line
Columns 6-9 = horizontal line
Column 10 = right edge of horizontal line CNVMERGEFORM 164 assigns each of these images the value to be utilized as the first index (1-6) in the Merge Shape Table 184. The CNVMERGEFORM function 164 then retrieves the character code from the EFORM Shape Grid 180 (described above) that represents the merging of any image or images that have already been placed on the EFORM at the position where the image of the new shape is to be placed. The Shape Table 185, to be described, is then searched for this character code. The index of the entry where the character code is found in the Shape Table 185 represents one of the fifteen possible images required to draw intersecting boxes and/or lines. This value is used as the second index into the Merge Shape Table 184. Using these two indices, a value is retrieved from the Merge Shape Table 184 that represents the merged image.

The Shape Table 185 is a two-dimensional array (15×16) used to determine the character code of the character image in the desired line style or styles to be placed on the electronic form being converted. It is also used to determine the line styles of an existing character image that has already been placed on the EFORM. It is appreciated that each character image has two line styles associated with it, one for the vertical portion of its shape and one for the horizontal portion.

One dimension of the Shape Table 185 represents each of the fifteen possible character images required to draw any combination of intersecting boxes and lines. The second dimension of the Shape Table 185 represents the sixteen combinations of the four line styles SOLID, BOLD, DOTTED and DASHED. Thus, it represents a solid vertical shape with a solid horizontal shape, with a bold horizontal shape, with a dotted horizontal shape, and with a dashed horizontal shape; a bold vertical shape with a solid horizontal shape, with a bold horizontal shape, with a dotted horizontal shape, and with a dashed horizontal shape; a dotted vertical shape with a solid horizontal shape, etc. Each position in the array contains the character code that represents one of the fifteen possible character images required to construct a box or line in one of its combined vertical and horizontal line styles.

CNVMERGEFORM 164 associates the values of 1-4 with the line styles of SOLID, BOLD, DOTTED and DASHED, respectively. As each new EFORM shape is being merged, a vertical and a horizontal line style value is associated with it. CNVMERGEFORM 164 determines the vertical and the horizontal line styles of the image whose character code was just retrieved from the EFORM Shape Grid 180, (i.e., of the image that has already been placed on the EFORM at the position where the shape image of the new shape is to be placed). This is accomplished by searching the Shape Table 185 for that character code and reversing the algorithm by which the code was assigned (explained below).

CNVMERGEFORM 164 next determines the merged vertical and horizontal line styles of the merged character image by controlling the line styles of the new shape to take precedence over the line style of the existing shape whenever there is a conflict.

The CNVMERGEFORM process 164 uses the character code retrieved from the Merge Shape Table 184 as the first index into the Shape Table 185. CNVMERGEFORM 164 generates the second index from the merged line styles as follows:

index2=(4×(vertical_line_style−1))+horizontal_line_style

Using these two indices, CNVMERGEFORM 164 retrieves a character code from the Shape Table 185 that represents the merged character image in merged vertical and horizontal lines styles.

The Merge Shade Table 186 is a two-dimensional array (15×9) used to determine the shape character image to place at any one character position on an EFORM.

One dimension of the array represents the nine primary shade images needed to shade a box, as follows:
1. Shaded top left corner
2. Shaded top right corner
3. Shaded bottom left corner
4. Shaded bottom right corner
5. Shaded bottom
6. Shaded top
7. Shaded left
8. Shaded right
9. Shaded The second dimension of the array represents each of the fifteen possible character images needed to draw any combination of intersecting shaded and unshaded boxes, as follows:
1. Shaded top left corner
2. Shaded top right corner
3. Shaded bottom left corner
4. Shaded bottom right corner
5. Shaded bottom
6. Shaded top
7. Shaded left
8. Shaded right
9. Shaded top right and bottom left corner
10. Shaded bottom right and top left corner,
11. Unshaded top left corner
12. Unshaded top right corner
13. Unshaded bottom left corner
14. Unshaded bottom right corner
15. Shaded Each position in the array contains the character code that represents one of the sixteen possible shade images that would result if the shade character images represented by its X and Y coordinates were to overprint each other on the EFORM. CNVMERGEFORM 164 decomposes each shaded box to be placed on the EFORM into its equivalent shade character images. It then takes each of these character images and assigns it to the value that matches its index (1-9) in the Merge Shape Table 184.

The CNVMERGEFORM process 164 then retrieves the character code from the EFORM Shade Grid 182 (described above) for the shade image already placed on the EFORM at the position where the character image of the new shape is to be placed. This character code and the value given to the shade character image of the new shape are used to index into the Merge Shade Table 186 and thus retrieve the value that represents a merging of the two shade images.

The Shade Table 187 is an array (1×15) used to determine the Merge Shade Table index of an existing shade character that has already been placed on the EFORM. Each position in the Shade Table 187 contains a character code that represents one of the fifteen possible character images needed to draw any combination of intersecting shaded and unshaded boxes.

The CNVMERGEFORM process 164 determines the Merge Shade Table index for the shade image whose character code was just retrieved from the EFORM Shade Grid 182 (i.e., for the shade image that has already been placed on the EFORM at the position where the shade image of the new shape is to be placed). This is accomplished by searching the Shade Table 187 for that character code and using the position in the array where it was found as the Merge Shade Table index.

After the 1100 transfer file 33 containing the EFORM arrangement is converted, control is returned to the CNVCONVERT function 150. When the arrangement to be converted is a sketch arrangement or a page composition arrangement, CNVCONVERT 150 transfers control to CNVPROCSA 153 or CNVPROCPA 154, respectively, to perform the conversion. CNVPROCSA 153 and CNVPROCPA 154 convert the respective arrangements in a manner similar to that described above with respect to CNVPROCCA 151 and CNVPROCEA 152. After the conversion is completed, control is returned to CNVCONVERT 150.

Thus, it is appreciated that the conversion subsystem 141 accepts the output from PFU/PC 16 (after it has been prepared for transfer to the OS1100 system 31 and transferred into the OS1100 file 33) as its input. The PFU/PC output in the OS1100 transfer file 33 contains the generic information necessary to recreate on the PFU supported printer 41 the character, electronic form, sketch or page composition arrangement created by PFU/PC 16. The conversion subsystem 141 uses this information to generate the appropriately formatted omnibus elements required to recreate the arrangement on the printer. When a file being printed on the printer references these omnibus elements, the referenced arrangement affects what is printed on the page.

Figure 16A:
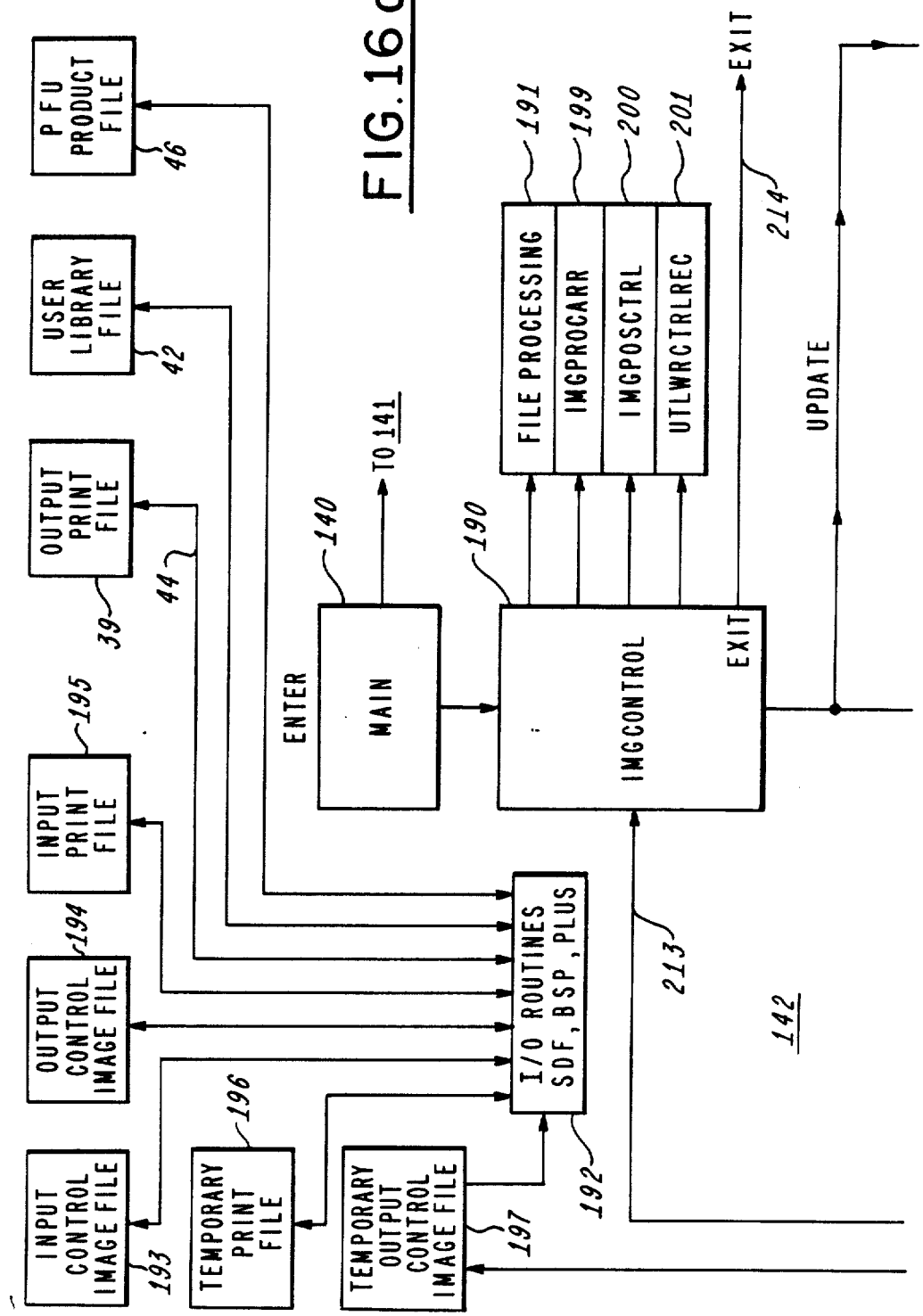

With continuing reference to FIG. 14, when the user selects the Generate Control Images option on the PFU/1100 main menu screen, described above, the PFU/1100 basic system 140 transfers control to the control image subsystem 142. Referring to FIG. 16, in which like reference numerals indicate like components with respect to FIGS. 1 and 14, and with continued reference to FIG. 14, details of the control image subsystem 142 are illustrated. Control enters an IMGCONTROL function 190 that directs the flow of processing throughout the control image subsystem 142. IMGCONTROL 190 performs file processing via a file processing function 191. The control image subsystem 142 accesses various files via I/O routines 192 utilizing SDF, BPS and PLUS. The files that are accessed by the control image subsystem 142 are an input control image file 193, an output control image file 194, an input print file 195, the output print file 39 (FIG. 1), the user library file 42 (FIG. 1), the PFU product file 46 (FIG. 1), a temporary print file 196 and a temporary output control image file 197. The temporary output control image file 197 is also accessed as working storage from a PLUS I/O function 198. IMGCONTROL 190 also accesses an IMGPROCARR element 199, an IMGPOSCTRL element 200 and an UTLWRCTRLREC element 201 for reasons to be described. The IMGCONTROL function 190 puts up a destination printer screen (not shown) via the DPS 1100 function 34 prompting the user to select a destination printer 41, such as the Model 47 Printer or the Cronus Printer, on which the output print file 39 will ultimately be printed. The IMGCONTROL function 190 then puts up on the display terminal 35 (FIG. 14) a file selection screen as follows:

| FILE SELECTION |
|---|
| Input Control Image Filename: |
| Output Control Image Filename: |
| Input Printfile Name: |
| Output Printfile Name: |

| FILE SELECTION | | | | | |
|---|---|---|---|---|---|
| Alternate Library Filename: | | | | | |
| F1: | F3: | F5: | F7: | F9: | |
| F2: | F4: | F6: | F8: | F10: | EXIT |

The file selection screen prompts the user to enter the names of the desired print, library and control image files to be utilized. IMGCONTROL 190 then puts up on the terminal 35 display a Control Image Type screen as follows:

| CONTROL IMAGE TYPE | | | | | | | |
|---|---|---|---|---|---|---|---|
| 1. Forms | | | | | | | |
| 2. Page Format | | | | | | | |
| 3. Character Arrangement | | | | | | | |
| Enter Selection: | | | | | | | |
| F1: | | F3: | F5: | IN-SERT | F7: | UP-DATE | F9: |
| F2: | SAVE | F4: | F6: | DE-LETE | F8: | | F10: EXIT |

This screen prompts the user to select the general type of control image that the user desires to create next in the file. The created control image is inserted at the end of the temporary output control image file 197. The control image subsystem 142 operates in a create mode or in an update mode, in a manner to be described. The Control Image Type screen is only provided in the create mode of operation. Based on the general type of control image selected, IMGCONTROL 190 transfers control to the appropriate first-level function to process it. These first level functions are IMGFORMS 202 for processing EFORM control images, IMGPGFORMAT 203 for processing page format control images and IMGCHARS 204 for processing character arrangement control images.

Depending on the specific types of control images to be generated, as selected by the user, in a manner to be described, each of the functions 202–204 can transfer control to second level functions. IMGFORMS 202 can transfer control to an IMGEFORMARR function 205 and an IMGEFORMOMN function 206. IMGPGFORMAT 203 can transfer control to an IMGPAGECOMP function 207, an IMGVFGBUFFER function 208 and an IMGTABBUFFER function 209. The IMGCHARS function 204 can transfer control to an IMGCHARARR function 210, an IMGFONTOMN function 211 and an IMGTRANSTBL function 212. After processing in accordance with the functions 205–212, control is transferred to the PLUS I/O function 198 for writing the created control image to the temporary output control image file 197 and also to transfer control back to IMGCONTROL 190 via a path 213.

If the user is in the update mode, which is entered via the F7 function key on the keyboard 36 (FIG. 14), the current control image is read from the temporary output control image file 197 and, based on the type of control image, the appropriate second level function 205–212 is entered to process it. When the control image subsystem 142 is operating in the update mode, the user can enter a positioning parameter to change the current position of the control image in the file in a manner to be described. The update mode includes an insert mode activated by pressing the function key F5 and a delete mode that is activated by pressing the function key F6, in a manner to be explained. The process of creating and/or updating control images repeats until the user indicates a desire to exit by pressing function key F10 on the keyboard 36.

The various files accessed by the control image subsystem 142 and named pursuant to the file selection screen illustrated above will now be described.

The files listed on the file selection screen menu are specified by the user. The input control image file (ICIF) 193, if specified, contains print control images previously created by the control image subsystem 142. The control images contained in the ICIF 193 are utilized as input to the current operation of the control image subsystem 142. If an ICIF is not desired, the associated field on the file selection screen is left blank. The previously created print control images are merged with the initial print control images in the input print file 195, if specified, and with any new images generated by the user during the current operation of the control image subsystem 142 to create the active set of control images.

The output control image file (OCIF) 194 ultimately contains the set of control images that are created during the current operation of the control image subsystem 142. The active set of control images is written to the file 194 when the save function key F2 or the exit function key F10 on the keyboard 36 are pressed. All of the control images contained in the active set of control images are written to the OSIF 194. This includes any initial control images from the input print file 195, plus all of the print control images from the input control image file 193, plus all of the newly created or updated control images. If neither an ICIF file nor an OCIF file are named on the file selection screen, the current active set of control images are not saved since they were only required for inclusion in the current print file 39.

The input print file (IPF) 195 is the print file which the user wishes printed using different control images than are currently in the print file. Thus, the IPF 195 provides an input into the control image subsystem 142. If specified, this file must be in SDF (System Data File) format and must contain the data images to be printed as well as any existing print control images. The control images produced by the current operation of the control image subsystem 142 are merged with the initial print control images in the input print file 195 and with the control images in the input control image file 193 to produce the active set of print control images. The active set of print control images is ultimately merged with the remaining images in the input print file 195 to produce the output print file 39, thus affecting how the data in the original input print file will be printed.

The output print file (OPF) 39 ultimately contains the new set of control images along with the data images in the input print file. The active set of control images along with the data images from the input print file are written to the OPF 39 when the control image subsystem 142 is exited by pressing function key F10. If neither an IPF nor an OPF are specified on the file selection screen, the active set of control images is saved in the OCIF 194 for future inclusion in a print file. This is achieved by pressing the function key F2 whereupon the temporary output control image file 197 is written to the OCIF 194 via the I/O routines 192. Thus, the output print file 39 contains all the data images from the input print file 195 plus all of the embedded print control images from the input print file 195 merged with all of the print control images that are in the active set. The control images in the active set are merged into the file immediately before the first data image in the input print file 195. The resultant output print file 39 is in SDF format and is ready to be printed.

The user library file 42 (alternate library file) contains the omnibus elements, referenced by the control images, that do not exist in the PFU product file 46. Thus, the library file 42 contains the omnibus elements, referenced from the control images in the active set created or updated by the current operation of the control image subsystem 142 or contained in the input print file 195 or in the input control image file 193.

The files 46, 196 and 197 are referenced or created by PFU.

The PFU Product File 46 contains the omnibus elements required by PFU.

The temporary output control image file 197 is created by PFU each time the control image subsystem 142 is utilized. The temporary output control image file 197 contains the set of control images currently being manipulated by PFU.

The temporary print file 196 is created by PFU if an IPF is specified by the user. It is used as a work file to build the print file as it will exist after the current utilization of the control image subsystem 142.

The files 39, 42, 46 and 193–197 communicate with the control image subsystem 142 via the I/O routines 192. SDF, BSP, and PLUS type of I/O are utilized for reading and writing the various types of files accessed thereby. PLUS I/O is utilized for reading and writing the input and output control image files. SDF I/O is utilized for reading and writing the input and output print files in SDF format. The BSP I/O is utilized for reading and writing omnibus elements.

Generally, using the control image subsystem 142, 061 print control images and arrangement references (representing sets of 061 print control images) are generated and inserted at the beginning of the print file 39 to modify what PERCON 37 (FIG. 1) and the printer 41 do with the data in the print file 39 when it is printed. The images are inserted into the print file immediately after any initial print control images already in the file and immediately before the first data image. The user can generate individual SDF 061 control images and/or sets of SDF O61 control images for arrangements which were assembled by PFU/PC when a character, electronic form, page composition or sketch arrangement was defined.

Using a 061 control image, the user can specify EFORMS to use with the print file 39, format the physical print page, and select a font and translate table to use for printing. Using an arrangement reference, the user can specify a PFU/PC created character, EFORM, page composition or sketch arrangement to use when printing. The user can also utilize the control image subsystem 142 to request miscellaneous print functions. The control image subsystem 142 also provides for the creation and updating of the output control image file 194 where the user can save the generated control images for future inclusion in a print file.

An arrangement reference is a control image that points to a group of control images that comprise the arrangement. The group of control images are linked together with forward pointers (the layout of the control image file is hereinafter described). The arrangement control image contains a pointer to the first control image in the group.

When the user specifies an arrangement, PFU/1100 reads in the omnibus element from the user library 42, that was created during conversion, in order to retrieve the control images that make up the arrangement. The omnibus element name is derived from the name of the arrangement. PFU reads the control images from the omnibus element in the order that they are specified, and puts the control images in the temporary output control image file 196. An arrangement reference must be a 040 control image in the PFU required format. The layout of the 040 arrangement control image starting at the second word is as follows:

| Subtype | Operation | | | | |
|---|---|---|---|---|---|
| Number of control images that make up the arrangement ||||||
| Pointer to the first control image in the active set that makes up the arrangement ||||||
| E |||||||
| l |||||||
| e |||||||
| m |||||||
| e |||||||
| n | N |||||
| t | a |||||
| | m |||||
| | e |||||
| P |||||||
| F | Identifier |||||
| U |||||||

The PFU 040 arrangement reference format includes a field for the name of the arrangement, the type of arrangement, the number of control images in the arrangement, and a pointer utilized to point to the first image that comprises the arrangement within the temporary output control image file 197. Whenever a 040 arrangement image is present with its associated print control images, the associated images logically (and physically in the output print file 39) follow the 040 control image.

The temporary output control image file 197 is created by the PFU/1100 control image subsystem 142 in order to store control images created or updated by the user, or brought in from the input files, in a manner to be described (Active Set). The control image file 197 contains three different types of records: control image records, free records and header records. Each control image record contains forward and backward pointers that chain all of the control image records together in logical order.

Each free record represents a record available for storing a control image. They are also chained in a list, but only contain forward pointers. When a new control image is created by the user, it is written to the first free record, and the second free record in the chained list of free records becomes the first free record. The header record is the first physical record in the file and contains the following information: record number of the first logical control image in the file, record number of the last logical control image in the file, number of records in the control image file 197 (file size), record number of the first logical free record in the file, number of control image records in the file, record length of the control image file 197, alternate library file name, and PFU file identifier. The header record is required in order to manage the chained lists of free records, control image records, and various other information utilized. The layout of the control image file 197 is as follows:

| CONTROL IMAGE FILE ||||||| |
|---|---|---|---|---|---|---|
| Rec # of 1st ctrl image rec | Rec # of last ctrl image rec | File Size | Rec # of 1st free rec | #of ctrl image recs in file | Record length of file | Data |
| Rec # of next record | Rec # of previous record | Control image |||||
| Rec # of next record | Rec # of previous record | Control image |||||
| Rec # of next record | Rec # of previous record | Control image |||||
| . | . | . |||||
| . | . | . |||||
| Rec # of next record | Rec # of previous record | Control image |||||

It is appreciated that a print control image generated or modified by the control image subsystem 142 is a properly formatted 040 arrangement reference supported by PFU or a properly formatted 061 control image supported by PERCON 37 that is acceptable for the specified destination printer 41 (FIG. 1) as described in detail in the referenced PERCON manual UP-11215.

In operation, the control image subsystem 142 generates an active set of print control images. The active set is the group of control images that the control image subsystem 142 is currently creating within the temporary output control image file 197. The active set is initially null and is built from the print control images found in the input sources to the subsystem 142.

The input sources from which the control images are read or created are as follows in the order they are accessed.

Each initial print control image in the input print file 195 is read in and appended to the end of the active set as the last logical record. If the image is a 040 arrangement reference, it is expanded into the set of control images it represents and each of these images is appended to the end of the active set as the last logical record in the order it appears in the arrangement's omnibus element from the PFU product file 46 or the user library 42.

Each print control image in the input control image file 193 is read in the logical order in which it appears in the file and is appended to the end of the active set as the last logical record. If the image is a 040 arrangement reference, it is expanded into the set of control images it represents and then each of these images is appended to the end of the active set as the last logical record in the order it appears in the arrangement's omnibus element from the PFU product file 46 or the user library 42.

Each print control image created, deleted, or modified by the user is added to, removed from or modified in the active set in the order it is created or updated, but it is placed in or deleted from the active set at the logical position indicated by the user. Positioning through the control image file will be later described.

The above-described placement of the control images results in inserting the user created control images after the initial control images in a print file and before the first data image. That is, the initial print control images from the IPF 195 are entered into the active set first, followed by the user created control images in the ICIF 193, and then followed by the newly created control images specified by the user. Since the entire active set will ultimately be added to the output print file 39 just before the first data image, the resulting order is: (initial print control images from IPF 195). . . (print control images from ICIF 193 that are currently in the active control image set, with each referenced arrangement followed immediately by its expanded set of control images). . . (print control images created by the user). . . (the remainder of the IPF 195 including the data images from the first data image to the end of the file). After each addition to, deletion, or modification to the active set, the resultant set of 061 print control images and 040 arrangement references is a total set of control images that will be used together within a print file. If an OPF or an IPF were specified, the output print file 39 is created by merging the images in the active control image set with the images in the input print file 195. If no IPF was specified, the active set of control images can be saved to the output control image file 194 by pressing the save function key F2 on the keyboard 36. When the control image subsystem 142 is exited via the function key F10, the active set of control images is written to both the output control image file 194 and the output print file 39. The remainder of the input print file 195, beginning with the first data image, is then written to the output print file 39. Thus, the control image subsystem 142 creates and modifies control images in the active set, creates a control image file from the images in the active set and inserts the set of control images at the front of a print file.

The control image subsystem 142 operates in two functional modes; viz, create and update. The update mode has an insert option and a delete option. The control image subsystem 142 operates in the create mode unless another mode is selected. As indicated on the control image type screen illustrated above, the update mode is entered by pressing function key F7 on the keyboard 36 (FIG. 14). The insert option is selected by pressing the function key F5 and the delete option is selected by pressing the function key F6. As discussed above, the save option is activated by pressing the function key F2 and the subsystem 142 is exited by pressing the function key F10. The subsystem 142 is exited via a path 214.

Pressing the function key F2 copies all of the control images of the active set from the temporary output control image file 197 to the specified output control image file 194.

When the control image subsystem 142 is operating in the create mode, the subsystem 142 appends the 061 control images and the 040 arrangement references to the end of the active set. The user is prompted, via the control image type screen illustrated above for the type of control image to be created and then for the data to be contained in the control image. After the data for the control image is specified, the control image is added to the end of the active set of control images. The IMGPOSCTRL function 200 repositions the current record to the logical record number indicated by the user in the position field (not shown) of the data screen. Control is only transferred to IMGPOSCTRL 200 when the control image subsystem 142 is in the update mode. IMGPOSCTRL 200 uses the information in the header as well as the forward and back links in each record to position to the desired control image. Pressing the function key F7 causes the control image subsystem 142 to enter the update mode. Once an 061 control image or 040 arrangement reference has been created, the update mode can be entered to modify or delete it. The update mode is also utilized to insert a new control image before an existing one. Accordingly, in the update mode, the functions keys F5 and F6 are activated. When entering the update mode, the last print control image in the active set is displayed on the terminal screen 35 and the user can position to a particular control image in the active set and can then modify the image or delete or insert a control image before that particular image. To modify any control image in the active set, the user positions to the desired control image, edits the desired fields and transmits the screen by pressing the transmit key on the keyboard 36 (FIG. 14).

To delete any control image in the active set, the user positions to the desired control image and presses function key F6. Thus, F6 deletes the currently displayed print control image from the active set, if pressed from the update mode.

In the update mode, the user can insert a new print control image in front of an existing control image in the active set. The user positions to the desired control image and presses function key F5. After pressing F5, the control image type screen illustrated above is displayed where the type of control image to be created is specified. Additional screens to be later described solicit other required information. After the data for the new control image is specified, the control image is inserted into the active set logically before the desired control image.

When in the update mode, the user is positioned to the last logical record in the temporary output control image file 197 and the data for that record is displayed on the screen 35. A position field (not shown) is also displayed showing the user the current logical record number position in the file. The user can overwrite the record number displayed to cause repositioning and display of another record in the file and thus the user can move forward or backward through the temporary output control image file 197 to review individual records currently in it. This positioning function is utilized in modifying, inserting and deleting. The user can position to the first or the last control image in the active set or to any designated logical position within the active set.

The function key F10 exits the user from the current use of the control image subsystem 142 and returns control to the PFU/1100 main menu screen described above.

With continued reference to FIG. 16, the control image subsystem 142 is comprised of the level one functions 202-204 and the level two functions 205-212. The level one functions are indicated on the path thereto by a "1". The level two functions are indicated on the path thereto by a "2". Each level 1 function prompts the user for the specific type of control image to be created within the general type already chosen. Based on the selection of the user, each level 1 function then transfers control to the appropriate level 2 function to create the specified control image. The level 1 functions transfer control to the level 2 functions in the create mode or directly from the IMGCONTROL function 190 in the update mode. These elements solicit the data for the control image being created or updated, build the desired control image and transfer control to the UTLWRCTRLREC function 201 to write the image to the temporary output control image file 197. If the control image subsystem 142 is in the update mode, control is transferred to IMGPOSCTRL 200 to process any positioning requests made by the user.

As discussed above with respect to the control image type screen, the control image subsystem 142 prompts the user to select the type of control image to be generated next in the active set of control images. The control image types are: forms, page format, and character arrangement. The forms option specifies a form or forms to use with the print file. Specifically, the forms option permits using an EFORM arrangement or an EFORM omnibus element on a printed page. The page format option formats the physical printed page by changing the printer's vertical format buffer or changing the tab buffer for the printed page. The character arrangement option selects a character arrangement to use for printing by loading a complete character arrangement so that it is available when printing, loading a particular font so that it is available when printing, or loading a particular translate table so that it is available when printing. After the type of control image is selected, a specific control image within the type is specified. The user is prompted via additional screens for the specific control image to be generated and for any necessary data.

When the forms option is selected on the control image type screen, IMGCONTROL 190 transfers control to IMGFORMS 202. The forms option provides the user with a capability to insert control images into the active set that will access various print forms when a file containing these images is printed. IMGFORMS 202 prompts the user for the type of form control image to be generated by putting up a forms screen (not shown) on the terminal display 35. (FIG. 14). The user can select from the forms screen an EFORM arrangement and an electronic form omnibus element. The EFORM arrangement specifies that a PFU/PC-created electronic form arrangement is to be used on the printed page. The EFORM omnibus element selection specifies that an electronic form omnibus element is to be overlayed onto the printed page. If the EFORM arrangement option is selected, IMGFORMS 202 transfers control to IMGEFORMARR 205. If the EFORM omnibus element option is selected, IMGFORMS 20 transfers control to IMGEFORMOMN 206.

The EFORM arrangement option provides the user with the capability of overlaying constant data onto a printed page. The EFORM arrangement must have been created by PFU/PC 16 via the EFORM arrangement subsystem 18, prepared by the prepare arrangement for transfer function 51 and transferred to the OS1100 system 31 and converted to the proper format using the conversion subsystem 141. The EFORM arrangement contains or references all of the information necessary to recreate the complete EFORM arrangement on the printed page, including the character arrangements used by the EFORM text. IMGEFORMARR 205 prompts the user to enter the name of the omnibus element that contains the control images that comprise the EFORM arrangement by putting up an electronic form screen (not shown) on the terminal display 35. The user enters the name given to the desired EFORM arrangement when it was created by PFU/PC 16 and which uniquely identifies the EFORM arrangement. IMGEFORMARR 205 transfers control to the IMGPROCARR function 199 to process the arrangement and then transfers control to the UTLWRCTRLREC function 201 to insert the arrangement image into the temporary output control image file 197 via the PLUS I/O function 198 at the current control image file position. IMGEFORMARR 205 transfers control to IMGPOSCTRL 200 to process any positioning requests made by the user.

With respect to IMGEFORMOMN 206, an EFORM omnibus element is used to overlay constant data onto the printed page. The EFORM omnibus element must have been previously created by utilizing the EFORM arrangements subsystem 18 as described above. Unlike an EFORM arrangement, an EFORM omnibus element does not make available the fonts and translate tables required by the EFORM. The necessary control images are created by IMGFONTOMN 211 and IMGTRANSTBL 212, in a manner to be described. The IMGEFORMOMN 206 function prompts the user for the desired EFORM omnibus element name by putting up an electronic form screen (not shown) with an appropriate name prompt. The user enters the name that uniquely identifies the omnibus element containing the desired EFORM specification. This omnibus element exists in the user library file 42 or in the PFU product file 46. IMGEFORMOMN 206 builds the appropriate control image in memory that will utlimately cause the selection and printing of the specified electronic form omnibus element and transfers control to ULTLWRCTRLREC 201 to insert the image into the temporary output control image file 197 at its current position. If the user is in the update mode, IMGEFORMOMN 206 also transfers control to the IMGPOSCTRL function 200 to process any positioning requests made by the user. Thus, it is appreciated that IMGEFORMOMN 206 provides the user with the capability of naming a previously created electronic form to be overlayed onto the printed page.

As discussed above, when the control image subsystem 142 is in the create mode, IMGEFORMARR 205 and IMGEFORMOMN 206 are accessed via IMGFORMS 202. When the control image subsystem 142 is in the update mode, IMGEFORMARR 205 and IMGEFORMOMN 206 are accessed directly from IMGCONTROL 190.

When the user selects the page format option from the control image type screen (described above), IMGCONTROL 190 transfers control to the IMGPGFORMAT function 203. The page format option provides the user with the capability to control the format of the printed page. The IMGPGFORMAT function 203 prompts the user for the type of page formatting control image to generate by putting up a page format screen (not shown) on the display terminal 35. The page format screen menu includes the following options: page composition, vertical format buffer, and tab buffer. When the page composition option is selected, IMGPGFORMAT 203 transfers control to the IMGPAGECOMP function 207. When the vertical format buffer option is selected, IMGPGFORMAT 203 transfers control to the IMGVFBUFFER function 208. When the tab buffer option is selected, IMGPGFORMAT 203 transfers control to the IMGTABBUFFER function 209. The page composition option specifies all information relating to the page format. The vertical format buffer specifies the vertical line spacing for the logical page. The tab buffer option specifies the horizontal tab stops across the printed page. After selecting the desired formatting option, the user is prompted to enter the information required for the selected option.

The IMGPAGECOMP function 207 provides the user with the capability of specifying an omnibus element which contains all information relating to page format, spacing, electronic forms, fonts, etc. The page composition arrangement must have been created by PFU/PC 16 via the page composition arrangements subsystem 20, transferred to the OS1100 system 31, and converted to the proper format using the conversion subsystem 141. The IMGPAGECOMP function 207 prompts the user for the name of a page composition omnibus element which contains all of the information needed to describe the page. The prompt is effected by putting up a page composition screen (not shown) on the display terminal 35 which the user utilizes for entering the name that uniquely identifies the page composition omnibus element. IMGPAGECOMP 207 then builds the appropriate 061 control image in memory that will ultimately cause the specified page composition to be used to describe the page when the file is printed and transfers control to the UTLWRCTRLREC function 201 to insert that image into the temporary output control image file 197 at its current position via the PLUS I/O function 198. If the control image subsystem 142 is in the update mode, IMGPAGECOMP 207 then transfers control to IMGPOSCTRL 200 to process any positioning requests made by the user.

When the vertical format buffer option is selected from the page format screen (not shown), IMGPGFORMAT 203 transfers control to IMGVFBUFFER 208. IMGVFBUFFER 208 is utilized to create a control image formatting the physical print page by changing the vertical format buffer (VFB). The IMGVFBUFFER function 208 prompts the user for the name of an omnibus element containing the desired VFB definition to be used when printing the file by displaying a vertical format buffer screen (not shown) on the display terminal 35. The user enters the name that uniquely identifies an omnibus element containing the desired VFB. The VFB element contains information detailing the following items for the printed page: number of lines per page, number of logical pages per physical page, and number of lines per inch. IMGVFBUFFER 208 then builds the appropriate 061 control image in memory that will ultimately cause the specified VFB to be used to format the page when the file is printed and transfers control to ULWRCTRLREC 201 to insert that image into the temporary output control image file 197 at its current position via the PLUS I/O function 198. If the control image subsystem 142 is in the update mode, IMGVFBUFFER 208 transfers control to IMGPOSCTRL 200 to process any positioning requests made by the user.

When the user selects the tab buffer option from the page format screen (not shown), IMGPGFORMAT 203 transfers control to the IMGTABBUFFER function 209. The tab buffer option provides the user with the capability of specifying the horizontal tab stops across the printed page. IMGTABBUFFER 209 prompts the user for the name of an omnibus element containing the desired tab buffer to be used when printing the file by putting up a tab buffer screen (not shown). The user enters the name that uniquely identifies the omnibus element containing the tab buffer. The tab buffer contains information that details the tab stops across the page. IMGTABBUFFER 209 then builds the appropriate 061 control image in memory that will ultimately cause the specified tabbing to be used when the file is printed and transfers control to the UTLWRCTRLREC function 201 to insert that image into the temporary output control image file 197 at its current position via the PLUS I/O function 198. If the control image subsystem 142 is in the update mode, IMGTABBUFFER 209 transfers control to IMGPOSCTRL 200 to process any positioning requests made by the user.

When the control image subsystem 142 is in the create mode, the functions 207-209 are accessed via the IMGPGFORMAT function 203. When the control image subsystem 142 is in the update mode, the functions 207-209 are accessed directly from IMGCONTROL 190.

When the user selects the character arrangement option from the control image type screen described above, IMGCONTROL 190 transfers control to the IMGCHARS function 204. IMGCHARS 204 generates the set of control images for loading the printer with the desired fonts and translate tables for printing the file and to load all of the desired fonts and translate tables for a complete character arrangement into the printer 41 (FIG. 1), thus making the arrangement available to the printer for printing the file.

The IMGCHARS function 204 prompts the user for the type of character arrangement control image to generate by putting up a character arrangement screen (not shown) on the terminal display 35. The character arrangement screen lists the following option menu: full character arrangement, load font omnibus element, and load translate table. When the full character arrangement option is selected, IMGCHARS 204 transfers control to the IMGCHARARR function 210. When the load font omnibus element option is selected, IMGCHARS 204 transfers control to the IMGFONTOMN function 211. When the load translate table option is selected, IMGCHARS 204 transfers control to the IMGTRANSTBL function 212.

The full character arrangement option loads all the fonts and translate tables that are part of a PFU/PC-created character arrangement into the printer. The load font omnibus element loads the specified font or character generator into the printer from an omnibus element. The load translate table option loads the specified translate table into the printer. After selecting the desired character option, the user is prompted to enter the information required for that option.

The IMGCHARARR function 210 provides the user with the capability of loading a complete character arrangement including all translate tables and associated fonts defined as part of the arrangement into the printer. The character arrangement to be loaded must have been created by PFU/PC 16 via the character arrangement subsystem 17, prepared by the prepare arrangement for transfer function 51 and transferred to the OS1100 system 31, and then converted by the conversion subsystem 141 into the omnibus elements for the destination printer. The character arrangement module or element thereby created contains or references all of the information necessary to load the fonts and translate table or tables that are part of the named arrangement.

The IMGCHARARR function 210 prompts the user to enter the name of the omnibus element that contains the control images that comprise the character arrangement by putting up a full character arrangement screen (not shown) with the name prompt. The user enters the name given to the desired character arrangement when it was created via PFU/PC 16 that uniquely identifies the character arrangement to be loaded. IMGCHARARR 210 then transfers control to IMG- PROCARR 199 to process the arrangement and then transfers control to UTLWRCTRLREC 201 to insert that image into the temporary output control image file 197 at its current position via the PLUS I/O function 198. If the control image subsystem 142 is in the update mode, IMGCHARARR 210 then transfers control to IMGPOSCTRL 200 to process any positioning requests made by the user.

The IMGFONTOMN function 211 creates the control image that loads a previously defined font from an omnibus element into the destination printer. The IMGFONTOMN function 211 prompts the user for the name of the omnibus element, containing the pixel data for the fonts to be used when printing the file, and the number to be associated with these fonts by putting up a load font omnibus element screen (not shown) with the name and font number prompts. The user enters the name of the omnibus element that contains the desired font specifications. The name uniquely identifies the omnibus element containing the font information to be loaded. The user enters the font number, character generator number or slot number to be loaded with the font. This is the number associated with the character generator in the printer to be loaded. With respect to the Model 47 printer, the font is loaded into a RAM cartridge that is available in one of the cartridge slots of the printer.

IMGFONTOMN 211 then builds the appropriate 061 control image in memory that will ultimately cause the specified font omnibus element to be loaded into the printer and used when the file is printed (in conjunction with an associated translate table) and transfers control to UTLWRCTRLREC 201 to insert that image into the temporary output control image file 197 at its current position via the PLUS I/O function 198. If the control image subsystem 142 is in the update mode, IMGFONTOMN 211 transfers control to IMGPOSCTRL 200 to process any positioning requests made by the user.

The IMGTRANSTBL function 212 generates the control image that loads a previously defined translate table from an omnibus element into the destination printer. IMGTRANSTBL 212 prompts the user for the name of an omnibus element, containing a translate table to be used when printing the file, and the number to be associated with that translate table by putting up a translate table screen (not shown) with the name and number prompts. The user enters the name of the omnibus element that contains the desired translate table specifications. The name uniquely identifies the omnibus element that contains the desired translate table information to be loaded. The user also enters the number of the translate table buffer in the printer to be loaded. IMGTRANSTBL 212 then builds the appropriate 061 control image in memory that will ultimately cause the specified translate table to be loaded into the printer and used when the file is printed (in conjunction with a character and associated character generator) and transfers control to UTLWRCTRLREC 201 to insert that image into the temporary output control image file 197 at its current position via the PLUS I/O function 198. If the control image subsystem 142 is in the update mode, IMGTRANSTBL 212 transfers control to IMGPOSCTRL 200 to process any positioning requests made by the user.

When the control image subsystem 142 is in the create mode, the functions 210–212 are accessed via IMGCHARS 204. When the control image subsystem 142 is in the update mode, the functions 210–212 are accessed directly from IMGCONTROL 190.

The UTLWRCTRLREC function 201 uses PLUS I/O to write a control image to the temporary output control image file 197. If the control image subsystem 142 is in the create mode, the record is added to the logical end of the file. If the subsystem 142 is in the update mode and a record is being inserted, the record is logically inserted before the current record. If the subsystem 142 is in the update mode and not inserting a record, the current record is rewritten (updated).

If the control image subsystem 142 is in the create mode, the record is added to the logical end of the file. Using the header information, the first free record is read as the current record, re-chained at the end of the list of active control records and updated to contain the information for the new control image. If a previous record exists, it is read, updated to point to the new record, and rewritten to the file. The header record is then updated to reflect the new record.

If the control image subsystem 142 is in the update mode and a record is being inserted, the current record becomes the next record. Using the header information, the first free record is read as the current record, re-chained into the list of active control records, and updated to contain the information for the new control image. If a previous record exists, it is read, updated to point to the new record, and rewritten to the file. The header record is then updated to reflect the new record. The backward link of the next record is then reset to point to the new record and the record is rewritten to the file.

Thereafter, irrespective of the processing mode, the header record is rewritten to the file and the current record is rewritten to the file. At this point, the current record can be a newly created record or an updated record. UTLWRCTRLREC 201 utilizes PLUS I/O for all reads and writes to and from the temporary output control image file 197.

The IMGPROCARR function 199 expands an arrangement image. It expands the arrangement image to include all of the control images that comprises that arrangement. It steps through the omnibus element stored in buffer extracting control images and placing them in the temporary output control image file 197 linking them to the 040 arrangement image.

It is appreciated from the foregoing that the present invention provides easy to use method and apparatus to create and modify the character sets, electronic forms, form overlays, page layouts, signatures, and logos, all of which can be used and invoked by the mainframe system 31 in print file creation for PERCON 37. This functionality is traditionally accomplished by skilled systems programmers who must write complex programs. With the present invention, the functionality described herein can be achieved by the site administrator or by applications programmers.

It is appreciated from the foregoing that the user, utilizing the PC 10 with PFU/PC 16, can readily and interactively create or modify print entities such as fonts, forms and the like. PFU/PC 16 displays menus on the screen 11 leading the user to an appropriate print entity create screen generally having a drawing area wherein the user can create or modify the desired print entity. For example, the user can create or modify characters within the drawing area of the create character screen. PFU/PC 16 gathers up the user entered data and stores the print entity data in the print entity array memory. The print entity data on the PC side is not printer specific. The print entity data created by the user at the PC 10 is prepared for transfer to the mainframe by the prepare subsystem 51 and placed into the PC transfer module 21 wherein the communications package 32 transfers the data to the transfer file 33 at the mainframe. The conversion subsystem 141 at the mainframe generates, from the print entity data in the transfer file 33, omnibus elements containing the print entity corresponding to the print entity data in printer specific format. The omnibus element is then stored in the library file 42. The control image subsystem 142 is utilized by the user at the mainframe terminal 35, 36, for generating the appropriate print control records (control images) corresponding to the print entities generated by the conversion subsystem 141 in a format suitable for printer control means (Percon 37) and for inserting the print control records into the print file 39. Percon 37, in response to the print file 39, prints the pages on the printer 41 utilizing the omnibus elements in the user library 42 under control of the print control records inserted into the print file 39.

While the invention has been described in its preferred embodiments, it is to be understood that the words which have been used are words of description rather than limitation and that changes may be made within the purview of the appended claims without departing from the true scope and spirit of the invention in its broader aspects.

We claim:

1. Apparatus, for use with a mainframe computer facility having a mainframe digital computer and a pixel addressable printer, for creating and modifying print entities for printing on pages by said printer, said mainframe digital computer having a print file containing print control records and application data to be printed, a library file for storing elements containing said print entities, and printer control means responsive to said print file and said library file for controlling said printer to print said application data on said pages in accordance with said print entities in elements selected from said library file under control of said print control records in said print file, comprising second digital computer means including a print entity data array memory, a display screen and a cursor movement control input device, create/modify means in said second digital computer for a user interactively to create and modify print entity data defining said print entities, said create/modify means including means for generating and displaying a print entity create screen on said display screen, said print entity create screen including a drawing area wherein said user can create and modify said print entities, said print entities being created and modified in said drawing area by said user by cursor movement controlled by user manipulation of said input device and means for storing in said print entity array memory, data representative of said cursor movement thereby storing said print entity data defining said print entities, prepare means in said second digital computer responsive to said print entity data for converting said print entity data into a format suitable for transfer to said mainframe digital computer thereby generating a transfer module, transfer means responsive to said transfer module for transferring said transfer module to a transfer file at said mainframe digital computer, conversion means in said mainframe digital computer responsive to said transfer file for generating, from said print entity data transferred to said transfer file by said transfer means, said elements containing said print entities corresponding to said print entity data in a format suitable for said printer control means and for storing said elements in said library file, and control image means in said mainframe digital computer for generating print control records, in a format suitable for said printer control means, corresponding to said print entities generated by said conversion means and for inserting said print control records into said print file.

2. The apparatus of claim 1 wherein
said second digital computer means comprises a personal computer (PC) and
said pixel addressable printer comprises a laser printer.

3. The apparatus of claim 1 wherein said print entities comprise at least one of character arrangement, print fonts, and translate tables.

4. The apparatus of claim 3 wherein said second digital computer means comprises a personal computer (PC) and said print entity data array memory comprises a character array memory.

5. The apparatus of claim 4 wherein said create/modify means comprises a character arrangement subsystem.

6. The apparatus of claim 5 wherein said character arrangement subsystem comprises means for generating and displaying a create character screen on said display screen, said create character screen including a character drawing matrix area representing a matrix of pixels, means for turning said pixels on and off in accordance with said cursor movement controlled by said user manipulation of said input device, said pixels being turned on and off in accordance with creation or modification of a character, a character being defined by on pixels, and means for storing in said character array memory, data representative of said on pixels thereby storing print font data in said character array memory.

7. The apparatus of claim 6 wherein
said character arrangement subsystem further comprises means for creating or modifying character arrangements including translate tables and print fonts, said PC further including storage means for storing a character arrangement in a hierarchical data structure including storage for translate tables thereof and storage for said print font data comprising the fonts thereof.

8. The apparatus of claim 7 wherein said character arrangement subsystem includes save/get means for getting character arrangement data, translate table data and print font data from said storage means and for saving character arrangement data, translate table data and print font data to said storage means, said save/get function including means for saving to said storage means in said hierarchical data structure said print font data in said character array memory.

9. The apparatus of claim 8 wherein said character arrangement subsystem includes means for creating and modifying said translate table data.

10. The apparatus of claim 1 wherein said print entities comprise electronic forms (EFORM) and EFORM arrangements.

11. The apparatus of claim 10 wherein said second digital computer means comprises a personal computer (PC) and said print entity data array memory comprises an EFORM array memory.

12. The apparatus of claim 11 wherein said create/modify means comprises an EFORM arrangement subsystem.

13. The apparatus of claim 12 wherein said EFORM arrangement subsystem comprises
means for generating and displaying a create EFORM screen on said display screen, said create EFORM screen including a drawing area for said user creating or modifying an EFORM, said drawing area having row and column coordinate locations therein,
means for said user to select a shape for inclusion in said EFORM, thereby providing a selected shape signal,
said cursor movement control input device being utilized by said user to control said cursor movement within said drawing area and for marking a starting row and column coordinate location for said selected shape,
graphics means responsive to said selected shape signal, said starting location and a current location of said cursor for displaying said selected shape between said starting location and said current location,
said cursor movement control input device comprising means marking an ending row and column coordinate location for said selected shape, and
means for storing in said EFORM array memory an EFORM record containing EFORM data representative of said selected shape and said starting and ending coordinate locations thereof, said EFORM data comprising said print entity data.

14. The apparatus of claim 13 wherein said selected shape is selected from a group consisting of a box, horizontal line, vertical line, horizontal text and vertical text.

15. The apparatus of claim 14 wherein
said EFORM arrangement subsystem further includes means for said user to select a line style for said shapes, thereby providing a selected line style signal,
said graphics means including means responsive to said line style signal for generating said shapes in said EFORM drawing area in said selected line style, and
said means for storing said print entity data including means for storing data representative of said line style in said EFORM record.

16. The apparatus of claim 15 wherein said selected line style is selected from a group consisting of solid, dotted, dashed and shaded.

17. The apparatus of claim 15 wherein said personal computer includes storage means, and
said EFORM arrangement subsystem further including means for transferring said EFORM records from said EFORM array memory to said storage means and for transferring EFORM records stored in said storage means to said EFORM array memory.

18. The apparatus of claim 17 wherein said EFORM arrangement subsystem includes means for assembling an EFORM arrangement module with respect to an EFORM to be printed on said pages by said printer, said EFORM arrangement module including character arrangement modules to be utilized by said EFORM, translate table modules to be utilized by said EFORM and sketch arrangement modules to be utilized by said EFORM.

19. The apparatus of claim 13 wherein said cursor movement control input device comprises a mouse.

20. The apparatus of claim 13 wherein said EFORM arrangement subsystem includes means for said user to modify said EFORM by moving said shape within said drawing area and storing the starting and ending coordinates thereof, to delete said shape from said drawing area, and enlarge a portion of an EFORM displayed in said drawing area.

21. The apparatus of claim 1 wherein said print entities comprise sketch arrangements and sketches.

22. The apparatus of claim 21 wherein said second digital computer means comprises a personal computer and said print entity data array memory comprises a sketch array memory.

23. The apparatus of claim 22 wherein said create/modify means comprises a sketch arranngement subsystem.

24. The apparatus of claim 22 wherein said sketch arrangement subsystem comprises
means for generating and displaying a create sketch screen on said display screen, said create sketch screen having a create sketch drawing area,
said cursor movement control input device being operable by said user to control said cursor movement within said drawing area in accordance with a sketch to be created and modified, thereby creating sketch data, said sketch data comprising said print entity data, and
means for storing said sketch data in said sketch array memory.

25. The apparatus of claim 24 wherein
said personal computer includes storage means, and
said sketch arrangement subsystem includes means for transferring said sketch data from said sketch array memory to said storage means and for transferring sketch data stored in said storage means to said sketch array memory.

26. The apparatus of claim 25 wherein said sketch arrangement subsystem includes means for assembling a sketch arrangement module with respect to a sketch to be printed on said pages by said printer, said sketch arrangement module including a translate table module providing character codes with respect to sketch modules and further including sketch modules containing pixel data for said sketch.

27. The apparatus of claim 1 wherein said print entities comprise page compositions and page composition arrangements.

28. The apparatus of claim 27 wherein
said second digital computer means comprises a personal computer having a an internal memory, and
said create/modify means comprising a page composition arrangement subsystem.

29. The apparatus of claim 28 wherein said page composition arrangement subsystem comprises means for generating and displaying control screens on said display screen for the interactive entry by said user of page composition arrangement data with respect to logical areas on a page, character arrangements, electronic form arrangements, sketch arrangements, verical format buffers and tab buffers, said page composition data comprising said print entity data, and means for tranferring said page composition data to said internal memory.

30. The apparatus of claim 29 wherein said personal computer includes storage means and said page composition arrangement subsystem further includes means for transferring said page composition data to said storage means from said internal memory and for transferring page composition data stored in said storage means to said internal memory.

31. The apparatus of claim 1 wherein said prepare means comprises means for merging said print entity data created or modified by said create/modify means into one ASCII text file, thereby generating said transfer module.

32. The apparatus of claim 31 wherein said print entity data comprises an arrangement having a plurality of modules created or modified by said create/modify means, and said prepare means comprises means for merging said modules into one ASCII text file, thereby generating said transfer module.

33. The apparatus of claim 32 wherein said prepared means includes means for converting integer variables in said modules created by said create/modify means into corresponding ASCII strings of predetermined lengths.

34. The apparatus of claim 33 wherein said print entity data prepared by said prepare means comprises print entity data selected from a group consisting of character arrangement data, translate table data, print font data, EFORM arrangement data, EFORM data, sketch arrangement data, sketch data, page composition arrangement data, page composition data, vertical format buffer data, and tab buffer data.

35. The apparatus of claim 32 wherein said pixel addressable printer comprises a laser printer, and said mainframe computer facility includes a display terminal and keyboard means for entering alphanumeric data and display screen item selection signals.

36. The apparatus of claim 35 wherein said conversion means comprises means for separating said modules merged by said prepare means and converting said modules from said ASCII text to said elements in a format suitable for said printer control means.

37. The apparatus of claim 36 wherein said print entity data comprises character arrangement data, print font pixel data and translate table data and said conversion means comprises means for converting said translate table data to a format suitable for said printer control means and storing said converted translate table data in a translate table element, means for storing said translate table element in said library file, means for converting said print font pixel data to a format suitable for said printer control means and storing said converted print font pixel data in a print font element, and means for storing said print font element in said library file.

38. The apparatus of claim 37 wherein said conversion means further includes means responsive to said character arrangement data for generating print control records for accessing said translate table element and said print font element and for storing said print control records in a control image element, and means for storing said control image element in said library file.

39. The apparatus of claim 36 wherein said print entity data comprises EFORM arrangement data and EFORM data, and wherein said conversion means cmprises means for converting said EFORM data to a format suitable for said printer control means and for storing said converted EFORM data in an EFORM element, and means for storing said EFORM element in said library file.

40. The apparatus of claim 39 wherein said conversion means further includes means responsive to said EFORM arrangement data for generating print control records for accessing said EFORM element and for storing said print control records in a control image element, and means for storing said control image element in said library file.

41. The apparatus of claim 40 further including a product file storing shape data elements, said shape data elements containing shape data compatible with a plurality of page line densities, said conversion means including means for prompting, via said display terminal, entry of a selected line density for said EFORM via said keyboard.

42. The apparatus of claim 41 wherein said shape elements contain primary images required to print any combination of intersecting shaded and unshaded boxes and horizontal and vertical lines, said conversion means further including a shape grid, a shade grid, a text grid, and a translate tabel grid, each said grid corresponding in dimension to said EFORM to be printed and having a matrix of row and column locations corresponding to the row and column locations of said EFORM, said shape grid containing character codes at said locations thereof corresponding to merged box and line primary images to be printed at each said location, said shade grid containing character codes at said locations thereof representing merged shading corresponding to said locations, said text grid containing ASCII representations of merged text character for each said location, and said translate table grid containing translate table identifications with respect to said text characters in said text grid.

43. The apparatus of claim 42 wherein said conversion means further includes shape tables and shade tables containing character codes representative of said primary images contained in said elements in said product file, decomposing means for decomposing each shape to be printed on said EFORM into its primary images, and merging means responsive to said decomposing means and utilizing said grids and tables for merging into said grids the character codes representative of the primary images comprising said EFORM to be printed.

44. The apparatus of claim 43 wherein
said elements stored in said product file contain primary images in plurality of lines styles, and
said decomposing and merging means include means for merging into said grids character codes representative of said primary images in merged line styles in accordance with said EFORM to be printed.

45. The apparatus of claim 36 wherein said print entity data comprises sketch arrangement data and sketch data and said conversion means comprises
means for converting said sketch data to a format suitable for said printer control means and storing said converted sketch data in a sketch element, and
means for storing said sketch element in said library file.

46. The apparatus of claim 45 wherein said conversion means further includes
means responsive to said sketch arrangement data for generating print control records for accessing said sketch element and for storing said print control records in a control image element, and
means for storing said control image element in said library file.

47. The apparatus of claim 36 wherein said print entity data comprises page composition arrangement data, page composition data, vertical format buffer data and tab buffer data and said conversion means comprises
means for converting said page composition data to a format suitable for said printer control means and storing said converted page composition data in a page composition element,
means for storing said page composition element in said library file,
means for converting said vertical format buffer data to a format suitable for said printer control means and storing said converted vertical format buffer data in a vertical format buffer element,
means for storing said vertical format buffer element in said library file,
means for converting said tab buffer data to a format suitable for said printer control means and storing said converted tab buffer data in a tab buffer element, and
means for storing said tab buffer element in said library file.

48. The apparatus of claim 47 wherein said conversion means further includes
means responsive to said page composition arrangement data for generating print control records for accessing said page composition element, said vertical format buffer element and said tab buffer element and for storing said print control records in a control image element, and
means for storing said control image element in said library file.

49. The apparatus of claim 36 wherein said conversion means
means for generating print control records for accessing said elements generated by said conversion means and for storing said print control records in control image elements, and
means for storing said control image elements in said library file.

50. The apparatus of claim 49 wherein said control image means include means for accessing said control image elements in said library file and generating said print control records therefrom in a format suitable for said printer control means.

51. The apparatus of claim 50 in which said control image means includes control image file means,
means for storing said print control records in said control image file means, and
means for positioning to a predetermined print control record in said control image file means.

52. The apparatus of claim 51 wherein said control image means further includes means for inserting and deleting a print control record from a predetermined position in said control image file means.

53. The apparatus of claim 52 wherein said control image means comprises means for generating said print control records corresponding to said print entities selected from a group consisting of EFORM arrangements, EFORMS, page composition arrangement, vertical file buffers, tab buffers, character arrangement, fonts and translate tables.

54. The apparatus of claim 53 wherein said control image means include means for transferring said print control records in said control image file to said print file.

55. The apparatus of claim 1 further including means in said create/modify means for generating and displaying menus on said display screen for guiding said user to enter data relating to said print entities and for guiding said user to said print entity create screen for creating and modifying said print entities.

* * * * *